US007388736B2

(12) United States Patent
Morioka et al.

(10) Patent No.: US 7,388,736 B2
(45) Date of Patent: Jun. 17, 2008

(54) STATIC ELIMINATOR AND A STATIC ELIMINATING METHOD FOR AN INSULATING SHEET, A METHOD FOR PRODUCING AND INSULATING SHEET, AND AN INSULATING SHEET

(75) Inventors: Satoko Morioka, Kyoto (JP); Daisuke Masuwa, Nagoya (JP); Hiroki Nakajima, Moriyama (JP); Yasuyuki Hirai, Otsu (JP); Harumi Tanaka, Otsu (JP)

(73) Assignee: Toray Industries, Inc., Tokyo (JP)

( * ) Notice: Subject to any disclaimer, the term of this patent is extended or adjusted under 35 U.S.C. 154(b) by 464 days.

(21) Appl. No.: 10/902,603

(22) Filed: Jul. 29, 2004

(65) Prior Publication Data

US 2005/0030694 A1 Feb. 10, 2005

(30) Foreign Application Priority Data

Jul. 29, 2003 (JP) ............................ 2003-202941
Jan. 7, 2004 (JP) ............................ 2004-001694

(51) Int. Cl.
*H02H 1/00* (2006.01)

(52) U.S. Cl. ...................................................... 361/212

(58) Field of Classification Search ................ 361/212, 361/213, 214
See application file for complete search history.

(56) References Cited

U.S. PATENT DOCUMENTS 2,352,411 A * 6/1944 Sandretto .................... 361/218
3,474,292 A * 10/1969 Carter ........................ 361/213
3,475,652 A 10/1969 Levy
3,892,614 A 7/1975 Levy
4,012,666 A * 3/1977 Schramm et al. ........... 361/213
4,042,971 A * 8/1977 Brennecke et al. ......... 361/213
4,241,377 A * 12/1980 Cumming ................... 361/213
5,589,922 A * 12/1996 Amemiya et al. .......... 399/315
5,683,556 A 11/1997 Nomura et al.
5,895,632 A 4/1999 Nomura et al.

FOREIGN PATENT DOCUMENTS

JP 53-6180 B 3/1978

(Continued)

OTHER PUBLICATIONS

Dengakuron A, Institute of Electrical Engineers, vol. 112, No. 8, 1992, pp. 735-740, no month.
A Product Specification of Kasuga Denki, Inc., Published Jan. 3, 2001 (w/English Abstract).
Journal of the Electrostatics Society, vol. 2, No. 3, 1978, pp. 158-168, Published 1978 (with English Abstract), no month.

(Continued)

*Primary Examiner*—Ronald W Leja
(74) *Attorney, Agent, or Firm*—RatnerPrestia

(57) ABSTRACT

At least two sets of ion-generating means are provided to face each other through a space having an insulating sheet. The first and second surfaces of the sheet are simultaneously irradiated with monopolar ion clouds substantially opposite to each other in polarity generated from the ion-generating means. The sheet is subsequently irradiated with monopolar ion clouds reverse in polarity to that of the previously applied ion clouds, to eliminate the positive and negative charges of both the surfaces of the insulating sheet.

21 Claims, 21 Drawing Sheets

FOREIGN PATENT DOCUMENTS

| | | | |
|---|---|---|---|
| JP | 61-000719 | B | 1/1986 |
| JP | 01-245283 | A | 9/1989 |
| JP | 02-013977 | | 1/1990 |
| JP | 03-087885 | | 4/1991 |
| JP | 08-334735 | | 12/1996 |
| JP | 09-119956 | | 5/1997 |
| JP | 2651476 | | 9/1997 |
| JP | 2651478 | | 9/1997 |
| JP | 10-259328 | | 9/1998 |
| JP | 2001-059033 | | 3/2001 |
| JP | 2001-351795 | A | 12/2001 |
| JP | 2002-313596 | A | 10/2002 |
| JP | 2004-039421 | A | 2/2004 |

OTHER PUBLICATIONS

Handbook of Static Electricity, 1998, pp. 45-46, Published 1998 (w/English Abstract), no month.

The Advance Papers of $17^{th}$ Symposium of Ultra Clean Technology, Ultra Clean Society, pp. 361-363, Published Feb. 5, 1993 (w/English Abstract).

* cited by examiner

STATIC ELIMINATOR AND A STATIC ELIMINATING METHOD FOR AN INSULATING SHEET, A METHOD FOR PRODUCING AND INSULATING SHEET, AND AN INSULATING SHEET

BACKGROUND OF THE INVENTION

1. Field of the Invention

The present invention relates to a static eliminator and a static eliminating method for eliminating charges from an insulating sheet. Furthermore, the present invention relates to a method for producing an insulating sheet using said static eliminator or said static eliminating method, and also to an insulating sheet.

2. Description of the Related Art

The charges of an insulating sheet such as a plastic film can prevent the sheet from being processed as desired. As a result, it can happen that the quality of the processed sheet does not come up to the expected level. For example, in the case where a sheet having locally strong charges and discharge marks called static marks caused by electrostatic discharge is printed or coated with a coating material, the processed sheet has irregularity of the ink or coating material. In a process for producing a metallized film to be used, for example, in a capacitor or for packaging, the processed sheet can have static marks after completion of film processing such as vacuum evaporation or sputtering. The strong charges such as static marks cause the film to adhere to another member due to electrostatic force, hence causing such various problems as miscarriage, positioning failure and disarrangement of cut sheets.

The conventional static eliminators used to obviate such problems include the following: a self-discharge type static eliminator in which a grounded conductor shaped like a brush is brought close to the insulating sheet, to cause corona discharge at the tip of the brush for eliminating charges, and an AC or DC voltage application type static eliminator in which a power-frequency high voltage or DC high voltage is applied to a needle electrode to cause corona discharge for eliminating charges.

A conventional static eliminating method using corona discharge is described below. FIG. 1 is a drawing showing the principle of a conventional static eliminating method for an insulating sheet. In FIG. 1, a static eliminator 1 causes corona discharge by means of an ion generating electrode 1*b* connected to an AC power supply 1*a* and an earth electrode 1*c*, for generating positive ions 301 and negative ions 302 near the ion generating electrode 1*b*. Of the positive and negative ions, the positive ions 301 are attracted by an insulating sheet S due to the Coulomb force 700 acting between the positive ions 301 and the negative charges 102 of the sheet, to be balanced by the negative charges 102. As a result, the negative charges 102 of the insulating sheet S are eliminated.

However, actually, it is not rare that the charges of the sheet S are not eliminated according to the principle. The surface resistivities and volume resistivities of insulating sheets such as polyethylene terephthalate films, polypropylene films and aramid films used as photographic films, capacitor films and magnetic tape films are high. Therefore, the charges once generated in the sheet S can little migrate in the in-plane direction or in the thickness direction of the sheet. For this reason, if the potential of the sheet S rises with a large amount of negative charges accumulated, discharge can be caused between the sheet S and a grounded component used for carrying the sheet S or the like existing near the sheet S. In a sheet with a high surface resistivity and a high volume resistivity, since the migration of charges due to discharge is confined within local sites, it can happen that when discharge occurs, the local negative charges are excessively taken away to form sites having positive charges.

The discharge marks that are the marks of this discharge are static marks. If static marks are formed, there occurs a situation where positive charges 101 and negative charges 102 exist together in the sheet S. As shown in FIG. 2, if charges of positive polarity (positive charges 101) and charges of negative polarity (negative charges 102) are alternately formed at a small pitch, that is, if two kinds of charges with relatively high charge densities but opposite to each other in polarity exist close to each other, there occurs a phenomenon that the lines of electric force 500 attributable to the charges of the sheet S are closed between the respectively adjacent charged sites opposite to each other in polarity. Therefore, there occurs a situation where the Coulomb force 700 little acts on the ions near the static eliminator located a little away from the sheet S. As a result, ions are little attracted by the sheet S, and the charges 101 and 102 in the sheet S are little eliminated.

As shown in FIG. 3, there can be a case where positive charges 101, 201 and negative charges 102, 202 exist in both the surfaces of the sheet S. For example, in the case where a large amount of negative charges 102 exist in the first surface 100 of the sheet S, it can happen that discharge occurs between the sheet S and a grounded component (for example, a carrier roll) located close to the second surface 200 of the sheet. In this case, the negative charges 102 in the first surface 100 of the sheet remain also after discharge as they are, and the discharge causes sites having positive charges 201 to be formed in the second surface 200 of the sheet S. If such discharge occurs on both the first surface 100 and the second surface 200 of the sheet S, there occurs a situation where positively charged sites and negatively charged sites exist together in both the first surface 100 and the second surface 200 of the sheet S as shown in FIG. 3. Also in this case, the lines of electric force 500 attributable to the charges of the sheet S are closed between the negative charges 102 in the first surface 100 and the positive charges 201 in the second surface 200. So, Coulomb force does not act on the ions existing near the static eliminator either, and necessary ions cannot be attracted.

That is, in the case of a sheet having a fine charge pattern, i.e., a sheet where positively charged sites and negatively charged sites are alternately formed at a small pitch in one surface or where they exist together in both the surfaces, the lines of electric force 500 are closed near the sheet S. As a result, the Coulomb force 700 acting on the ions 301 and 302 located a little apart from the sheet S (near the static eliminator) is small, and the ions cannot be attracted toward the sheet S.

Measured charge densities of sheets having positively charged sites and negatively charged sites existing together in both the surfaces are stated in "Transactions on Fundamentals and Materials A (in Japanese), Vol. 112, No. 8, pages 735-740, The Institute of Electrical Engineers of Japan, August 1992 (hereinafter called document DS1)." According to the measured charge densities stated in document DS1, the charge densities in the first surface of a film as an insulating sheet are about $-23\ \mu C/m^2$, and the charge densities in the second surface of the sheet are about $+23\ \mu C/m^2$. In document DS1, the charges of such a film are called "both-side bipolar charges."

On the other hand, the inventors confirmed the local charge densities at sites of sheets having a fine charge pattern such as static marks according to the method described later. As a result, it was found that there exist local sites having charge densities of about several to about 500 $\mu C/m^2$ in absolute value in the respective surfaces, and that there exist some local sites in which the sums of the local charge densities of both the surfaces at the same sites in the in-plane direction of the sheet (apparent charge densities) were about 1 to about 40 $\mu C/m^2$ in absolute value. These values are very large compared with the average charge densities generated due to the frictional electrification in an ordinary sheet production process. The average charge densities are said to be usually in a range from about 0.1 to about 1 $\mu C/m^2$.

Especially it was found that in a fine charge pattern such as static marks, there were sites where the charge densities of the respective surfaces (for example, the charge density on the first surface 100 of a sheet was +500 $\mu C/m^2$, while the charge density on the second surface 200 at the same position was −480 $\mu C/m^2$) were far larger than the apparent charge densities (+20 $\mu C/m^2$ in the above example) (usually about 1 to about 40 $\mu C/m^2$ in absolute value). In the invention, the distribution of the quantities of charges in a sheet is mainly evaluated using the distribution of local charge densities. Unless otherwise stated, a charge density means the value of a local charge density of a sheet. As described above, in a sheet with a charge pattern such as static marks, the sums of charge densities of both the surfaces at the same site in the in-plane direction of the sheet (the apparent charge densities) are greatly different from the values of the charge densities of the respective surfaces at the same site.

In this specification, the sum of the (local) charge densities of both the surfaces at the same site in the in-plane direction of a sheet means the apparent charge density (the charge density identified without considering the distribution in the thickness direction) of the sheet at the site. This definition is important in the invention.

In the case where the apparent charge densities at the respective sites in the in-plane direction of a sheet are zero, the sheet appears to be non-charged, and in the case where they are not zero, the sheet appears to be charged. As described in document DS1, it has been known that an insulating sheet such as a film is bipolar-charged in both the surfaces. However, there is no report that has locally examined charge densities, and the description concerning static elimination relates to the apparent charges of a sheet. On the contrary, in discussing the statically eliminated state of an insulating sheet, the inventors have clarified that it is essentially important to examine both the apparent charge densities and the charge densities of the each surface.

For eliminating charges from an insulating sheet having such a charge pattern, usually a large quantity of the ions from a static eliminator are applied near to the sheet S without resorting to the Coulomb force acting due to the charges of the sheet.

As a technique for eliminating charges from an insulating sheet having such a charge pattern, a static eliminator as shown in FIG. 4 is known. The static eliminator 2 is disclosed in JP 2651476 C (hereinafter called document DS2). In FIG. 4, the static eliminator 2 consists of plural positive and negative ion-generating electrodes 2*b* connected with an AC power supply 2*a* and a planarly spread ion-attracting electrode 2*d* connected with an AC power supply 2*c*, and the positive and negative ion-generating electrodes 2*b* and the ion-attracting electrode 2*d* are installed to face each other through a traveling insulating sheet S. In the static eliminator 2, the positive and negative ion-generating electrodes 2*b* generate positive and negative ions, while high voltages opposite to the positive and negative ion-generating electrodes 2*b* in polarity are alternately applied to the ion-attracting electrode 2*d*, so that the positive and negative ions generated by the positive and negative ion-generating electrodes 2*b* can be attracted by the ion-attracting electrode 2*d*, to be forcibly irradiated to the sheet S.

As a result, positive and negative potentials are alternately induced in the sheet S, and the positive and negative ions from the positive and negative ion-generating electrodes 2*b* are forcibly attracted by the surface of the sheet S. So, it is said that even a sheet with a fine charge pattern can undergo static elimination. It is said that the statically eliminating action of the static eliminator 2 can be confirmed with a negative toner powder (black fine powder) used in a copier or the like to be electrostatically deposited on the sheet.

In this case, since the sheet is a thin insulator, the toner powder is deposited on the sites where the apparent charge densities are high. That is, a site where no toner powder is deposited means a site where the sheet is apparently non-charged (where the apparent charge density is almost zero).

However, the inventors confirmed that even if an insulating sheet is apparently non-charged by such static elimination, the sheet reveals its original charge pattern when it is processed to have a metalized film or to be coated. That is, it was found that the static eliminator 2 of document DS2 could not provide a sufficient static elimination effect. These can be actually confirmed since such defects as the irregularities of ink or coating material, static marks formed after such film processing as vacuum evaporation or sputtering, and disarrangement of cut sheets due to sliding failure actually occur. This is an essential problem, since the static eliminator of document DS2 can eliminate only the apparent charges described before.

This problem is described below in reference to FIGS. 5 to 7. In FIG. 5 and FIG. 6, an ion-generating electrode 2*b* is merely described to simplify the figure. It is assumed that in the sheet undergoing static elimination, positive charges 101 and 201 and negative charges 102 and 202 exist together in the respective surfaces 100 and 200 as shown in FIG. 5. As shown in FIG. 5, when the voltage applied to the positive and negative ion-generating electrode 2*b* is positive while the voltage applied to the ion-attracting electrode 2*d* is negative, the positive ions 301 generated by the positive and negative ion-generating electrode 2*b* are attracted near to the sheet S along the lines of electric force 500 generated by the positive and negative ion-generating electrode 2*b* and the ion-attracting electrode 2*d*, and are deposited on the first surface 100 of the sheet S, to positively charge the sheet S.

In this case, if there sites negative charges 102 exist in the first surface 100 of the sheet S, the positive ions 301 attracted selectively more to the sites than to their surroundings, for eliminating the negative charges. The reason is that since the positive ions 301 are carried near to the sheet S and go into the space where the charges 101, 102, 201 and 202 form the lines of electric force 500 closed near the sheet S, Coulomb force 700 acts between the positive ions 301 and those charges.

As shown in FIG. 5, in the case where the positive and negative charges 101, 102, 201 and 202 exist together in the respective surfaces 100 and 200 of the sheet S, the positive ions 301 are attracted more at the sites where the apparent charge densities are negative. That is, in the case where the positive charges 101 do not exist in the first surface 100 of the sheet S at the same sites in the in-plane direction of the sheet or in the case where even if the positive charges 101 exist, their quantity is smaller than the quantity of the negative charges 102 in the second surface 200 in the in-plane direction of the sheet, the positive ions 301 are attracted not only at the sites where only the negative charges 102 exist in the first surface 100 of the sheet S but also at the sites where the negative charges 202 exist in the second surface 200 of the sheet S.

Then, as shown in FIG. 6, if the voltage applied to the positive and negative ion-generating electrode 2*b* is switched to be negative (the voltage applied to the ion-attracting electrode 2*d* is positive), the negative ions 302 generated by the positive and negative ion-generating electrode 2*b* are attracted near to the sheet S along the lines of electric force 500 generated between the positive and negative ion-generating electrode 2*b* and the ion-attracting electrode 2*d*, and are deposited on the first surface 100 of the sheet S, to negatively charge the sheet S.

In this case, if there are sites having positive charges 101 in the first surface 100 of the sheet S, the negative ions 302 are attracted selectively more to the sites than to their surroundings, for eliminating the positive charges. Also in this case, the negative ions 302 are attracted more at the sites where the apparent charge densities of sheet S are positive.

Therefore, in the case where the negative charges 102 do not exist in the first surface 100 at the same sites in the in-plane direction of the sheet or in the case where even if the negative charges 102 exist, their quantity is smaller than the quantity of the positive charges 201 existing in the second surface 200 in the in-plane direction of the sheet, the negative ions 302 are attracted not only at the sites where the positive charges 101 exist in the first surface 100 of the sheet S but also at the sites where the positive charges 201 exist in the second surface 200 of the sheet S.

Since plural positive and negative ion-generating electrode 2*b* are installed in the traveling direction of the sheet, these actions are alternated, and the first surface 100 (the top surface in FIGS. 5 and 6) of the sheet S is alternately irradiated with positive and negative ions 301 and 302, to be positively and negatively charged, and accordingly the ions which are opposite in polarity to the apparent charges are selectively attracted, and eliminated apparently.

Since the irradiation quantities of positive and negative ions 301 and 302 depend, for example, on the capabilities of individual positive and negative ion-generating electrodes 2*b* and the phase of applied voltage, the total irradiation quantities of the positive and negative ions at the respective sites of the sheet S are different, and macroscopic positive and negative charge irregularity occurs in the sheet S (see FIG. 18 of document DS2). The macroscopic charge irregularity is the apparent charge irregularity and its state can be confirmed using a toner powder as apparent charges.

This occurs since the positive (or negative) ions 301 (or 302) are forcibly applied to the sheet S along the lines of electric force 500 generated by the positive and negative ion-generating electrodes 2*b* and the ion-attracting electrode 2*d*. Since the voltage applied to the positive and negative ion-generating electrodes 2*b* changes alternately, the cyclic irregularity of positive and negative charges occurs in the sheet S. The cycles of the charge irregularity are decided, for example, by the cycles of the applied voltage and the traveling speed of the sheet. The charge irregularity appears in the first surface 100 only of the sheet S. The reason is that the first surface 100 only of the sheet S is irradiated with the positive and negative ions 301 and 302, and this state shows that the sheet is apparently charged.

To eliminate the macroscopic charge irregularity, the static eliminator 2 of document DS2 must include DC and AC static eliminating members 2*e* and 2*f* shown in FIG. 4. The macroscopic charge irregularity can be eliminated if such conditions as the applied voltage and installation positions of the DC and AC static eliminating members are optimized. If the sheet is wound without the DC and AC static eliminating members, the charges are so strong that discharge may occur on the sheet. Since the static eliminator 2 of document DS2 requires such DC and AC static eliminating members, the entire eliminator is large-sized and very costly, and it is difficult to add the eliminator to an existing sheet producing apparatus.

On the other hand, the charged state of the sheet treated to be free from the macroscopic charge irregularity by the DC and AC static eliminating members 2*e* and 2*f* is as shown in FIG. 7. FIG. 7 shows a case where such conditions as the voltage and arrangement of the DC and AC static eliminating members 2*e* and 2*f* are optimized and where the macroscopic positive and negative charge irregularity in the sheet is eliminated. As shown in FIG. 7, the charges in the sheet S are balanced in both the surfaces, and the sheet S is apparently non-charged. However, in the respective surfaces of the sheet S, almost equal quantities of positive and negative charges remain.

The reason why this occurs is that the positive and negative ion-generating electrodes 2*b* are disposed only on the side of the first surface 100 (top surface in FIG. 5) of the sheet S, and hence that at every moment during static elimination, the charges in the second surface 200 (bottom surface in FIG. 5) of the sheet S cannot be decreased. This phenomenon occurs also in the case where the DC and AC static eliminating members 2*e* and 2*f* are used. As a result, the charge densities in the first surface 100 of the sheet S can be eliminated only to such an extent that the charge densities balance the charge densities prevailing in the second surface 200 since before static elimination, i.e., to such an extent that the apparent charge densities become zero.

The inventors measured, according to the method described later, the charge densities remaining in the respective surfaces of the sheet static eliminated by the conventional static eliminator 2. The charge densities at the static mark sites of the second surface 200 were virtually the same as those prevailing before static elimination, i.e., tens of microcoulombs per square meter to about 500 $\mu C/m^2$ in absolute value. The charge densities of the first surface 100 at the same sites (static mark sites) were almost equal to those of the second surface 200 in absolute value, though opposite in polarity, i.e., tens of microcoulombs per square meter to about 500 $\mu C/m^2$ in absolute value though opposite in polarity.

In view of the effect of decreasing the charge densities in the respective surfaces, the static elimination is achieved only to such an extent that the apparent charge densities (several microcoulombs per square meter to 10 $\mu C/m^2$ in absolute value) are made zero. So, it can be said that the static elimination effect is only up to less than 10% of the charge densities of the first surface 100. Rather, such a phenomenon was also confirmed that at a site where the charge density of the second surface 200 was larger than the charge density of the first surface 100 before static elimination in absolute value, the charge density of the first surface 100 increased to such a level that it became equal to the charge density of the second surface 200 after static elimination. It was found that the charges remaining in the first and second surfaces 100 and 200 were the causes of such defects as the irregularity of the coating material, static marks formed after film processing and sliding failure.

This problem is an essential problem peculiar to the static elimination performed only from one surface of a sheet, and even if such conditions as the voltage and arrangement of the DC and AC static eliminating members 2*e* and 2*f* are optimized, the problem cannot be solved. The DC and AC static eliminating members 2*e* and 2*f* are provided only for making the macroscopic charge irregularity appear to be zero.

For example, two static eliminators of document DS2 (static eliminators 2 of FIG. 4) can be installed in the sheet traveling direction, and the two sets, each consisting of the positive and negative ion-generating electrodes 2*b* and the ion-attracting electrode 2*d*, can be arranged at positions facing each other, with the sheet kept between the electrodes 2*b* and the electrode 2*d*, and with one set reversed to the other set in position, in order that the first surface 100 of the sheet is irradiated with ions, and subsequently that the second surface 200 of the sheet is irradiated with ions. Even in this case, there is no effect of decreasing the charges existing in the respective surfaces. The reason is that the static eliminator of document DS2 (static eliminator 2 shown in FIG. 4) is a static eliminator intended for "apparent static elimination" only for eliminating apparent charges as described before. Even if static elimination is carried out for the second surface 200 after the "apparent static elimination" has been completed by the static elimination carried out for the first surface 100, the operation is quite meaningless.

On the contrary, as shown in FIG. 8, known is a static eliminator, in which ion irradiation devices, each consisting of an ion-generating electrode and an ion-accelerating electrode disposed to face each other, are installed reversely to each other in position on the first surface 100 side and the second surface 200 side of an insulating sheet. This static eliminator is disclosed in JP 2002-313596 A (hereinafter called document DS3).

The conventional static eliminator 3 includes an ion-generating electrode 3*b* connected with an AC power supply 3*a* and installed above the first surface 100 of a traveling insulating sheet S and an ion-accelerating electrode 3*d* connected with an AC power supply 3*c* and installed below the second surface 200 of the traveling insulating sheet S. The ion-generating electrode 3*b* and the ion-accelerating electrode 3*d* are installed to face each other with the insulating sheet S kept between them.

The next ion-generating electrode 3*f* connected with an AC power supply 3*e* and installed beside the ion-accelerating electrode 3*d* below the second surface 200 of the sheet S and the next ion-accelerating electrode 3*h* connected with an AC power supply 3*g* and installed beside the ion-generating electrode 3*b* above the first surface 100 of the sheet S, face each other.

In this static eliminator, an AC high voltage is applied to the ion-generating electrode 3*b*, to generate ions, and an AC high voltage opposite in polarity to the voltage applied to the ion-generating electrode 3*b* is applied to the ion-accelerating electrode 3*d*. The ions generated by the ion-generating electrode 3*b* are accelerated and attracted by the ion-accelerating electrode 3*d*, and as a result, the first surface 100 of the sheet S is forcibly irradiated with the ions. Then, an AC high voltage opposite in polarity to that applied to the ion-generating electrode 3*b* is applied to the ion-generating electrode 3*f* to generates the ions, while a high voltage opposite in polarity to that applied to the ion-generating electrode 3*f* is applied to the ion-accelerating electrode 3*h*. The ions generated by the ion-generating electrode 3*f* are accelerated and attracted by the ion-accelerating electrode 3*h*, and as a result, the second surface 200 of the sheet S is forcibly irradiated with the ions. According to this technique, since both the surfaces of the insulating sheet are forcibly irradiated with ions, it is said that the sheet can undergo static elimination even if the sheet has a fine charge pattern.

In this static eliminator, high voltages opposite in polarity to those applied to the ion-generating electrodes 3*b* and 3*f* disposed to face the ion-accelerating electrodes 3*d* and 3*h* respectively are applied to the ion-accelerating electrodes 3*d* and 3*h* restively. However, as shown in document DS3 (FIGS. 4 and 5 show examples of the shape of the ion-accelerating electrodes and FIG. 9 shows the behavior of ions), since the ion-accelerating electrodes are not shaped to allow ion generation, they do not generate ions. This is the reason why the electrodes are called "ion-accelerating electrodes" in document DS3. In this constitution, the irradiation of the first surface 100 and the second surface 200 with ions is carried out alternately, not simultaneously.

According to the inventors' finding, since both the surfaces of the insulating sheet are irradiated with ions alternately, the static eliminator of document DS3 is basically equivalent to the case where two static eliminators of document DS2 described before (static eliminators 2 of FIG. 4) are disposed in the sheet traveling direction, to be reverse to each other in the static elimination side and the non-static elimination side. That is, even in the best mode, quantities of positive and negative ions necessary to make the apparent charge densities zero are merely supplied without greatly affecting the distributions of charge densities existing in the respective surfaces before start of static elimination. In other words, at sites where a fine charge pattern such as static marks exists, a charge pattern opposite in polarity to the static marks of the first surface is merely formed in the second surface for apparent static elimination. That is, even if the static eliminator of document DS3 is used, an effect of greatly decreasing the charges in the respective surfaces where fine charge patterns are formed cannot be obtained.

This is described below in more detail. With regard to the capability of the static eliminator of document DS3 (static eliminator 3 of FIG. 8) to eliminate the charges in the respective surfaces of the sheet S (locally strong charges such as static marks, especially the charges opposite each other in polarity in both the surfaces of the sheet), the following can be said.

It is considered that a case where static elimination is performed at a site of a sheet where a large quantity of positive charges 101 in the first surface 100 and a large quantity of negative charges 202 in the second surface 200 exist as shown in FIG. 9. If the first ion-generating electrode 3*b* close to the first surface 100 of the sheet S generates the negative ions 302 to be sufficiently irradiated to the first surface 100 of the sheet S, and subsequently the second ion-generating electrode 3*f* close to the second surface 200 generates the positive ions 301 to be sufficiently irradiated to the second surface 200 of the sheet S, then the charges in the respective surfaces of the sheet S can be eliminated.

However, actually in the sheet S having the respective surfaces strongly charged opposite to each other in polarity, in the case where the negative ions 302 are irradiated to the first surface 100 of the sheet S as shown in FIG. 9, the positive charges 101 of the first surface 100 are eliminated. As a result, as shown in FIG. 10, the quantity of the negative charges 202 in the second surface 200 is excessive compared with the quantity of the positive charges 101 in the first surface 100.

In the case where a site of the sheet at which the absolute value of negative charge density of the second surface 200 is slightly larger, for example, 1 μC/$m^2$ larger than the absolute value of positive charge density of the first surface 100 is placed in the space between the first ion-generating electrode 3*b* and the ion-accelerating electrode 3*d*, the potential is calculated to be in a range from −10 to −100 kV. This value range refers to a value range in the case where the electrostatic capacity of the sheet S placed in the space between the first ion-generating electrode 3*b* and the ion-accelerating electrode 3*d* is in a range from 10 to 100 pF.

Because of the excessively existing negative charges, the Coulomb force 700 in the direction to shove away the negative ions 302 from the sheet S acts on the negative ions 302, and the negative ions 302 cannot sufficiently reach the sites of the sheet S where the positive charges 101 still exist. Also in the case where the second ion-generating electrode 3*f* generates the positive ions 301 to be irradiated to the second surface 200 of the sheet S, the same phenomenon occurs. As a result, the positive charges 101 of the first surface become excessive, and the positive ions 301 reaching the sheet S decrease.

Even if the respective surfaces of the sheet S are charged to have charge densities of tens of microcoulombs per square meter to about 500 μC/$m^2$ in absolute value, the quantity of ions per square meter that can reach the sheet S is as small as less than about 1 μC/$m^2$, and can little eliminate the charges of the respective surfaces of the sheet S so strongly charged as to have static marks. However, at each site where the apparent charge densities of the sheet are not zero, the charges can be eliminated to such an extent that the apparent charge densities can be made zero.

As a mode of the static eliminator of document DS3, the following constitution is described in FIG. 2 of document DS3. Ion irradiation devices, each consisting of the ion-generating electrode 3*b* and the ion-accelerating electrode 3*d* facing each other, are arranged on both the surface sides of the sheet S, with the electrodes disposed alternately in reverse positions, and on the downstream side, two ion-generating electrodes are arranged to face each other on both the surface sides of the sheet S, one on the first surface 100 side and the other on the second surface 200 side. The ion-generating electrodes disposed downstream to face each other are disposed to eliminate the residual charges (same as the charges of macroscopic charge irregularities of static eliminator 2 of FIG. 4.) However, for example, the dimensions and applied voltages of the ion-generating electrodes disposed downstream to face each other are not disclosed at all in document DS3.

Even if a voltage considered to be appropriate is applied to the ion-generating electrodes disposed to face each other, based on the inventors' finding, it is difficult to obtain a sufficient static elimination effect. For example, if the ion-generating electrode placed on the first surface 100 side of the sheet S generates positive ions to be irradiated to the first surface 100, and the ion-generating electrode placed on the second surface 200 side generates negative ions to be irradiated to the second surface 200, then a static elimination effect can be obtained at sites where the first surface 100 is charged negatively while the second surface 200 is charged positively. However, no static elimination effect can be obtained at the sites where the first surface 100 is charged positively while the second surface 200 is charged negatively.

Since positive charges and negative charges exist together in the respective surfaces of the sheet S in most cases, the charges at all the sites in the respective surfaces of the sheet S cannot be decreased. There are sites where charges can be eliminated and sites where charges cannot be eliminated. Rather, it can happen that in the case where the polarity of charges of the respective surfaces of the sheet S is the same as the polarity of the ions irradiated to the respective surfaces, charges are increased. In the case where the voltages applied to ion-generating electrodes are AC voltages with a low frequency, static elimination effect irregularity and ion irradiation irregularity appear in the traveling direction of the sheet S. On the other hand, in the case where the voltages applied to ion-generating electrodes are AC voltages with a high frequency, the static elimination effect irregularity in the traveling direction of the sheet S is small.

However, in the case where the voltages applied to ion-generating electrodes are AC voltages with a high frequency, as in the case of a static eliminator for a copier described later, since the positive and negative ions generated from ion-generating electrodes are mixed and re-combined with each other before they reach the sheet S, the quantity of ions reaching the sheet S is remarkably decreased. Therefore, the static elimination effect per se is small. So, even if, for example, the dimensions of respective parts and the applied voltage are adjusted based on the inventors' finding, it is difficult to eliminate the positive charges and negative charges existing together in both the surfaces without the irregularity due to the positions in the traveling direction of the sheet S, if one set of ion-generating electrodes, one on the first surface 100 side of the sheet S and the other on the second surface 200 side, are merely disposed.

On the other hand, as a constitution in which static eliminators are disposed to face each other with a charged material positioned between them, a transfer sheet-carrying sheet and a transfer sheet (paper) static eliminator 4 of a copier shown in FIG. 11 is known. The static eliminator 4 is disclosed in JP 03-87885 A (hereinafter called document DS4) or JP 02-13977 A (hereinafter called document DS5).

FIG. 11 is a drawing showing the copier shown in document DS4, as a whole. In FIG. 11, A indicates a section for forming a toner image onto a photosensitive drum; B indicates a section for supplying a transfer sheet 4*a*; C indicates a section for transferring a toner image onto the transfer sheet 4*a* on a transfer sheet-carrying sheet 4*b* wound around a transfer drum; and D indicates a section where the transfer sheet 4*a* having the toner image transferred from the transfer sheet-carrying sheet 4*b* is separated. The description of the details is not made here since it is not concerned with the present invention at all.

In the static eliminator 4 of FIG. 11, wire corotron electrodes positioned outside as corona dischargers 4*c* and 4*d* and wire corotron electrodes positioned inside as corona dischargers 4*e* and 4*f* are installed to face each other on both sides of the transfer sheet 4*a* as a charged material and the transfer sheet-carrying sheet 4*b*. The first purpose of the static eliminator 4 is to more easily separate the transfer sheet 4*a* from the transfer sheet-carrying sheet 4*b*, and the second purpose is to initialize the potential of the transfer sheet-carrying sheet 4*b*.

To achieve the first purpose, an AC voltage (500 Hz, 9.6 kV) is applied to the corona dischargers 4*c* and 4*d*, and a DC voltage (−4 kV) is applied as pulses to the corona discharger 4*e*, while a voltage different by 180° phase from that of the corona dischargers 4*c* and 4*d* is applied to the corona discharger 4*f*. The reason why a DC voltage is applied to the corona discharger 4*e* is that instead of superimpose a DC voltage as a bias on the AC voltage applied to the corona discharger 4*f* in opposite, it is intended to use two independent corona dischargers 4*f* and 4*e*.

With this constitution, the average potentials of the transfer sheet 4*a* and the transfer sheet-carrying sheet 4*b* can be decreased. Since the transfer sheet 4*a* is positively charged in the previous step, a negative voltage is used as the DC voltage to allow easier separation of the transfer sheet-carrying sheet 4*b*. To achieve the second purpose, an AC voltage only is applied to the corona dischargers 4*d* and 4*f*. With regard to the charges of the transfer sheet-carrying sheet 4*b*, it is not necessary to eliminate the charges of both the outer surface and the inner surface. If the charges of the outer surface balance the charges of the inner surface to reduce the apparent potential to almost zero, the purpose can be achieved.

As can be seen from the above description, the technique described in document DS4 is not intended to eliminate charges from a sheet having positively charged sites and negatively charged sites alternately formed at a small pitch in the same plane or a sheet having fine patterns with such sites existing together in both the surfaces. In the paper as a transfer sheet of a copier, such charge patterns are unlikely to be formed.

In the case where such a high frequency is used, the electric field between the top and bottom electrodes little has the capability of forcibly irradiating the sheet with ions. The positive and negative ions 301 and 302 generated by the corona dischargers 4*d* and 4*f* are mixed in the gap between the corona discharger 4*d* and the corona discharger 4*f*. The size of the gap is not clearly stated in document DS4, but according to other documents and the like relating to static eliminators of copiers, it is usually about 20 mm. According to document DS5, it is 22 mm.

Since an AC voltage with a high frequency of 500 Hz is applied in an electrode gap of about 20 mm as described above, a monopolar ion cloud cannot be formed. Since the frequency is high, the positive and negative ions 301 and 302 are mixed with each other, before they reach the first surface 100 and the second surface 200 of the sheet. For this reason, though the sheet is seldom forcibly charged positively or negatively, most of the positive and negative ions 301 and 302 are recombined with each other and vanish, and the quantity of the ions capable of contributing to static elimination becomes very small. That is, in the static eliminators shown in documents DS4 and DS5, though the corona discharger 4*d* and the corona discharger 4*f* are disposed to face each other with a sheet kept between them, a large quantity of ions can be little forcibly irradiated near to the sheet.

As a result, these static eliminators of copiers, like the static eliminator 1 shown in FIGS. 2 and 3, are very low in the capability of eliminating the charges of the respective surfaces of a sheet having positively charged sites and negatively charged sites alternately formed at a small pitch in the same plane or a sheet having such sites existing together on both the surfaces. The techniques can be applied in the case where the sheet traveling speed is as low as several to 10-odd m/min and can be applied to a transfer sheet or paper from which it is not required to eliminate the fine charge patterns in either of the surfaces. The static elimination techniques cannot be applied as techniques for eliminating charges from an insulating sheet such as a film that travels at a high speed of about 50 to about 500 m/min and from which it is necessary to eliminate fine charge patterns in both the surfaces.

Furthermore, in the static eliminators for copiers shown in documents DS4 and DS5, the width of the transfer sheet or paper undergoing static elimination is about 500 mm at the largest, and it is not necessary to consider, for example, the vibration, strength and sagging of electrodes. For this reason, a high voltage is applied to wire electrodes extending in the in-plane direction perpendicular to the traveling direction of the sheet, for causing discharge to generate ions. However, in the case where an insulating sheet such as a film undergoes static elimination, its width is about 1 m at the smallest, and there is even an insulating sheet with a width of about 7 m. When wire electrodes are used for such a wide sheet, the vibration of the electrode and the sagging of the electrode between both the ends cause discharge strength irregularity in the sheet width direction.

For example, in the case where it is intended to increase the ion irradiation dose for the sheet undergoing static elimination, for example, by further shortening the distance between the corona discharger 4*d* and the corona discharger 4*f*, or raising the voltage to be applied, or using a lower frequency, the vibration of the wires increases, and discharge is concentrated at the portion where the distance between the wires facing each other is shortest due to inaccurate parallelism or loosening of wires. As a result, a static elimination effect stable over the entire width of the material undergoing static elimination cannot be obtained. Furthermore, in the case where the voltage is raised, spark discharge occurs between the discharge electrodes (wire electrodes) of the corona dischargers 4*d* and 4*f* or between a discharge electrode and a shield electrode, not allowing a sufficient static elimination capability to be obtained.

In the static eliminators for copiers shown in documents DS4 and DS5, corona dischargers are disposed to face each other, but the principle of static elimination is quite different from the principle that a strong electric field in the direction normal to the insulating sheet is used to forcibly irradiate ions onto the sheet. Therefore, the static elimination irregularity in the traveling direction of the sheet is hard to occur, and no countermeasure against it is discussed at all. For example, in the static eliminator shown in document DS4 (the static eliminator 4 of FIG. 11), two sets of corona dischargers facing each other are installed one after another in the traveling direction of the material undergoing static elimination (transfer sheet or paper), but as described before, this constitution is intended to provide different functions of easier separation and potential initialization, and is not employed to give any effect, for example, against the static elimination effect irregularity in the traveling direction of the sheet.

In recent years, insulating sheets such as polyester films are used in many applications as magnetic recording materials, various photographic materials, insulating materials and various process materials, since they have excellent properties such as heat resistance, chemicals resistance and mechanical properties. For this reason, they are required to have surface properties suitable for respective applications, and they are covered with various materials. For example, the sheets are thinly coated on their surfaces with a magnetic paint, ink-like paint, lubricating paint, releasing paint, or hard coating material, to form a coating layer.

For the coating process for forming such a coating layer, it is proposed to install a static eliminator in any of various coaters such as roll coater or gravure coater, for eliminating the charges from an insulating sheet before start of coating, or to eliminate charges from the sheet and a coating solution simultaneously before the coating solution applied as a paint is dried after coating. These proposals are described in JP 08-334735 A (hereinafter called document DS6) and JP 10-259328 A (hereinafter called document DS7). As the quantity of charges of a sheet for obviating the occurrence of coating irregularities, document DS6 states it is preferred that the surface potentials of the sheet are in a range from 0 to 80 V, and document DS7 states it is preferred that the surface potentials of the sheet are in a range from 0 to 2 kV.

In these conventional techniques, the surface potential refers to a value measured while the sheet is carried in air. Hereinafter this surface potential is called an aerial potential. In the state where a sheet is carried in air, since the thickness of the sheet is sufficiently small compared with the distance between the sheet and a grounded component, the surface potential corresponding to the sum of charges is measured without discriminating the charges of the first surface of the sheet from the charges of the second surface. That is, in these conventional techniques, the aerial potential relates to apparent charges (the apparent charge densities). Therefore, in the conventional techniques, the charge densities of the respective surfaces of a sheet are not taken into account at all.

The visual field of a general electrostatic voltmeter used for measuring the aerial potential is usually a virtually circular area portion having a diameter of tens of millimeters to tens of centimeters, and the value of the measured potential is detected as an average value of potentials in the visual field. This matter is described in the catalogue (in Japanese) for Digital Low Potential Measuring Instrument KSD-0202 produced by Kasuga Electric Works Ltd (hereinafter called document DS8). In a dense charge pattern having positive and negative charges existing together peculiar to an insulating sheet, the positive and negative charges are averaged within the range of the visual field, and the aerial potential appears to be almost zero. With these as causes, even in a sheet having a low aerial potential according to the conventional techniques, it can happen that numerous positive and negative changes exist in the sheet actually, and in this case, coating irregularity occurs in the coating layer.

As described above, even if the above-mentioned sheet having positively and negatively charged sites alternately formed at a small pitch or having such sites existing together in both the surfaces has its charges controlled in reference to the aerial potential, the control is not sufficient. Much less, the coating irregularity can never be prevented.

The following describes why an apparently non-charged sheet having both the surfaces equally charged though opposite in polarity (in this case, the aerial potential is also zero) poses a problem and why coating irregularity occurs.

In a coating process, for example, when a die coater is used, the sheet travels, for example, with its second surface kept in contact with a backup roll. In this state, a coater roll is used to coat the first surface of the sheet. Since the sheet is kept in contact with the backup roll, stable traveling is assured to stabilize coating work, and a coating layer having uniform thickness can be formed. As the material of the backup roll, a metallic material is often used since the roll is required to be mechanically precise and to have durability such as wear resistance. Therefore, one surface of the sheet is kept in contact with the metallic surface of the backup roll, and the other surface is coated to have a coating film.

It is considered that a sheet having the first surface and the second surface charged equally though opposite in polarity (apparently non-charged sheet). The charges of the second surface in contact with the metallic surface induce an equal quantity of charges opposite in polarity in the surface of the metal that is a conductor. The induced charges opposite in polarity apparently cancel out the charges in the second surface. On the other hand, the charges in coating surface (the first surface) also induce charges opposite in polarity in the surface of the metal. However, since the surface of the metal is far in this case, the quantity of charges induced is smaller. Therefore, the induced charges opposite in polarity do not perfectly cancel out the charges of the first surface, and the charges actively exist in the coating surface (the first surface).

In this way, "the apparently non-charged" sheet have charges actively existing in the first surface above the backup roll during coating. Therefore, coating irregularity occurs. That is, even in an apparently non-charged sheet, as far as charges exist in the respective surfaces of the sheet, coating irregularity can occur. This phenomenon occurs also similarly in the carrier roll or drying roll used after coating.

As described above, even if the aerial potential of a sheet is kept low as in the prior art, and furthermore, even if apparent charges are used for control, the prior art cannot prevent coating irregularity.

SUMMARY OF THE INVENTION

An object of the invention is to solve the above-mentioned problems of the prior art by providing a static eliminator and a static eliminating method for easily eliminating the positively and negatively charged sites alternately formed at a small pitch in either surface or both the surfaces of a sheet. Another object of the invention is to provide a method for producing an insulating sheet liberated from the positively and negatively charged sites alternately formed at a small pitch in the surfaces of the sheet to such an extent that no problem occurs at least in the processing of the surfaces of the sheet or in the processed sheet, and also to provide an insulating sheet with such surface properties. When the insulating sheet is coated with a coating material on a surface to form a coating layer, coating irregularity or repellent coating is hard to occur. Furthermore, a sheet having a metallic layer formed on a surface of the insulating sheet is hard to cause the problem of disarrangement of cut sheets.

These and other objects of the present invention are achieved by the present invention described below.

In accordance with the present invention, there is provided a static eliminator for an insulating sheet, in which at least two static eliminating units are provided in the traveling path of an insulating sheet with an interval kept between them in the traveling direction of the sheet; each of the respective static eliminating units has a first electrode unit and a second electrode unit disposed to face each other through the sheet; the first electrode unit has a first ion-generating electrode and a first shield electrode having an opening near the pointed ends of the first ion-generating electrode; and the second electrode unit has a second ion-generating electrode and a second shield electrode having an opening near the pointed ends of the second ion-generating electrode, wherein at each of the respective static eliminating units, (a) the voltage applied to the first ion-generating electrode and the voltage applied to the second ion-generating electrode are substantially opposite to each other in polarity, and (b) at each position in the width direction of the sheet, if the interval between the pointed end of the first ion-generating electrode and the pointed end of the second ion-generating electrode in the traveling direction of the sheet is $d_0$ (in mm), the distance between the pointed end of the first ion-generating electrode and the pointed end of the second ion-generating electrode in the direction normal to the sheet is $d_1$ (in mm), the shortest distance between the first shield electrode and the second shield electrode in the direction normal to the sheet is $d_3$ (in mm), and the average value of the widths of the opening of the first shield electrode and the opening of the second shield electrode in the traveling direction is $d_4$ (in mm), then the following formula (I)

$$d_0<1.5\times d_1^2/(d_3\times d_4) \quad (I)$$

is satisfied. This static eliminator is called a first static eliminator.

In the first static eliminator, it is preferable that the voltages applied to the first ion-generating electrodes of the respective static eliminating units and the voltages applied to the second ion-generating electrodes of the respective static eliminating units are supplied from respective single AC power supplies, or from respective groups of plural AC power supplies synchronous with each other in the group with a zero or predetermined potential difference. This static eliminator is called a second static eliminator.

In the first static eliminator, it is preferable that the first ion-generating electrode and the second ion-generating electrode of each of the respective static eliminating units are arrays of needle electrodes. This static eliminator is called a third static eliminator.

In the first static eliminator, it is preferable that the first shield electrode comprises a first rear shield electrode disposed on the rear side of the first ion-generating electrode, and the second shield electrode comprises a second rear shield electrode disposed on the rear side of the second ion-generating electrode. This static eliminator is called a fourth static eliminator.

In the fourth static eliminator, it is preferable that in the first shield electrode, a first insulating member is provided between the first ion-generating electrode and the first rear shield electrode, and/or in the second shield electrode, a second insulating member is provided between the second ion-generating electrode and the second rear shield electrode. This static eliminator is called a fifth static eliminator.

In the first static eliminator, it is preferable that at each position in the width direction of the sheet, at any two adjacent static eliminating units, if the static eliminating unit interval between the middle point of the line segment connecting the pointed end of the first ion-generating electrode with the corresponding pointed end of the second ion-generating electrode of one of the two adjacent static eliminating units, and the corresponding middle point of the other static eliminating unit in the traveling direction of the sheet is $d_2$ (in mm), the following formula (II)

$$d_2<12\times d_1^2/(d_3\times d_4) \quad (II)$$

is satisfied. This static eliminator is called a sixth static eliminator.

In accordance with the present invention, there is provided a static eliminator for an insulating sheet, in which at least two static eliminating units are provided in relation with a virtual plane, with an interval kept between them in a predetermined direction along the virtual plane; each of the static eliminating units has a first electrode unit and a second electrode unit disposed to face each other through the plane; the first electrode unit has a first ion-generating electrode and a first shield electrode having an opening near the pointed ends of the first ion-generating electrode; and the second electrode unit has a second ion-generating electrode and a second shield electrode having an opening near the pointed ends of the second ion-generating electrode, wherein at each of the static eliminating units, the first ion-generating electrode and the second ion-generating electrode are disposed to face each other through the plane substantially symmetrically with the virtual plane, and the voltage applied to the first ion-generating electrode and the voltage applied to the second ion-generating electrode are substantially opposite to each other in polarity. This static eliminator is called a seventh static eliminator.

In accordance with the present invention, there is provided a static eliminating method for an insulating sheet, comprising the step of simultaneously irradiating the first surface and the second surface of an insulating sheet with respective monopolar ion clouds substantially opposite to each other in polarity at respective sites of the sheet, and the step of simultaneously irradiating the first and second surfaces with respective monopolar ion clouds reverse in polarity to those applied before at said site of the sheet. This static eliminating method is called a first static eliminating method.

In accordance with the present invention, there is provided a static eliminating method for an insulating sheet, in which the first surface of an insulating sheet is irradiated with a monopolar first ion cloud reversing in polarity with the lapse of time while the sheet travels, and the second surface of the sheet is irradiated with a monopolar second ion cloud reversing in polarity with the lapse of time, but substantially opposite in polarity to the first ion cloud, simultaneously with the first ion cloud, wherein the first and second ion clouds are reversed in polarity so that while respective sites of the sheet in the traveling direction pass through the region irradiated with the first and second ion clouds, the first and second ion clouds are reversed in polarity once or more. This static eliminating method is called a second static eliminating method.

In accordance with the present invention, there is provided a static eliminating method for an insulating sheet, in which the first surface and the second surface of an insulating sheet are simultaneously irradiated with a pair of monopolar ion clouds substantially opposite to each other in polarity by a predetermined number of times, while the sheet travels, wherein the pair of ion clouds are applied so that the respective numbers of times of irradiating the first and second surfaces with a positive ion cloud and a negative ion cloud are not less than ¼ of said predetermined number of times at respective sites of the sheet. This static eliminating method is called a third static eliminating method.

In accordance with the present invention, there is provided a static eliminating method for an insulating sheet, in which the first surface of an insulating sheet is irradiated with a group of first monopolar ion clouds smoothly reversing in polarity with the lapse of time, and the second surface of the sheet is simultaneously irradiated with a group of second monopolar ion clouds smoothly reversing in polarity with the lapse of time but substantially opposite in polarity to the first group of ion clouds, wherein in sites of ⅔ or more at all the sites in the traveling direction of the sheet, the respective groups of ion clouds are irradiated in such a manner that the polarity of the ion clouds corresponding to ¼ or more of the ion clouds in each of the first and second groups of ion clouds can be opposite to the polarity of the other ion clouds in the group. This static eliminating method is called a fourth static eliminating method.

In accordance with the present invention, there is provided a static eliminating method for an insulating sheet, in which an insulating sheet is made to travel between the first and second ion-generating electrodes of the respective static eliminating units in the static eliminator for an insulating sheet as set forth in claim 6, while both the surfaces of the sheet are irradiated with the positive and negative ions generated from the first and second ion-generating electrodes, wherein where respective AC voltages of the same phase are applied to the first and second ion-generating electrodes of the respective static eliminating units, and if the frequency of the AC voltages is f (in Hz) and an effective value of the potential difference between the first and second ion-generating electrodes is 2V (in V), then the following formulae (III) and (IV)

$$90d_1 \leqq V \leqq 530d_1 \quad \text{(III)}$$

$$0.00425 \times d_1^2 \times f \leqq V \leqq 0.085 \times d_1^2 \times f \quad \text{(IV)}$$

are satisfied. This static eliminating method is called a fifth static eliminating method.

In the fifth static eliminating method, it is preferable that if the traveling speed of the sheet is u (in mm/sec) and at each position in the width direction of the sheet, the interval between the middle point of the line segment connecting the pointed end of the first ion-generating electrode with the corresponding pointed end of the second ion-generating electrode of the most upstream static eliminating unit, and the corresponding middle point of the most downstream static eliminating unit in the traveling direction of the sheet, i.e., the sum of all the static eliminating unit intervals $d_2$ from the most upstream static eliminating unit to the most downstream static eliminating unit is $D_2$ (in mm), the following formula (V)

$$D_2 > u/f \quad \text{(V)}$$

is satisfied. This static eliminating method is called a sixth static eliminating method.

In the fifth static eliminating method, it is preferable that at sites of ⅔ or more of all the sites in the traveling direction of the sheet, said AC voltages are applied to the respective first and second ion-generating electrodes of n static eliminating units, where n is the total number of static eliminating units, in such a manner that the polarity of the potentials of the ion-generating electrodes of static eliminating units as many as not smaller than the number obtained from formula $(n-0.0006/d_f)/2$ {where $d_f$ (in m) is the thickness of the sheet} and not smaller than 0, said potentials working while the each of said sites passes directly under the ion-generating electrodes of said specified number of static eliminating units, can be opposite to the polarity of the potentials of the other ion-generating electrodes of the static eliminating units concerned, said potentials working while the said portion passes directly under the ion-generating electrodes of the other static eliminating units. This static eliminating method is called a seventh static eliminating method.

In accordance with the present invention, there is provided a static eliminating method for an insulating sheet, in which while an insulating sheet is made to travel between the first and second ion-generating electrodes of the respective static eliminating units in the static eliminator for an insulating sheet as set forth in claim 1, both the surfaces of the sheet are irradiated with the positive and negative ions generated from the first and second ion-generating electrodes of the respective static eliminating units, characterized in that in the case where a voltage is applied to each of the respective first and second ion-generating electrodes of the respective static eliminating units, if the frequency of the voltage is f (in Hz) and the one-side peak voltage is Vp (in V), then the following formulae (VI) and (VII)

$$130 \times d_1 \leqq Vp \leqq 750 \times d_1 \quad \text{(VI)}$$

$$0.120 \times d_1^2 \times f \leqq Vp \quad \text{(VII)}$$

are satisfied and the voltage is applied to each of the respective ion-generating electrodes in such a manner that in the case where a portion of the sheet is considered, the polarity of the potentials of the ion-generating electrodes of static eliminating units corresponding to ¼ or more of static eliminating units, said potentials working while the said portion passes directly under the ion-generating electrodes of the specified number of static eliminating units can be opposite to the polarity of the potentials of the ion-generating electrodes of the other static eliminating units concerned, said potentials working while the said portion passes directly under the ion-generating electrodes of the other static eliminating units. This static eliminating method is called an eighth static eliminating method.

In accordance with the present invention, there is provided a static eliminating method for an insulating sheet, in which while an insulating sheet is made to travel between the first and second ion-generating electrodes of the respective static eliminating units in the first static eliminator, both the surfaces of the sheet are irradiated with the positive and negative ions generated from the first and second ion-generating electrodes of the respective static eliminating units, characterized in that in the case where AC voltages smoothly changing in polarity are applied to the respective first and second ion-generating electrodes of the respective static eliminating units, if the frequency of the AC voltages is f (in Hz) and an effective value of the potential difference between the first and second ion-generating electrodes is 2V (in V), then the following formulae (VIII) and (IX)

$$90 \times d_1 \leqq V \leqq 530 \times d_1 \quad \text{(VIII)}$$

$$0.085 \times d_1^2 \times f \leqq V \quad \text{(IX)}$$

are satisfied and in the case where a portion of ⅔ or more is considered in the traveling direction of the sheet, the AC voltages are applied to the respective first and second ion-generating electrodes in such a manner that the polarity of the potentials of the ion-generating electrodes of static eliminating units corresponding to ¼ or more of the static eliminating units, said potentials working while the said portion passes directly under the ion-generating electrodes of the specified number of static eliminating units can be opposite to the polarity of the potentials of other ion-generating electrodes of the static eliminating unit concerned, said potentials working while the said portion passes directly under the ion-generating electrodes of the other static eliminating units. This static eliminating method is called a ninth static eliminating method.

In accordance with the present invention, there is provided a static eliminating method for an insulating sheet, in which while an insulating sheet is made to travel between the first and second ion-generating electrodes of the respective static eliminating units in the first static eliminator, both the surfaces of the sheet are irradiated with the positive and negative ions generated from the first and second ion-generating electrodes of the respective static eliminating units, wherein where AC voltages smoothly changing in polarity are applied to the respective first and second ion-generating electrodes of the respective static eliminating units, if the frequency of the AC voltages is f (in Hz) and an effective value of the potential difference between the first and second ion-generating electrodes is 2V (in V), then the following formulae (X) and (XI)

$$90 \times d_1 \leqq V \leqq 530 \times d_1 \quad \text{(X)}$$

$$0.085 \times d_1^2 \times f \leqq V \quad \text{(XI)}$$

are satisfied and in the case where a portion of ⅔ or more is considered in the traveling direction of the sheet, the AC voltages are applied to the respective first and second ion-generating electrodes of n static eliminating units (where n is the total number of static eliminating units) in such a manner that the polarity of potentials of the ion-generating electrodes of static eliminating units as many as not smaller than the number obtained from formula $(n-0.003/d_f)/2$, where $d_f$ (in m) is the thickness of the insulating sheet, and not smaller than 1, said potentials working while the said portion passes directly under the ion-generating electrodes of the specified number of static eliminating units, can be opposite to the polarity of the potentials of the other ion-generating electrodes of the static eliminating units concerned, said potentials working while the said portion passes directly under the ion-generating electrodes of the other static eliminating units. This static eliminating method is called a tenth static eliminating method.

In the ninth static eliminating method, it is preferable that at each position in the width direction of the sheet, if the any interval between the middle point of the line segment connecting any of the pointed ends of the first ion-generating electrodes with the corresponding pointed ends of the second ion-generating electrodes of one of any two adjacent static eliminating units, and the corresponding middle point of the other static eliminating unit is constant value, i.e., the any eliminating unit intervals $d_2$ is constant value $d_{20}$ (in mm), and the AC voltages substantially identical in phase are applied respectively to the first and second ion-generating electrodes of the respective static eliminating units, in such a manner that if the traveling speed of the sheet is u (in mm/sec), the frequency of the AC voltages is f (in Hz) and the total number of the static eliminating units is n, then the value of X is represented by the following formula (XII)

$$X=|\sin(n\pi fd_{20}/u)/\{n\cdot\sin(\pi fd_{20}/u)\}|(ku\neq fd_{20},\text{ where } k=1,2,3,\ldots)=1(ku=fd_{20}) \quad \text{(XII)}$$

and the value of X satisfies $0\leqq X<0.5$. This static eliminating method is called an eleventh static eliminating method.

In accordance with the present invention, there is provided a static eliminating method for an insulating sheet, wherein in the predetermined period of starting and/or ending the traveling of an insulating sheet, the second or fifth static eliminating method is used for eliminating charges from the sheet, and in the steady traveling state of the sheet, the third, fourth, ninth or tenth static eliminating method is used for eliminating charges from the sheet. This static eliminating method is called a twelfth static eliminating method.

In the fifth, eighth or tenth static eliminating method, it is preferable that in the case where a DC potential difference is established between the first and second shield electrodes of the respective static eliminating units, if the DC potential difference is Vs (in V), the following formula (XIII)

$$|Vs|/d_3<5 \quad \text{(XIII)}$$

is satisfied. This static eliminating method is called a thirteenth static eliminating method.

In any one of the first through fifth, eighth and tenth static eliminating method, it is preferable static elimination is carried out so that the rear side equilibrium potentials of the first surface and the rear side equilibrium potentials of the second surface at the respective sites in the plane of the insulating sheet may be respectively in a range from −340 V to 340 V. This static eliminating method is called a fourteenth static eliminating method.

In the fourteenth static eliminating method, it is preferable static elimination is carried out so that the rear side equilibrium potentials of the first surface and the rear side equilibrium potentials of the second surface may be respectively in a range from −200 V to 200 V. This static eliminating method is called a fifteenth static eliminating method.

In accordance with the present invention, there is provided a method for producing a charge-eliminated insulating sheet, comprising the step of eliminating charges from an insulating sheet by any one of the first through fifth, eighth, ninth and tenth static eliminating method.

In accordance with the present invention, there is provided a charge-eliminated insulating sheet, wherein both the charge densities of the first surface of the sheet and the charge densities of the second surface change smoothly cyclically in the longitudinal direction of the sheet; the amplitudes in the change of the respective charge densities are in a range from 1 to 150 $\mu C/m^2$; and the charges of the first surface and the charges of the second surface at respective sites in the in-plane direction of the sheet are opposite to each other in polarity. This sheer is called a first sheet.

In the first sheet, it is preferable that the amplitudes are in a range from 2 to 30 $\mu C/m^2$. This sheet is called a second sheet.

In the first sheet, it is preferable that both the charge densities of the first surface and the charge densities of the second surface change in cycles of 10 to 100 mm. This sheet is called a third sheet.

In accordance with the present invention, there is provided a charge-eliminated insulating sheet, wherein the rear side equilibrium potentials of the first surface and the rear side equilibrium potentials of the second surface at respective sites of an insulating sheet are respectively in a range from −340 V to 340 V, and that the charges of the first surface and the charges of the second surface at respective sites in the in-plane direction of the sheet are opposite to each other in polarity. This sheet is called a fourth sheet.

In the fourth sheet, it is preferable that the rear side equilibrium potentials of the first surface and the rear side equilibrium potentials of the second surface are respectively in a range from −200 V to 200 V. This sheet is called a fifth sheet.

In the first sheet, it is preferable that the sums of the charge densities of the first surface and the charge densities of the second surface at respective sites in the in-plane direction of the sheet, i.e., apparent charge densities at respective sites of the sheet, are in a range from −2 to 2 $\mu C/m^2$. This sheet is called a sixth sheet.

In the fourth sheet, it is preferable that the sums of the charge densities of the first surface and the charge densities of the second surface at respective sites in the in-plane direction of the sheet, i.e., apparent charge densities at respective sites of the sheet, are in a range from −2 to 2 $\mu C/m^2$. This sheet is called a seventh sheet.

Typical examples of the insulating sheet include a plastic film, fabric and paper. The sheet can be fed from a long sheet wound as a roll or sheet by sheet. Examples of the plastic film include a polyethylene terephthalate film, polyethylene naphthalate film, polypropylene film, polystyrene film, polycarbonate film, polyimide film, polyphenylene sulfide film, nylon film, aramid film, polyethylene film, etc. In general a plastic film has high insulation performance compared with sheets of other materials. The static elimination technique provided by the invention can be effectively used for eliminating charges from a plastic film, especially for eliminating the positively and negatively charged sites alternately formed at a small pitch in the surfaces of the film.

In the invention, “the traveling path of an insulating sheet” means a space through which the insulating sheet passes for being liberated from charges.

In the invention, “the direction normal to an insulating sheet” means the direction normal to the plane free from sagging in the width direction, which plane is assumed to be the insulating sheet traveling in the traveling path.

In the invention, “the virtual plane” means a predetermined plane virtually assumed between first and second ion-generating electrodes. In the case where the insulating sheet traveling in the traveling path is assumed to be a plane free from sagging in the width direction, and where the position of the insulating sheet in the direction normal to the sheet varies with the traveling of the sheet, it can happen that the plane of the sheet assumed to be in the temporally averaged position agrees with the virtual plane.

In the invention, “the width direction” means the direction corresponding to the in-plane direction of the virtual plane, perpendicular to the traveling direction of the insulating sheet or perpendicular to the direction of predetermined row direction of disposed static eliminating units.

In the invention, “the pointed end of ion-generating electrode” means the region that forms an electric field capable of generating ions, among respective portions of the ion-generating electrode and that is nearest to the virtual plane. The ion-generating electrode is often extended in the width direction. In this case, “the pointed ends” are determined at the respective positions in the width direction.

For example, in the case where the ion-generating electrode is substituted by a wire electrode formed by a wire extending in the width direction of the sheet, the regions among the wire nearest to the virtual plane at the respective positions in the width direction correspond the regions. In the case where the ion-generating electrode is an array of needle electrodes installed at predetermined intervals in the width direction and extending in the direction normal to the insulating sheet, the region among respective portions of the respective needle nearest to the virtual plane (the tips of the respective needle electrodes) correspond to the regions at those position in the width direction. At positions in the width direction where no tip of needle exist, “the pointed ends of the ion-generating electrodes” are defined at the respective positions on a polygonal line 5*d*L connecting the respective tips of the needle electrodes provided at predetermined intervals in the width direction as shown in FIG. 18A. The polygonal line 5*d*L is called the virtual line of the pointed ends of the ion-generating electrodes. At positions in the width direction where the tips of the needle electrodes exist, the positions on the virtual line of the pointed ends of the ion-generating electrodes agree with the tips of the needle electrodes.

In the case where two or more electrodes capable of generating ions exist in the traveling direction of the sheet within the opening of one shield electrode, for example, in the case where two wires are extended, the average position of the pointed ends of the two or more ion-generating electrodes at each position in the width direction is considered as the pointed end of the ion-generating electrode at the position in the width direction.

In the invention, “first and second ion-generating electrodes are disposed to face each other” means that the first and second ion-generating electrodes face each other through the sheet traveling path or the virtual plane, and that at each position in the width direction there exists no conductor such as a shield electrode between the position of the feet of the perpendiculars from the pointed end of the first ion-generating electrode to the plane including the position of the pointed end of the second ion-generating electrode and parallel to the virtual plane, and the position of the pointed end of the second ion-generating electrode.

In the invention, “ions” mean various charge carriers such as electrons, atoms gaining or losing electrons, molecules having charges, molecular clusters and suspended particles.

In the invention, “an ion cloud” means a group of ions generated by ion-generating electrode, which spreads and floats in a certain space like a cloud without staying in a specific place.

In the invention, “a monopolar ion cloud” means an ion cloud in which the quantity of positive or negative ions is overwhelmingly larger the quantity of the ions opposite in polarity. Usually when the ion-generating electrode is positive in potential, a positive monopolar ion cloud is formed near the ion-generating electrode, and when ion-generating electrode is negative in potential, a negative monopolar ion cloud is formed near the ion-generating electrode. However, if the polarity of the voltage of the ion-generating electrode is reversed twice or more till the ions generated near the ion-generating electrode reach the insulating sheet, there occurs such a phenomenon that positive and negative ions exist together between the ion-generating electrode and the insulating sheet. In this case, the positive and negative ions are recombined with each other to lower the concentrations of ions, and whenever the polarity is reversed, the direction of Coulomb force to the ions is also reversed. As a result, the ion cloud irradiated to the insulating sheet cannot be monopolar any more.

In the invention, “an ion-generating electrode” means an electrode capable of generating ions in the air near the pointed ends of the electrode due to, for example, the corona discharge caused by application of a high voltage. In the invention, “a shield electrode” means an electrode disposed near ion-generating electrode, to give an adequate potential difference between the shield electrode and the ion-generating electrode, for assisting the corona discharge at the pointed ends of the ion-generating electrode.

In the invention, “first and second ion-generating electrodes are disposed to face each other substantially symmetrically with virtual plane” means that the first and second ion-generating electrodes face each other through the virtual plane and that at each position in the width direction, the distance between the positions of the feet of the perpendiculars from the pointed ends of the first and second ion-generating electrodes to the virtual plane is shorter than the distance between the positions of the feet of the perpendicular from the pointed end of the first ion-generating electrode and the second shield electrode to the virtual plane, and also shorter than the distance between the positions of the feet of the perpendiculars from the pointed end of the second ion-generating electrode and the first shield electrode to the virtual plane.

In the invention, “a charge pattern” means a state where at least a part of the insulating sheet is locally positively and/or negatively charged. This state can be referred to a pattern formed by a fine powder (toner) or the like owing to the charged state by the method disclosed, for example, in JP 09-119956 A (hereinafter called document DS9) or JP 2001-59033 A (hereinafter called DS10).

In the invention, “apparent charge density” means the sum of the local charge density of both the surfaces at the same site in the in-plane direction of insulating sheet. The local charge density means the charge density of circular area portion having a diameter about 6 mm or less, more preferably a diameter 2 mm or less.

In the invention, "being apparently non-charged" means a state where the apparent charge densities at respective sites in the in-plane direction of an insulating sheet are substantially zero (−2 to 2 $\mu C/m^2$).

In the invention, "charges are apparently eliminated" means a state where sites of a sheet substantially non-zero (less than −2 $\mu C/m^2$ or more than +2 $\mu C/m^2$) in the apparent charge densities are made apparently non-charged by means of static elimination.

In the invention, "the rear side equilibrium potential" of the first surface of an insulating sheet means the potential of the first surface measured when the measuring probe of a electrostatic voltmeter is sufficiently kept as close as keeping a clearance of about 0.5 to about 2 mm to the first surface in such a condition that a grounded conductor is kept in contact with the second surface to induce the charges in the grounded conductor to ensure that the potential of the second surface may be substantially kept at zero. The measuring probe of the electrostatic voltmeter has as small as less than two millimeters in the diameter of the opening for measurement. The probe can be, for example, probe 1017 (opening diameter 1.75 mm) or 1017EH (opening diameter 0.5 mm) produced by Monroe Electronics, Inc.

In the invention, keeping the rear surface (second surface) of the insulating sheet in contact with a grounded conductor means that both of them are kept in tight contact with each other in such a state that there is no clear air layer between the insulating sheet and the metallic roll. This state means that the thickness of the air layer remaining between both of them is 20% or less of the thickness of the sheet and 10 μm or less.

To obtain the distribution of the rear side equilibrium potential in the first surface, either the probe of the electrostatic voltmeter or the sheet having the grounded conductor kept in contact with its rear surface (second surface) is made to travel at a low speed (about 5 mm/sec) using a moving means capable of being adjusted in position such as an XY stage, to measure the rear side equilibrium potential one after another, and the obtained data are one-dimensionally or two-dimensionally mapped. The rear side equilibrium potential of the second surface can also be measured similarly.

In the invention, each potential is a potential from a grounded point, unless otherwise stated.

In the invention, "synchronization" means that the respective static eliminating unit intervals of two adjacent static eliminating units are integer times of the traveling distance of the insulating sheet per one cycle of the applied AC voltage. Furthermore, "superimposition" means that at a certain site of the insulating sheet, the ions irradiated by respective static eliminating units are superimposed.

In the invention, "synchronous superimposition" means that all the static eliminating unit intervals are integer times of the traveling distance of an insulating sheet per cycle of the applied AC voltage. In this case, when a certain site of the insulating sheet passes directly under the electrodes of respective static eliminating unit, all the ion-generating electrodes on one side generate ions of the same polarity, and charges of the same polarity are superimposed at the site.

In the invention, "synchronous superimposition intensity" expresses the intensity of polar concentrated degree of the ion clouds irradiated from respective static eliminating units to respective site of an insulating sheet, as a relative value with the value in the case of synchronous superimposition as one.

In the invention, parameters $d_0$, $d_1$, $d_2$, $d_3$, $d_4$, and $D_2$ expressing the positional relations of the respective electrodes and respective static eliminating units are defined as each position in the width direction as shown in FIGS. 17, 18A and 18B. In FIGS. 18A and 18B, the first static eliminating unit is shown as the typical unit. As symbol for distinguishing the positions of the static eliminating units, suffix is used. Suffix "1" in FIGS. 18A and 18B signifies that that belongs to the first static eliminating unit. To express the ion-generating electrode facing the first surface of the sheet, symbol d is used, and to express the ion-generating electrode facing the second surface of the sheet, symbol f is used. Furthermore, to express the shield electrode facing the first surface of the sheet, symbol g is used, and to express the shield electrode facing the second surface of the sheet, symbol h is used.

In the invention, "electrode discrepancy $d_0$-1" of first static eliminating unit means a gap between the pointed end of the first ion-generating electrode 5*d*-1 and the pointed end of the second ion-generating electrode 5*f*-1 in the traveling direction of the sheet.

In the invention, "normal direction inter-electrode distance $d_1$-1" of first static eliminating unit means the distance between the pointed end of the first ion-generating electrode 5*d*-1 and the pointed end of the second ion-generating electrode 5*f*-1 in the direction normal to the insulating sheet.

In the invention, "static eliminating unit interval $d_2$-1" means the interval between the middle point 5*x*-1 of the line segment connecting the pointed end of the first ion-generating electrode 5*d*-1 of first static eliminating unit with the pointed end of the second ion-generating electrode 5*f*-1 of first static eliminating unit, and the middle point 5*x*-2 (not shown in the drawing) of the line segment connecting the pointed end of the first ion-generating electrode 5*d*-2 (not shown in the drawing) of the static eliminating unit adjacent to said static eliminating unit (second static eliminating unit) with the pointed end of the second ion-generating electrode 5*f*-2 (not shown in the drawing) of the static eliminating unit adjacent to said static eliminating unit (second static eliminating unit), in the traveling direction of the sheet.

In the invention, "the normal direction inter-shield-electrode distance $d_3$-1" of first static eliminating unit means the shortest distance between the first shield electrode 5*g*-1 and the second shield electrode 5*h*-1 in the direction normal to the sheet. In this case, in the case where the shortest distance between the first and second shield electrodes $d_{31}$-1 on the upstream side in the sheet traveling direction is different from $d_{3r}$-1 that on the downstream side, the average value ($d_{3l}$-1+$d_{3r}$-1)/2 between the upstream shortest distance $d_{3l}$-1 and the downstream shortest distance $d_{3r}$-1 is used as the "normal direction inter-shield-electrode distance $d_3$-1".

In the invention, "shield electrode opening width $d_4$-1" of first static eliminating unit means the opening width of the first and second shield electrodes in the traveling direction of the sheet. In this case, in the case where the width $d_{41}$-1 of the opening of the first shield electrode in the traveling direction of the sheet is different from the width $d_{42}$-1 of the opening of the second shield electrode in the traveling direction of the sheet, the average value ($d_{41}$-1+$d_{42}$-1)/2 of them is used as the "shield electrode opening width $d_4$-1".

In the invention, "static eliminating gate length $D_2$" means the distance between the middle point 5*x*-1 of the line segment connecting the pointed ends of the first and second ion-generating electrodes 5*d*-1 and 5*f*-1 of the most upstream static eliminating unit (the first static eliminating unit) and the middle point 5*x*-*n* of the of the line segment connecting the pointed ends of the first and second ion-generating electrodes 5*d-n* and 5*f-n* of the most downstream (n-th) static eliminating unit in the traveling direction of the sheet. As can be seen from this definition, the static eliminating gate length $D_2$ agrees with the sum of all the inter-static-eliminating-unit intervals $d_2$-k (k=1, 2, . . . , n−1) ranging from the most upstream static eliminating unit to the most downstream static eliminating unit.

According to the invention, as can be seen from the comparison between examples and comparative examples described later, an insulating sheet having positively and negatively charged sites alternately formed at a small pitch in the same plane or having such charged sites existing together in both the surfaces can be balanced between positive and negative charges and can be liberated from charges in both the surfaces substantially to a harmless level. Not only such an insulating sheet made apparently non-charged but also an insulating sheet made substantially non-charged can be produced by a very simple static eliminating method and eliminator.

That is, even from an insulating sheet having positively charged sites and negatively charged sites existing together within the same plane and/or in both the surfaces, the static charges can be effectively eliminated, and charge patterns can be eliminated. When the insulating sheet produced by the static eliminator or the static eliminating method of the invention, or the insulating sheet of the invention in post-process, such disadvantages as vacuum evaporation failure or coating irregularities are hard to occur, since the insulating sheet has few locally strongly charged portions such as static marks.

DESCRIPTION OF THE PREFERRED EMBODIMENTS

Figure 1:
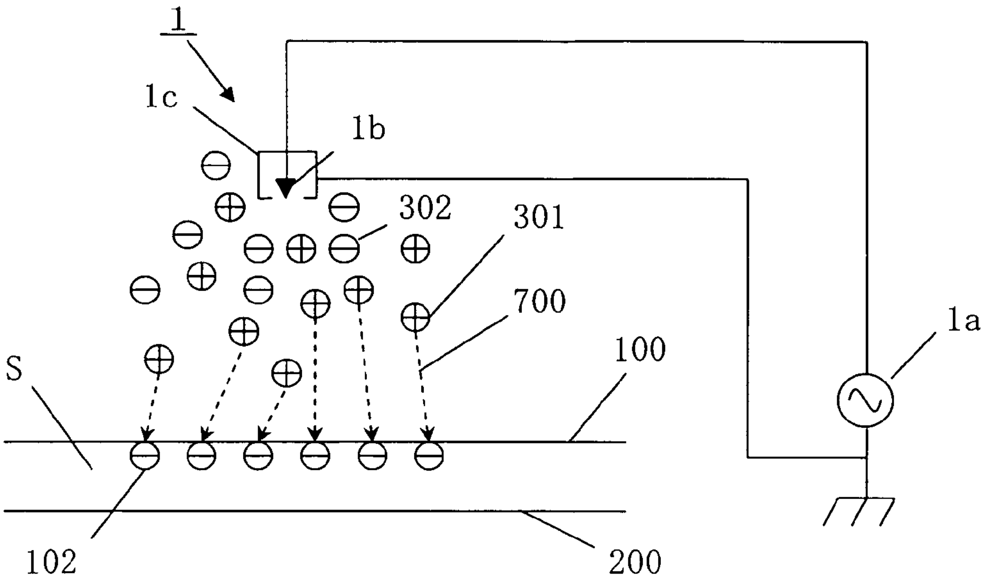
Fig. 1 PRIOR ART
FIG. 1 is a schematic drawing for illustrating the static eliminating action by the prior art.
Figure 2:
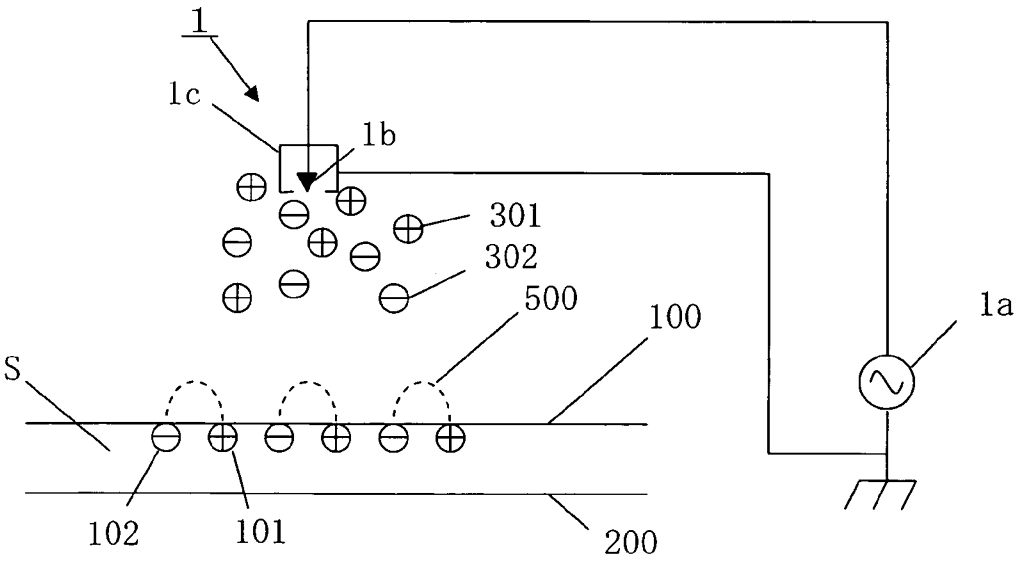
Fig. 2 PRIOR ART
FIG. 2 is a schematic drawing for illustrating the static eliminating action by the prior art.
Figure 3:
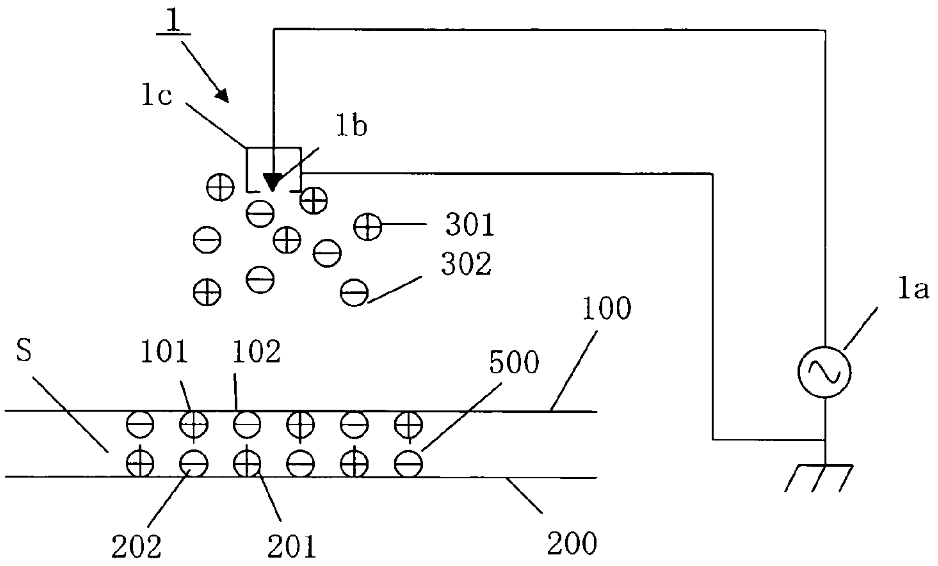
Fig. 3 PRIOR ART
FIG. 3 is a schematic drawing for illustrating the static eliminating action by the prior art.

Examples of the invention in the case of using a plastic film (hereinafter simply called a film) as an insulating sheet are described below in reference to drawings. The invention is not limited thereto or thereby.

For judging the effect of static elimination in the invention, a case where the absolute values of the charge densities of the respective surfaces (front surface and rear surface, or first surface and second surface) of a film that underwent static elimination declined by 10 $\mu C/m^2$ or more in absolute value compared with the absolute values of charge densities of the respective surfaces before static elimination is judged to be high in the effect of "eliminating the charges of the respective bipolarly charged surfaces."

As another method, a case where the absolute values of the charge densities of the respective surfaces of a film that underwent static elimination became ⅓ or less of the values of the charge densities of the respective surfaces before static elimination is judged to be high in the effect of "eliminating the charges of the respective bipolarly charged surfaces."

The reason is that in the "apparent static elimination" that is static elimination by the conventional static elimination techniques, the decline in the charge densities in absolute value of both-side bipolar charges is zero or 1 $\mu C/m^2$ at the highest. Furthermore, if the charge densities of the respective surfaces of a film that underwent static elimination are respectively in a range from −30 to +30 $\mu C/m^2$, the state can be judged to be "substantially non-charged," not to be "apparently non-charged."

The existence of charges in the first surface 100 of a film can be confirmed, for example, according to the following methods. The existence of charges in the second surface 200 can also be confirmed similarly, as a matter of course.

First Confirmation Method:

The second surface 200 of a film is brought into contact with the grounded conductor, and in this state, the rear side equilibrium potential $V_f$ of the first surface 100 is measured. Between the measured rear side equilibrium potential $V_f$ and the charge density $\sigma$, a relation of $\sigma = C \times V_f$ holds, where C is the electrostatic capacity per unit area. If a sensor of electrostatic voltmeter is brought sufficiently close to about 2 mm from the film, the measured $V_f$ is almost from the local charge right under the sensor in the first surface 100.

In the case where the thickness of the film is thin, the electrostatic capacity C per unit area can be obtained as the electrostatic capacity per unit area of a plane parallel plate, from $C = \epsilon_0 \epsilon_r / d_f$, where $\epsilon_0$ is the dielectric constant in vacuum$=8.854 \times 10^{-12}$ F/m; $\epsilon_r$ is the relative dielectric constant of the film; and $d_f$ is the thickness of the film. Therefore, the local charge density in directly under sensor of the first surface 100 of file can be obtained. Since this method is a non-destructive charge confirmation method, keeping the reverse surface in contact with the conductor allows the charge density of the other surface of the film to be also confirmed.

In this case, if the film kept in contact with the conductor and the electrostatic voltmeter sensor are moved relatively to each other in the in-plane direction of the film with the clearance between them kept as it is, the distribution of the charge densities of the first surface 100 of the film can be measured.

Second Confirmation Method:

The second surface 200 of a film is kept in contact with a conductor, and in this state, a toner powder is sprinkled over the first surface 100. The conductor can be used a metallic plate, metallic roll, etc. In the case where the film is not so firm that it is difficult to keep the film in contact with a metallic plate due to wrinkling or the like, it is desirable to use a cloth, paper or the like impregnated with a conductive liquid. In this method, since a toner powder is sprinkled, the film is destroyed. However, for confirming the effect of static elimination, it is a simple method. As the toner powder, a negative toner powder only can be used, but positive and negative toners with respective colors can also be used.

Third Confirmation Method:

Only the charges of the second surface 200 of a film are treated for neutralization, and subsequently a toner powder is sprinkled over the first surface, to confirm the charges of the first surface 100. For neutralizing only the charges of the second surface 200, the following two methods can be exemplified. The first charge neutralization method is to form a conductive film on the second surface 200, for example, by vacuum evaporation. As the second neutralization method, the first surface 100 of the film is kept in contact with a conductor, and in this state, the second surface 200 is coated with a polar solvent. The coated surface is then dried to neutralize only the charges of the second surface 200. As for the neutralization of charges using a polar solvent, the action of isopropyl alcohol or the like is known, for example, as disclosed in document proceeding for $17^{th}$ symposium on Ultra clean technology, pages 361-363, ultra clean society, February 1993 (hereinafter called document DS14).

In the state where the first surface 100 of a film is kept in contact with a conductor, while the second surface 200 is coated with a polar solvent. In this state, the charges of the first surface 100 of the film balance the charges of opposite polarity induced in the conductor, and the charges of the second surface 200 of the film balance the charges of opposite polarity induced in the polar solvent. Then the coated surface is dried, the charges of the second surface 200 are neutralized. If the film is separated from the conductor after completion of neutralization treatment, the charges of opposite polarity induced in the conductor vanish. As a result, the film has charges left only in the first surface 100. The inventors have developed this method as a simple method for preparing a film having charges on one side only.

According to this method, the charged state of a film can be identified simply and quickly in an atmosphere of room temperature and atmospheric pressure. This method is recommended since the sensitivity of the toner to be deposited on the surface having charges is high. Polar solvents easy to handle and quick to dry include ethanol, isopropyl alcohol, etc. It is preferred that a polar solvent is coated as if wiping using cloth or the like and then is dried.

On the other hand, the film having a conductive material such as a metal vapor-deposited can be used as it is as a sample for evaluating the charged state of the non-vapor-deposited surface.

Also in these cases, for identifying the charged state, a negative toner powder or positive and negative toners with respective colors can be used.

The inventors confirmed charged states of films using these methods for identifying the charged states of films, and examined mechanisms working in such problems that when a film is coated with a coating material, coating irregularity occurs, that a coating material is partially repelled without being deposited in some places, and that when plural films are overlaid, the edges of the films cannot be neatly arranged due to cling films together (disarrangement of overlaid films). As a result, they found a preferred charged state of the film capable of obviating the problems otherwise caused by charges in the post-processes. Modes of charged states of films are described below.

Mode A of Charged State:

The state, the charges in both the surfaces of a film balance (almost same in quantities, polarities opposite) each other, and the film is in an apparently non-charged. That is, the state, in the evaluation of charge densities by the first confirmation method, the sums of the charge densities of both the surfaces at the respective sites in the in-plane direction (apparent charge density in the respective sites) of a film are in a range from −2 to +2 μC/$m^2$, or the toner powder is not deposited.

Mode B of Charged State:

In this state, the charge densities existing in the respective surfaces of a film are sufficiently small. The state, the evaluation of charge densities by the first confirmation method, the charge densities of the respective surfaces of the film are respectively in a range from −150 to +150 μC/$m^2$. In the state, it is preferable that the charge densities of the respective surfaces of the film are respectively in a range from −30 to +30 μC/$m^2$. This state is defined to be "substantially non-charged."

Mode C of Charged State:

The charge densities existing in the respective surfaces of a film are sufficiently small, and when the film is kept in tight contact with a conductor, the potentials of the surface not kept in contact with the conductor, i.e., rear side equilibrium potentials in a range from −340 to 340 V in this state. The state preferred that the rear side equilibrium potentials are in a range from −200 to +200 V.

Mode D of Charged State:

In this state, neither the sites at which the charge density changes sharply in each surface of the film nor the local sites where the charge densities are high exist. It is preferred that the charge densities change smoothly and cyclically in cycles of about 10 to about 100 mm in the respective surfaces of the film.

In most cases where a conductive material is formed on one surface of a film in post-processing, for example, by vacuum evaporation or bonding of a metallic foil such as an aluminum foil, the film is only required to satisfy the modes A and B, though depending on the post-processing of the film. For example, in the case of a film having a conductor on one surface, disarrangement of overlaid films can occur. In this case, the Coulomb force proportional to the quantity of charges in the surface not having a conductive film affects the disarrangement of overlaid films (slipperiness). Therefore, it is preferred to control the charged state of the film by means of charge densities.

In the case where coating is performed as post processing and where it is desired to inhibit coating irregularity, a film with a thickness of about 1 μm to about 60 μm is only required to satisfy the modes A and B. If the film is thicker than the range, it is preferred to satisfy the rear side equilibrium potentials of mode C, instead of mode B. The reason is that both the apparent charges of the film and the rear side equilibrium potentials of the coated surface caused by the charge densities of the coated surface affect the coating irregularity defect. Also for inhibiting other defects, it is preferred to satisfy the modes B and C.

The inventors examined and found that the coating irregularity defects come in the following two modes.

Figure 12:
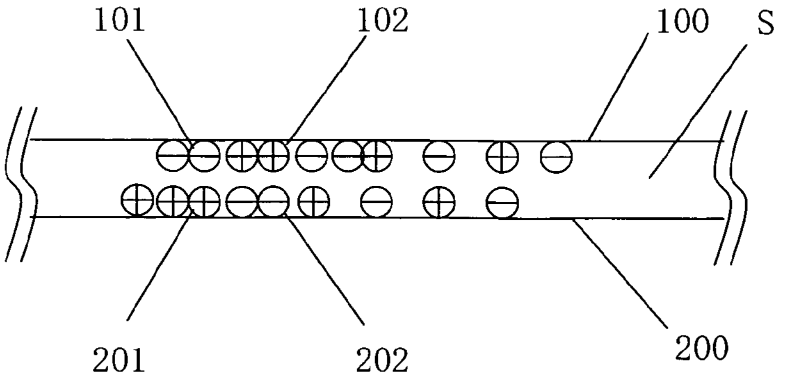
FIG. 12 is a schematic drawing showing the charged state of an insulating film that is apparently charged.

The First Mode of Coating Irregularity Defects:

As shown in FIG. 12, the apparent charge densities in absolute value of the film S are large in this mode. The apparent charge densities are less than −2 μC/$m^2$ or more than +2 μC/$m^2$, and the film is apparently charged. The coating irregularity of this mode occurs when the film is held in air.

Figure 7:
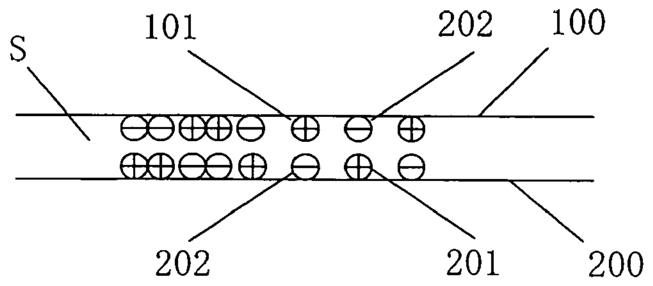
Fig. 7 PRIOR ART
FIG. 7 is a schematic drawing for illustrating the charged state of a sheet that underwent the static elimination by the static eliminator shown in FIG. 4.

Second Mode of Coating Irregularity Defects:

As shown in FIG. 7, the rear side equilibrium potentials of the coated surface of the film S are large in absolute value in this mode. The rear side equilibrium potentials are less than −340 V or more than +340V. The coating irregularity of this mode occurs above a conductive backup roll.

The following describes the mechanisms in which the above-mentioned coating irregularity defects clarified by the inventors occur, and the charged states of the film for inhibiting them.

In the film S having the charged state shown in FIG. 12 referred to for the first mode of coating irregularity defects, in the state where the film S is held in air, a strong electric field is formed near outside the coating surface of the film S. This electric field occurs since the apparent charge densities of the film S are not zero. This electric field lets such actions as electrophoresis and dielectrophoresis work on the applied coating solution, to cause coating irregularity.

On the contrary, in a film satisfying the charged state A, for example, in the film S in the charged state as shown in FIG. 7, in the state where the film is held in air, the electric field due to the charges of opposite polarity existing in both the surfaces of the film is closed in the film. So, a strong electric field little works near outside the coated surface. For this reason, such actions as electrophoresis and dielectrophoresis little work on the applied coating solution, and coating irregularity is hard to occur.

If a charge pattern with positive and negative charges existing together exists in the coating surface, the electric field formed between respectively adjacent positive and negative charges is slightly formed near outside the coating surface, but the influence of the electric field on the applied coating solution is small. The reason is that the distances between positive and negative charges existing in the respective surfaces of the film are small. The distances correspond to the thickness of the film and are in a range from several micrometers to hundreds of micrometers at the longest. In a site where the distances between the positive and negative charges existing in the plane of the film are sufficiently longer than the range, the electric field is closed in the film, and a strong electric field does not work near outside the coating surface. In a sole case if a distance of adjacent positively charged site and a negatively charged site in the plane of the film with a distance almost equivalent to the thickness of the film, an electric field in the in-plane direction of the film works near outside the coated surface.

However, this electric field is in a very limited microscopic region, i.e., a region of several micrometers to hundreds of micrometers at the largest, and the migration area of the coating solution is very small. Furthermore, the quantity of the solution capable of migrating in proportion to the region is also very slight. So, even if irregularity occurs, the irregularity cannot be visually observed. This explanation is concerning the relation between charges and coating irregularity in the case where a film held in air is coated.

On the other hand, though a film can be coated while it is held in air, a film can also be coated while it travels on a roll. The roll can be, for example, a backup roll of a die head coater, or a carrier roll for changing the traveling direction of the film. In this case, if the film is "apparently non-charged," with the both the surfaces charged equally in quantity but opposite in polarity, apparent charge density is zero, that is, if the film is the film S as shown in FIG. 7, there is a large problem that coating irregularity defects of the second mode occur. The mechanism in which the coating irregularity of this mode occurs is described below in detail.

Figure 13:
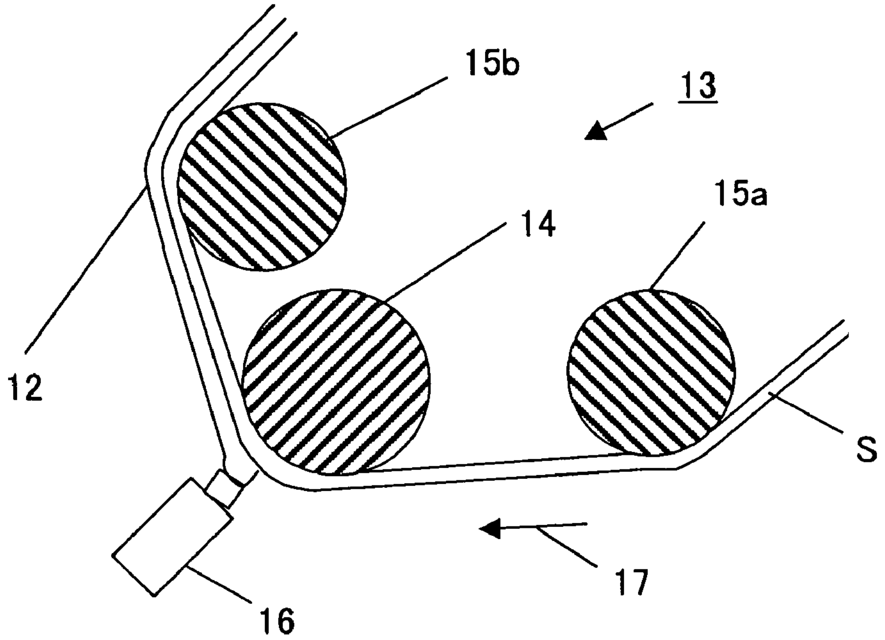
FIG. 13 is a schematic front view showing a coating section of a die head coater.

FIG. 13 is a schematic drawing showing a part of the coating process using a die head coater. In FIG. 13, the film S is continuously unwound from a film package (not shown in the drawing) wound up as a roll and reaches a coating section 13. The coating section 13 is provided with two carrier rolls 15*a* and 15*b*, a backup roll 14 positioned between them, and a die head 16. The film S reaching the coating section 13 travels in contact with the carrier roll 15*a*, the backup roll 14 and the carrier roll 15*b*, in the direction indicated by the arrow 17, being changed in traveling direction. The coating solution put out from the die head 16 is applied to the film S, to form the coating surface 12 formed by coating layer on the film S. The film S coated with the coating solution gets the solvent of the coating solution evaporated and dried in a drying section (not shown in the drawing), and finally wound as a roll in a winding section (not illustrated).

In the state where the film S travels while being kept in contact with the backup roll 14, the film S is coated with a predetermined coating material (coating solution) put out from the die head 16. The backup roll 14 is installed for allowing the film S to travel stably and for keeping the clearance between the film S and the die head 16 constant. The backup roll 14 is, for example, a metallic roll plated with hard chromium, or a metallic roll covered with an elastic substance. As the elastic substance, a conductive rubber is often used.

The conductive rubber is used for the purpose of preventing the electrification of the backup roll 14, and prevents the firing of the organic solvent by electrostatic discharge. As described here, the backup roll 14 is made of a conductive material in most cases. Furthermore, in other coating methods using a roll coater or gravure coater, similarly a backup roll is often used. The charged state of the film S on the conductive roll is as shown in FIG. 14.

Figure 14:
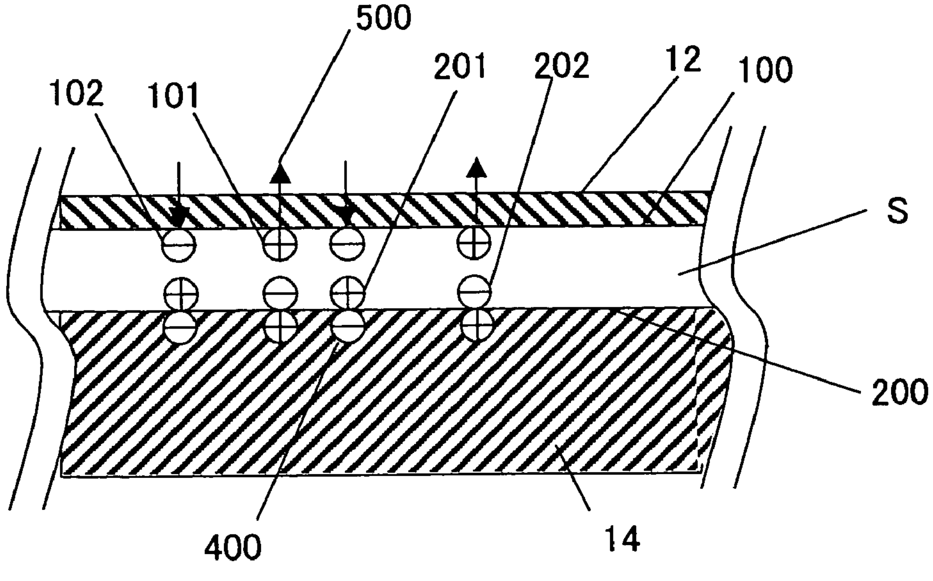
FIG. 14 is a schematic drawing showing a state where a conductive layer is kept in contact with one surface of an insulating film.

In FIG. 14, in the state where the film S is kept in contact with the conductive backup roll 14, the second surface 200 of the film S is kept in contact with the conductor, and the first surface 100 is on the coater side (die head 16 side) and becomes the surface coat with the coating solution (hereinafter called the coated surface 12). In this case, in response to the positive charges 201 and the negative charges 202 of the second surface 200, charges 400 of opposite polarity are induced in the backup roll 14. As a result, the potentials of the second surface 200 become zero.

On the other hand, since the positive charges 101 and the negative charges 102 of the first surface 100 as the coated surface 12 cannot induce sufficient charges 400 in the backup roll 14, because of the distance corresponding to the thickness of the film S from the surface of the backup roll 14. As a result, the charges of the first surface 100 actively exist. As a result, in the coating surface 12, the positive and negative charges 101 and 102 of the first surface 100 form an electric field. Because of the phenomenon in which the charges actively exist, even if the apparent charge density of film is zero, the electric field acts on the applied coating solution, causing coating irregularity.

The above description covers a phenomenon on the backup roll 14 of a die head coater, but also in the following case, an electric field acts on an applied coating solution in a similar mechanism. That is, a film S uniformly coated with a coating solution is carried into a drying step for evaporating and drying the solvent contained in the coating solution. In this case, it is practiced that the film S coated with the coating solution not yet dried is passed on the surface of a metallic roll, or that for better thermal conduction to the film S, the film is kept in contact with a metallic roll for drying. Even on the metallic roll, the same phenomenon as occurring in the case of the backup roll 14 occurs, and coating irregularity occurs in the film S.

The inventors found that the coating irregularity by charges occurs if a strong electric field of more than a certain level acts on a thin coating solution layer. The reason is considered to be that the coating solution migrates according to the electric field, for forming an uneven distribution of the coating solution. If the coating solution can be charged, the migration of the coating solution occurs due to electrophoresis. The electrophoresis causes the coating solution to be collected in the site of the film charged in the polarity opposite to that of the charges of the coating solution. As a result, the thickness of the coating layer in the portion becomes larger than the thickness of the coating layer in the surrounding, to cause coating irregularity. On the other hand, if the coating solution cannot be charged, the migration of the coating solution occurs due to dielectrophoresis, and the coating solution is collected in a site of the film with a strong electric field, and the thickness of the coating layer in the portion becomes larger than the thickness of the coating layer in the surrounding, to cause coating irregularity.

With regard to the occurrence of coating irregularity on an “apparently non-charged” film S above a metallic roll, since the intensity of an electric field is decided in relation with the charge densities of the film S, smaller charge densities result in a weaker electric field if the thickness of the film S is constant. As a result, coating irregularity is hard to occur. However, the coating irregularity occurring above a metallic roll is not decided by the charge densities only, and the inventors found that the intensity of the electric field near outside the first surface 100 formed the coated surface, that is, the magnitude of “the rear side equilibrium potentials” in the first surface 100 greatly affect the coating irregularity.

In the case where the surface (second surface 200) reverse to the coating surface of an apparently non-charged film S is kept in contact with a metallic plate, the electric field intensity near outside the first surface 100 in the direction normal to the film S is proportional to the rear side equilibrium potentials. That is, it is proportional to the distance between the conductor (metallic plate) and the first surface 100, in other words, the thickness of the film S. For example, if the number of charges is the same, i.e., if the same charge density exists, the rear side equilibrium potentials of thin film S are small compared with those of a thick film S since the distance from the conductor is very short. That is, the electric field intensity in the normal direction is small.

Figure 15A:
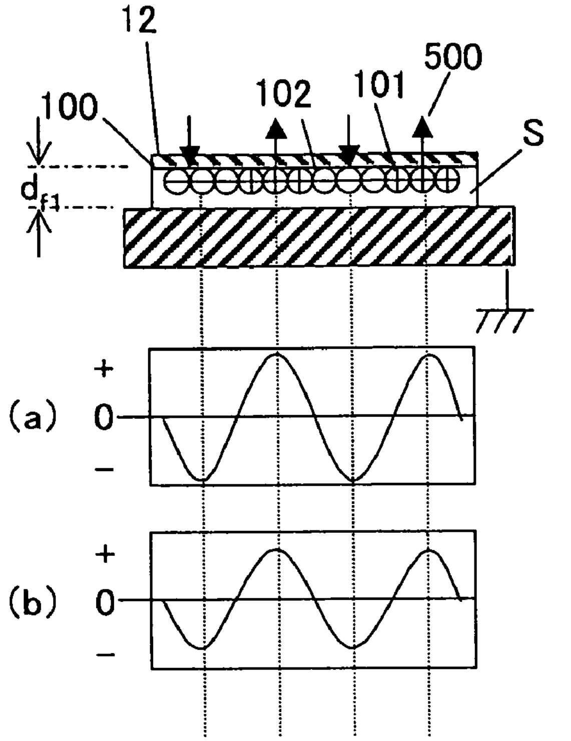
FIGS. 15A and 15B are schematic drawings showing relations of the film thickness to the charge densities of the first surfaces and the rear side equilibrium potentials of the first surfaces.

In FIG. 15A, of the film S having a thickness $d_{f1}$ and charges shown at the top, the graph (a) showing the charge densities (in $\mu C/m^2$) of the first surface 100 at the middle, and the graph (b) showing the rear side equilibrium potentials (in V) at the bottom. Moreover, in FIG. 15B, of the film S having a thickness $d_{f2}$ and charges shown at the top, the graph (a) showing the charge densities (in $\mu C/m^2$) of the first surface 100 is shown at the middle, and the graph (b) showing the rear side equilibrium potentials (in V) is shown at the bottom.

Figure 15B:
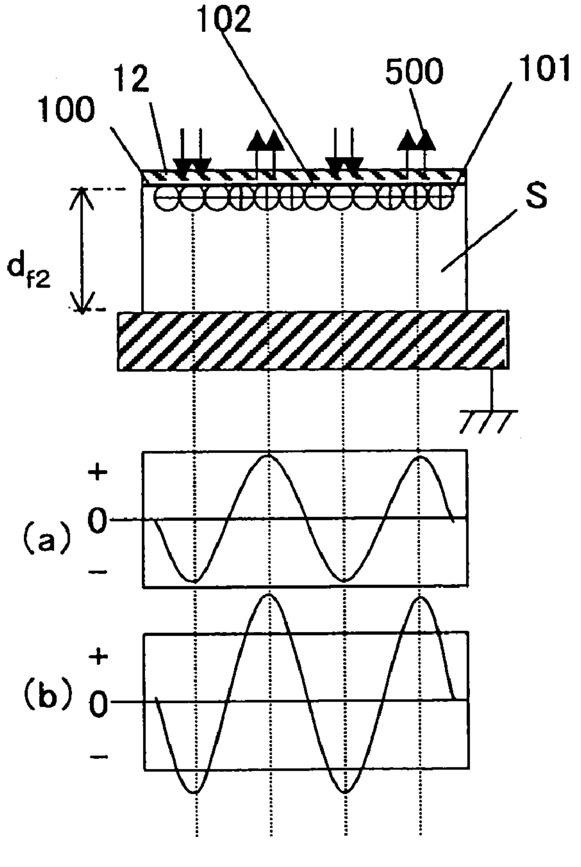

In respective films S shown in FIGS. 15A and 15B, if the respective graphs (a) is seen, the films S are charged the same quantity of the distribution of charge densities (in $\mu C/m^2$) of the first surfaces 100. On the other hand in respective films shown in FIGS. 15A and 15B if the respective graphs (b) is seen, the films S haven't the same quantity of the distribution of the rear side equilibrium potentials (in V).

The rear side equilibrium potential (in V) depends on the thickness of the film, that is, when the thickness of the film is $d_{f2}>d_{f1}$, the absolute value of the rear side equilibrium potential of the thickness of the film $d_{f2}$ becomes larger than that of $d_{f1}$ even if the absolute value of the charge density is small. Concerning whether or not coating irregularity occurs, it is important how large the charges of the first surface 100 as the coated surface 12 of the film S are as "the absolute value of the rear side equilibrium potentials," and the magnitude of "the absolute value of the rear side equilibrium potential" depends on the quantity of charges of the film S and the thickness of the film S. That is, if the absolute value of the rear side equilibrium potential shown in the respective graphs (b) of FIGS. 15A and 15B becomes large, coating irregularity occurs.

Figure 16:
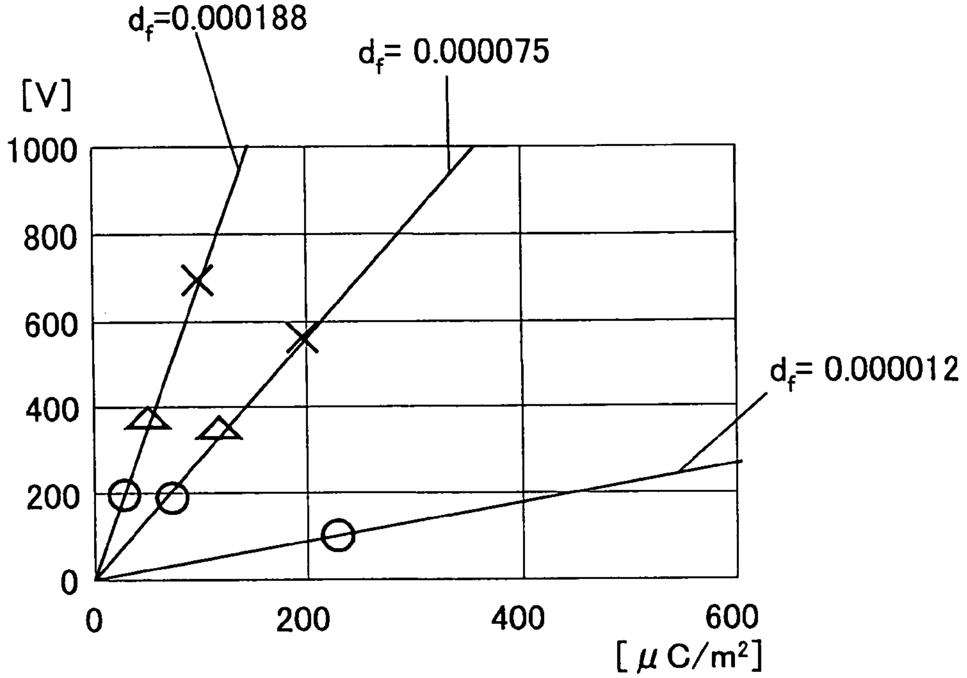
FIG. 16 is a graph for illustrating relation among the charge density, the rear side equilibrium potential and occurrence of coating irregularity.

The intensities of charges at which coating irregularity occurred were experimentally measured, and the results are shown in FIG. 16. The film S used here was a film, on the first surface 100 of which positively and negatively charged zones were alternately formed in stripes. The positive and negative zones in the film S are formed in cycles of about 25 mm, and the absolute value of the rear side equilibrium potentials are highest in the central portions in the respective positively and negatively charged zones, and show a gentle sinusoidal wave distribution in the direction to the stripes. The film S with such a charged state was placed on a metallic plate then, the second surface 200 of the film S is kept in contact with metallic plate and was manually hand-coated, on the first surface 100, with hydrocarbon of syntheses isoparaffin series, Isopar H (produced by Exxon Chemical) as a coating solution. The results are shown in the graph of FIG. 16. This Isopar is hydrophobic among organic solvents, poor in wettability to a film or the like, and is very likely to cause coating irregularity due to charges.

The graph of FIG. 16 shows the results of examining the occurrence of coating irregularity on polyethylene terephthalate films of 12, 75 and 188 μm in thickness $d_f$. In the graph of FIG. 16, the amplitude of the rear side equilibrium potential of the first surface 100 (in V) is chosen as the ordinate, and the amplitude of charges density (in $\mu C/m^2$) is chosen as the abscissa.

Before coating, The rear side equilibrium potential $V_f$ (in V) of the first surface was measured with the probe (1017 produced by Monroe Electronics, Inc.) of a electrostatic voltmeter (model 244 produced by Monroe Electronics, Inc.) kept as close as 1 mm to the film S. The charge density was obtained by substituting the measured value of $V_f$ into the equation stated in the first confirmation method for charges. As the relative dielectric constant $\epsilon_r$ of the film S, 3 as the dielectric constant of polyethylene terephthalate was used.

In FIG. 16, each circle shows that it was visually observed that no coating irregularity occurred at all. Each triangle shows that some coating irregularity was observed to such an extent that it posed no quality problem. Each X mark (cross) shows that coating irregularity was observed. As shown in FIG. 16, in the film with a thickness of $d_f$=12 μm, even if the amplitude of the charge density is 240 $\mu C/m^2$, no coating irregularity occurs since the amplitude of the rear side equilibrium potential is less than 100 V. On the contrary, in the film S with a thickness of $d_f$=188 μm, even if the amplitude of the charge density is as low as 90 $\mu C/m^2$, coating irregularity occurs since the amplitude of the rear side equilibrium potential is as high as 600 V. That is, coating irregularity occurs with the rear side equilibrium potential of the first surface, that is, the coating surface, at about 200 V in absolute value as a critical value. On the other hand, when a silicone-based coating solution (solvent toluene) was used as the coating solution, the highest absolute value of rear side equilibrium potential at which the coating irregularity problem did not occur was 340 V.

As described above, if the film has a large thickness, the coating surface is apart from the rear metallic component. So, the electrostatic capacity is small and the rear side equilibrium potentials are high. Hence coating irregularity occurs even if the quantity of the charges densities is slight. For such a film, it is preferred to control the rear side equilibrium potentials of the film as explained in said mode C of charged state.

The inventors found that the critical value at which the irregularity occurs depends also on the physical parameters (surface tension, surface energy, viscosity, quantity of charges etc.) of the coating solution and the physical parameters (surface tension, surface energy, surface roughness, etc.) of the film. The degree of coating irregularity also depends on the contact time with the metallic roll and the proneness of the coating solution to migrate. Furthermore, if the coating solution has low conductivity, i.e., high insulation property, coating irregularity is likely to occur, and if the coating solution has high conductivity, coating irregularity little occurs. However, if the values of the rear side equilibrium potentials of the coated surface are kept in a range from −340 to +340 V, more preferably at values in a range from −200 to +200 V, the electric field acting on the coating solution is small, and no coating irregularity occurs.

Furthermore, it was found that if the charge distribution of positive charges and negative charges in the plane of the first surface 100 is a gentle distribution with a pitch of 10 mm to tens of millimeters, the electric field generated at the boundaries between the positively and negatively charged zones can be weakened, making coating irregularity hard to occur. In the modes A, B, C and D of charged state can be selected based on the above-mentioned findings of the inventors in reference to the post-process employed. Furthermore, if the static eliminator and static eliminating method of the invention described below are used, a film smaller in the quantity of charges can be obtained.

The following describes the static eliminating method and the static eliminator used for obtaining a film with such a suitable charged state.

Figure 17:
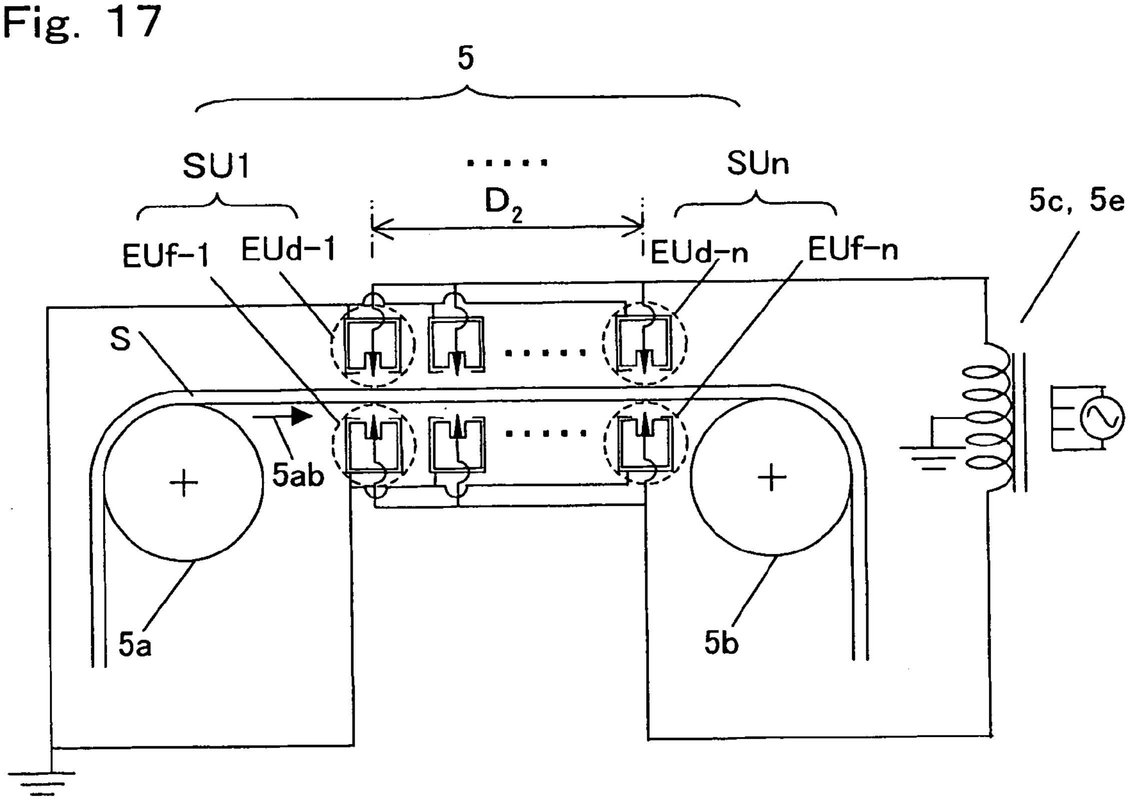
FIG. 17 is a schematic vertical sectional view showing an embodiment of the static eliminator of the invention.
Figure 18A:
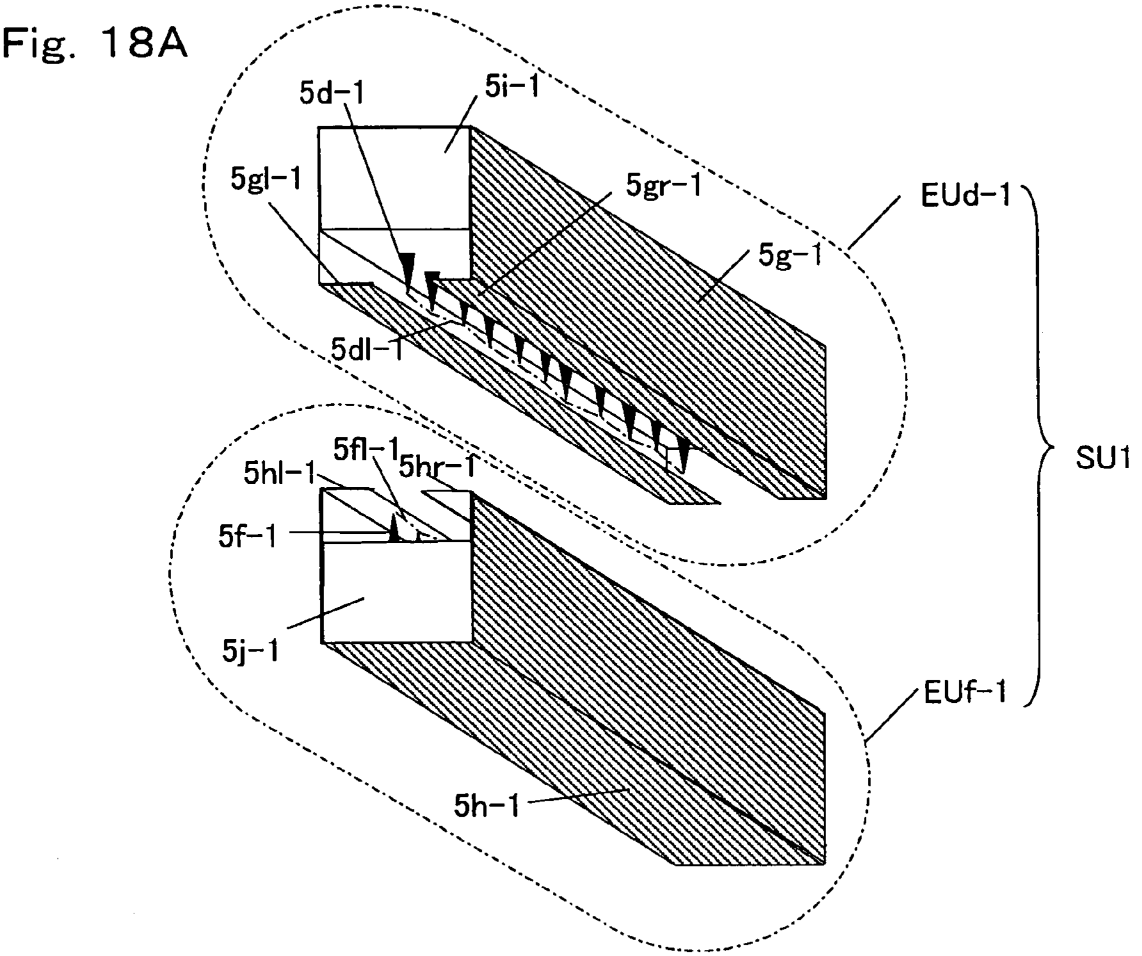
FIG. 18A is an enlarged perspective view showing a static eliminating unit of the static eliminator shown in FIG. 17.
Figure 18B:
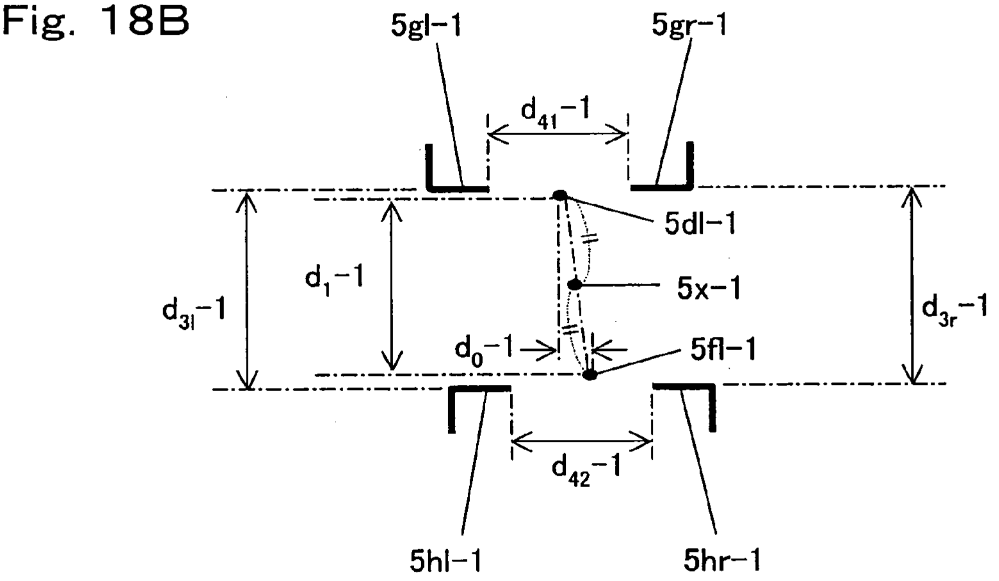
FIG. 18B is a front view for illustrating the positional relation of the electrodes of the static eliminator shown in FIG. 17.

FIG. 17 is a schematic front view showing an embodiment of the static eliminator of the invention. The static eliminator 5 can be preferably used for eliminating charges from a plastic film. FIG. 18A is an enlarged perspective view showing one static eliminating unit in an example of the static eliminator 5 shown in FIG. 17. FIG. 18B is a front view showing the positional relation of the members in an static eliminating unit in the static eliminator 5 shown in FIG. 17.

In FIG. 17, the static eliminator 5 has a guide roll 5*a* on the left side and a guide roll 5*b* on the right side. A traveling film S is placed over the guide rolls 5*a* and 5*b*. The guide rolls 5*a* and 5*b* are revolved clockwise by respective motors (not shown in the drawing). The film S continuously travels at speed u (in mm/sec) in the arrow direction 5*ab* because of the revolution of the guide rolls 5*a* and 5*b*. Between the guide rolls 5*a* and 5*b*, *n* (n≧2) static eliminating units SU1, . . . , SUn are installed with intervals kept between the respectively adjacent units in the traveling direction of the film S (in the arrow 5*ab* direction).

The first static eliminating unit SU1 consists of a first electrode unit EUd-1 and a second electrode unit EUf-1. The first electrode unit EUd-l faces the first surface 100 of the film S and is installed with a gap kept against the first surface 100. The second electrode unit EUf-l faces the second surface 200 of the film S and is installed with a gap formed against the second surface 200. The first electrode unit EUd-1 and the second electrode unit EUf-1 face each other with the film S placed between them.

If k is integral number of 1 to n, the k-th static eliminating unit Suk, like the first static eliminating unit Su1, consists of a first electrode unit EUd-k and a second electrode unit EUf-k. The first electrode unit EUd-k faces the first surface 100 of the film S and is installed with a gap kept against the first surface 100. The second electrode unit EUf-k faces the second surface 200 of the film S and is installed with a gap formed against the second surface 200. The first electrode unit EUd-k and the second electrode unit EUf-k face each other with the film S placed between them.

The construction of the static eliminating unit SUk in the static eliminator 5 is explained below in reference to FIGS. 18A and 18B. This explanation is made with the first static eliminating unit SU1 as a typical unit. The number n of the static eliminating unit is two or more, and the number and the intervals of the static eliminating units can be selected within the scope of the invention.

In FIG. 18A, the first electrode unit EUd-1 consists of a first ion-generating electrode 5*d*-1, a first shield electrode 5*g*-1 having an opening SOg-1 (not shown in the drawing) for the first ion-generating electrode 5*d*-1, and an insulating component 5*i*-1. The second electrode unit EUf-1, like the first electrode unit EUd-1, consists of a second ion-generating electrode 5*f*-1, a second shield electrode 5*h*-1 having an opening SOh-1 (not shown in the drawing) for the second ion-generating electrode 5*f*-1, and an insulating component 5*j*-1.

The first and second ion-generating electrodes 5*d*-1 and 5*f*-1 are respectively consisted of array of needle electrodes installed with intervals kept between the respectively adjacent needle electrodes in the width direction.

The opening SOg-1 of the first shield electrode 5*g*-1 is open toward the film S at near the pointed end of the first ion-generating electrode 5*d*-1 and has an opening width $d_{41}$-1 in the traveling direction of the film S.

The opening SOh-1 of the second shield electrode 5*h*-1 is open toward the film S at near the pointed end of the second ion-generating electrode 5*f*-1 and has an opening width $d_{41}$-1 in the traveling direction of the film S. Therefore, the first and second shield electrodes 5*g*-1 and 5*h*-1 function to help the discharge at the respective ion-generating electrodes 5*d*-1 and 5*f*-1 when an adequate potential difference is given between the first and second ion-generating electrodes 5*d*-1 and 5*f*-1.

The pointed end of the first ion-generating electrode 5*d*-1 and the pointed end of the second ion-generating electrode 5*f*-1 are disposed with a gap of $d_1$-1 kept between them in the direction normal to the film S and with a gap of $d_0$-1 kept between them in the traveling direction of the film S. Furthermore, the first shield electrode 5*g*-1 and the second shield electrode 5*h*-1 are installed with a gap of $d_3$-1 kept between their regions nearest to the film S in the direction normal to the film S.

The first ion-generating electrode 5*d*-1 and the second ion-generating electrodes 5*f*-1 are connected with a first AC power supply 5*c* and a second AC power supply 5*e* respectively different by 180 degrees in phase. As shown in FIG. 17, actually, the first ion-generating electrode 5*d*-1 and the second ion-generating electrode 5*f*-1 are connected with terminals opposite in polarity on both sides of a grounded point of one AC power supply. However, they can also be connected with respectively independent power supplies. The first and second shield electrodes 5*g*-1 and 5*h*-1 are respectively grounded.

Figure 20:
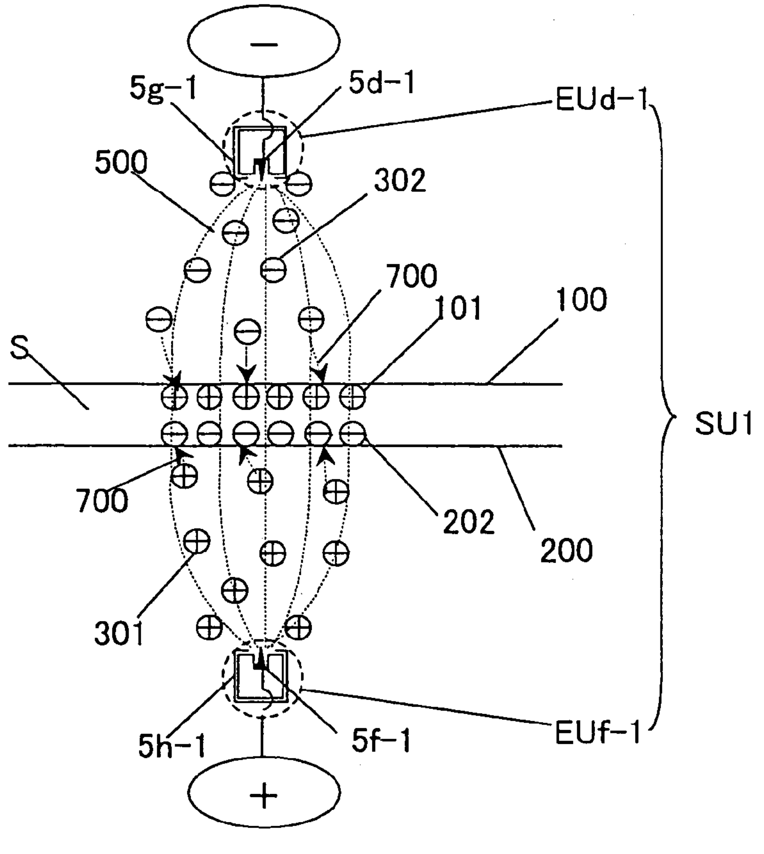
FIG. 20 is a schematic drawing for illustrating the static eliminating action by the static eliminator shown in FIG. 17.
Figure 21:
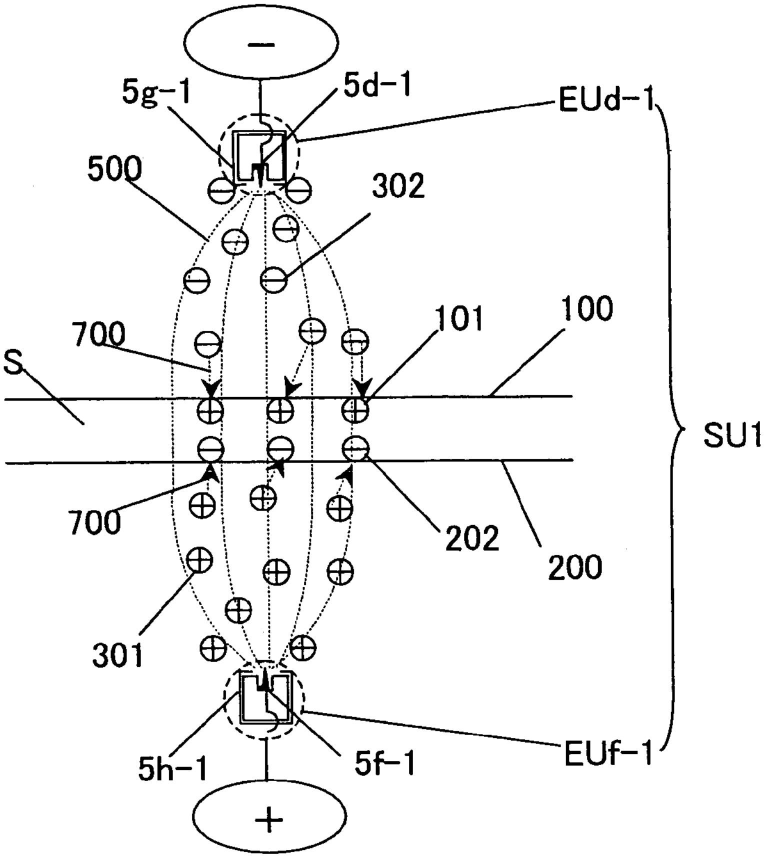
FIG. 21 is a schematic drawing for illustrating the static eliminating action by the static eliminator shown in FIG. 17.

The action of the static eliminating unit SUk (k is integral number of 1 to n) in the static eliminator 5 is explained below in reference to FIGS. 19 to 21. This explanation is made with the first static eliminating unit SU1 as a typical unit.

Figure 19:
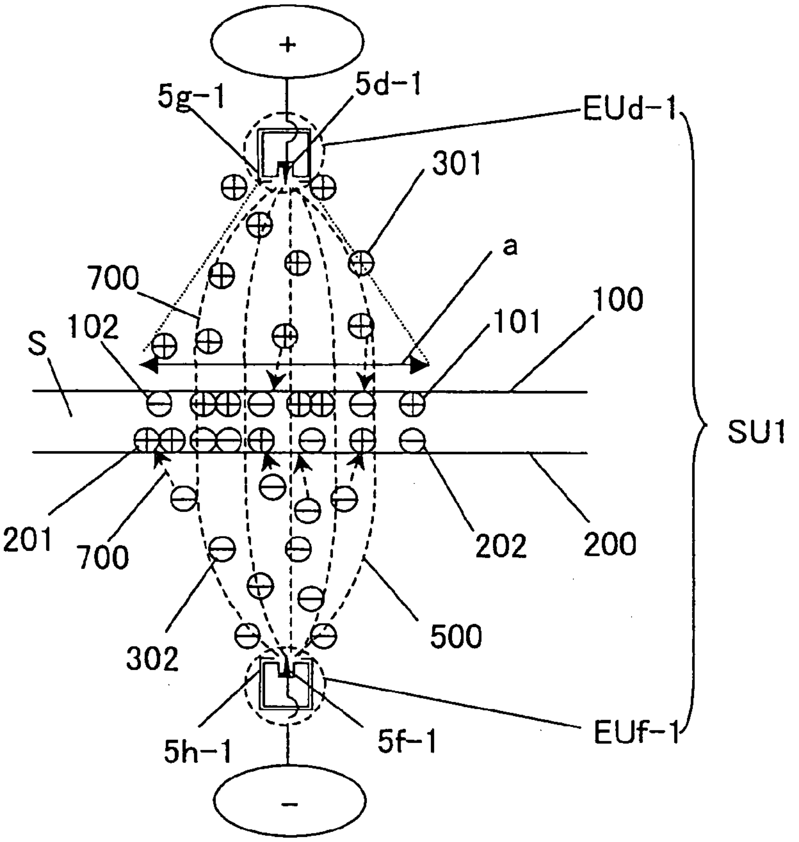
FIG. 19 is a schematic drawing for illustrating the static eliminating action by the static eliminator shown in FIG. 17.

At first, as shown in FIG. 19, in the first static eliminating unit SU1, explanation is made for the case where a positive voltage is applied to the first ion-generating electrode 5*d*-1 while a negative voltage is applied to the second ion-generating electrode 5*f*-1. In this case, the first ion-generating electrode 5*d*-1 generates positive ions 301, and the second ion-generating electrode 5*f*-1 generates negative ions 302. When the electric field intensity between the first ion-generating electrode 5*d*-1 and the second ion-generating electrode 5*f*-1 is strong, the electric field causes the positive and negative ions 301 and 302 to be forcibly irradiated to the film S.

The inventors found that when the electric field intensity between the electrodes is strong, the discharge current increases compared with the case where the two sets ion-generating electrodes 5*d*-1 and 5*f*-1 are used respectively alone without allowing them to face each other, and that the increased current can be a yardstick for the forcible irradiation of ions to the film S.

The value of discharge current can be confirmed using an output current indicator (not shown in the drawing) installed in the first AC power supply 5*c*. As another method, the output current of the first AC power supply 5*c* can also be confirmed, if the high voltage line connecting the first ion-generating electrode 5*d*-1 with the first AC power supply 5*c* is held by the clamp of a clamp type ammeter and monitored.

In the case where the first ion-generating electrode 5*d*-1 is used alone, the discharge current value $I_0$ is brought as the current due to the discharge caused in the first ion-generating electrode 5*d*-1 by the electric field near the pointed end of the first ion-generating electrode 5*d*-1 owing to the potential difference between the first ion-generating electrode 5*d*-1 and the first shield electrode 5*g*-1.

If the first ion-generating electrode 5*d*-1 and the second ion-generating electrode 5*f*-1 are disposed to face each other and the normal direction inter-electrode distance $d_1$ (in mm) is gradually shortened, then the discharge current value that has shown a constant value $I_0$ when the normal direction inter-electrode distance $d_1$ has been large increases. This phenomenon means that the difference of potential from that of the second ion-generating electrode 5*f*-1 intensifies the electric field near the pointed end of the first ion-generating electrode 5*d*-1.

The increase of discharge current value described above with the first AC power supply 5*c* connecting to the first ion-generating electrode 5*d*-1, is equally occur with the second AC power supply 5*e* connecting to the second ion-generating electrode 5*f*-1.

The increase of discharge current value is attributable to the potential difference (electric field) between the first ion-generating electrode 5*d*-1 and the second ion-generating electrode 5*f*-1. Therefore, this phenomenon occurs irrespective of the presence or absence of the film S between the first ion-generating electrode 5*d*-1 and the second ion-generating electrode 5*f*-1. Furthermore, for this reason, in the case where the film S exists, the first ion-generating electrode 5$d$-1 and the second ion-generating electrode 5$f$-1 cause positive and negative ions 301 and 302 to be forcibly irradiated to the film, irrespective of the charges of the film S.

The inventors found that when the relation between the voltage $V_1$ and $V_2$ (in V) (effective value) applied to the first and second ion-generating electrodes 5$d$-1 and 5$f$-1 respectively and the normal direction inter-electrode distance $d_1$ (in mm) satisfies the following formula, the discharge current increases, and the forcible irradiation of positive and negative ions to the film S occurs.

$$90\times d_1 \leqq (V_1+V_2)/2$$

In the above, the voltage applied to the first and second ion-generating electrodes are opposite in polarity, $V_1+V_2$ is the effective value of potential difference between the first and second ion-generating electrodes, and $V=(V_1+V_2)/2$ means the average effective value of the applied voltage to the first and second ion-generating electrodes 5$d$-1 and 5$f$-1.

This formula was obtained from the experiments conducted by the inventors by applying a DC voltage and power frequency (50 Hz and 60 Hz) voltage, and holds in a range of $d_1 \leqq 35$ mm. On the other hand, in the case where the inter-electrode interval is wide or in the case where the frequency is high, even if the electric field intensity between the first ion-generating electrode 5$d$-1 and the second ion-generating electrode 5$f$-1 is sufficiently large, the forcible irradiation of positive and negative ions to the film S is hard to occur. The reason is considered to be that at a high frequency, the applied voltage changes quickly in polarity, and that positive and negative ions are attracted back between the electrodes and are mixed not allowing a monopolar ion cloud to be formed. Usually when the potential of ion-generating electrode is positive in polarity, a positive monopolar ion cloud is formed near the pointed end of the ion-generating electrode, and when the potential of ion-generating electrode is negative in polarity, a negative monopolar ion cloud is formed near the pointed end of the ion-generating electrode.

However, if the polarity of the voltage of ion-generating electrode is reversed twice or more while the ions generated near the pointed end of the ion-generating electrode reach an insulating sheet, both positive and negative ions exist between the ion-generating electrode and the insulating sheet, and the positive and negative ions are recombined with each other, to lower the ion concentrations. In addition, whenever the polarity is reversed, the Coulomb's force to the ions is also reversed in direction. So, the ion cloud irradiated to the insulating sheet cannot be a monopolar ion cloud.

The formation of a monopolar ion cloud can be explained using the "arrow type corona wind" described in Journal of the Institute of Electrostatics Japan (in Japanese), 2, 3, 1978, pages 158-168 (hereinafter called document DS11). The ions generated by corona discharge move in an electric field at velocity μE (where μ denotes mobility) and collide with the neutral particles existing between electrodes, to give them a force, and the ions and neutral particles as a whole go away from the ion-generating electrode at a certain velocity. The wind that blows to go away from the ion-generating electrode is the wind known as "ion wind" or "corona wind." If the applied voltage is a DC voltage, corona wind blows only to go away to the ion-generating electrode. On the other hand, if the applied voltage is a AC voltage, corona wind blows to go away from and to return toward the ion-generating electrode simultaneously. The position where two opposite wind in direction mixed, arrow type wind can be seen. This wind is called "arrow type corona wind".

The arrow type corona wind is explained as follows. Since the voltage applied to the ion-generating electrode is reversed in polarity before the ions generated by the ion-generating electrode reach the counter electrode (the film S in the invention), the ions are attracted back to the ion-generating electrode at velocity μE, and this is the wind. It is difficult to analytically obtain the condition under which this arrow type corona wind occurs. However, document DS11 explains that in the case where an AC voltage of 60 Hz and 10 kV is applied to a needle electrode in opposite to a grounded counter electrode even if the distance between the ion-generating electrode and the counter electrode (a plate electrode in document DS11) is as short as 40 mm, the arrow type corona wind can be observed. Furthermore, since the corona wind per 5$e$ has close relation with the moving velocity HE of ions, it is considered that the following approximation is possible.

The ion moving velocity 1E is proportional to the inter-electrode electric field E. Therefore, with regard to the applied voltage V and the normal direction inter-electrode distance $d_1$, the velocity of corona wind also is proportional to $E=2V/d_1$. In the case the distance from the first ion-generating electrode 5$d$-1 to the film S and that from the second ion-generating electrode 5$f$-1 to the film S are the same, i.e., the film S is at the middle position of the first and the second ion-generating electrode in normal direction, the period of time taken for the ions generated from the ion-generating electrode to reach the film S can be obtained by dividing the distance $d_1/2$ by the velocity of corona wind, and is proportional to $d_1^2/V$. If the applied voltages are reversed in polarity twice or more within this time period, the ion concentration declines, and it can be considered that the ion cloud irradiated to the insulating sheet cannot be a monopolar ion cloud. Therefore, the condition for generating a monopolar ion cloud can be expressed by the following formula.

$$1/f \leqq B\times d_1^2/V \text{ (where B is a constant)}$$

After various experiments, the inventors found that in the case where the relation of $V<0.0425\times d_1^2\times f$ holds, the forcible irradiation of positive and negative ions between electrodes is hard to occur.

This condition means that the polarity of the applied voltages are reversed twice or more till the ions generated from the ion-generating electrode reach the film S, that is, the frequency of reversion is high. In this state, it is considered that positive and negative ions exist together between electrodes in the direction normal to the film S (in the direction of ion irradiation).

If positive and negative ions exist together like this, the ion recombination becomes frequently, and the quantity of ions irradiated to the film suddenly decreases. In this case, the concentrations of both the positive ions and the negative ions are rather higher than those of surrounding ions, but since positive and negative ions exist together, the ions irradiated to the film are positive and negative ions mixed with each other, and no monopolar ion cloud is generated. On the other hand, if the polarity reversing frequency of the applied voltages are as small as once or less, the portions high in positive ion concentration and negative ion concentration are formed in layers in the direction normal to the film. Therefore, though ions are reversed in polarity with the lapse of time, they are irradiated to the film as a monopolar ion cloud at a specific point of time.

In this case, the distance from the first ion-generating electrode 5_d_-1 to the film S and that from the second ion-generating electrode 5_f_-1 to the film S is assumed the same, but the ratio of both distance in a range from 1:2 to 2:1 occurs no matter. Since if the distance from the first ion-generating electrode 5_d_-1 to the film S is too large to form monopolar ion cloud, still the distance from the second ion-generating electrode 5_f_-1 to the film S is short to form monopolar ion cloud.

If negative ions generated from the second ion-generating electrode are forcibly irradiated to the second surface 200 of the film S as a negative ion cloud, then positive ions generated from the first ion-generating electrode are selectively irradiate to the first surface 100 of the film S. This automatically works to balance the deposition of positive and negative ion to the respective surfaces refer to the following.

Under these conditions, the positive ions 301 and the negative ions 302 are attracted near to the film S along the lines of electric force 500 formed by the first and second ion-generating electrodes 5_d_-1 and 5_f_-1, and are deposited on the film S. In this case, near the film S, the positive ions 301 and the negative ions 302 are more selectively attracted by the negative charges 102 and the positive charges 201 due to the Coulomb force 700 if there exist the negative charges 102 and the positive charges 201 on the film S. Therefore, the negative charges 102 of the first surface of the film S and the positive charges 201 of the second surface are eliminated.

Next, the charges of the respective surfaces of the film S, especially local strong charges such as static marks, and the capability to eliminate the both-side bipolar charges of the film S are described below in detail. As shown in FIG. 20, let's consider a site of the film S with numerous positive charges 101 existing in the first surface 100 and numerous negative charges 202 existing in the second surface 200. Let's pay attention to the behavior of ions when the first ion-generating electrode 5_d_-1 installed near the first surface 100 of the film generates negative ions 302 for irradiation while the second ion-generating electrode 5_f_-1 installed near the second surface 200 generates positive ions 301 for irradiation. In this case, the positive charges 101 in the first surface 100 of the film S and the negative charges 202 in the second surface 200 are eliminated simultaneously by the ions opposite in polarity. Therefore, also immediately after this, as shown in FIG. 21, no excessive charges appear.

Figure 10:
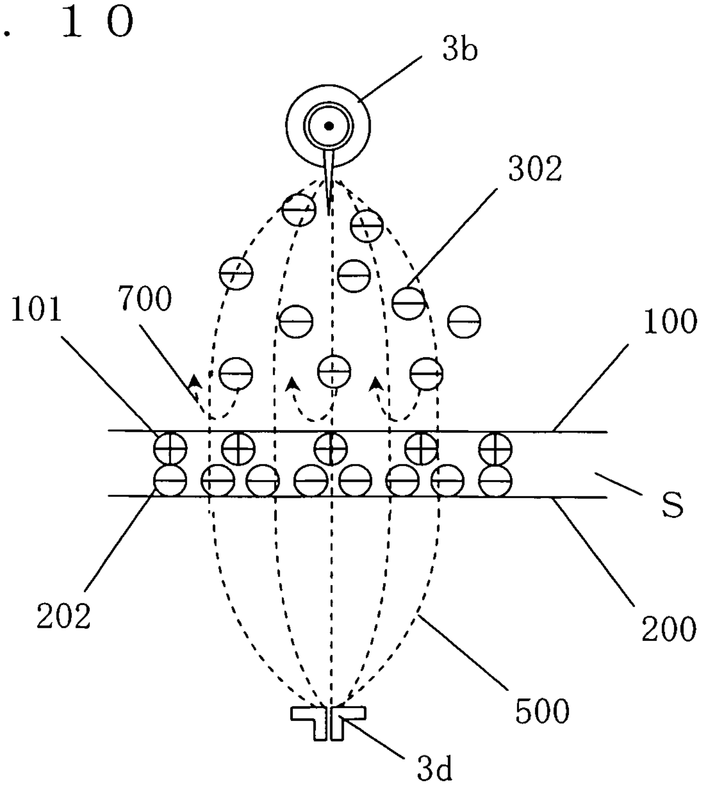
PRIOR ART Fig. 10
FIG. 10 is a schematic drawing for illustrating the static eliminating action by the static eliminator shown in FIG. 8.
Figure 11:
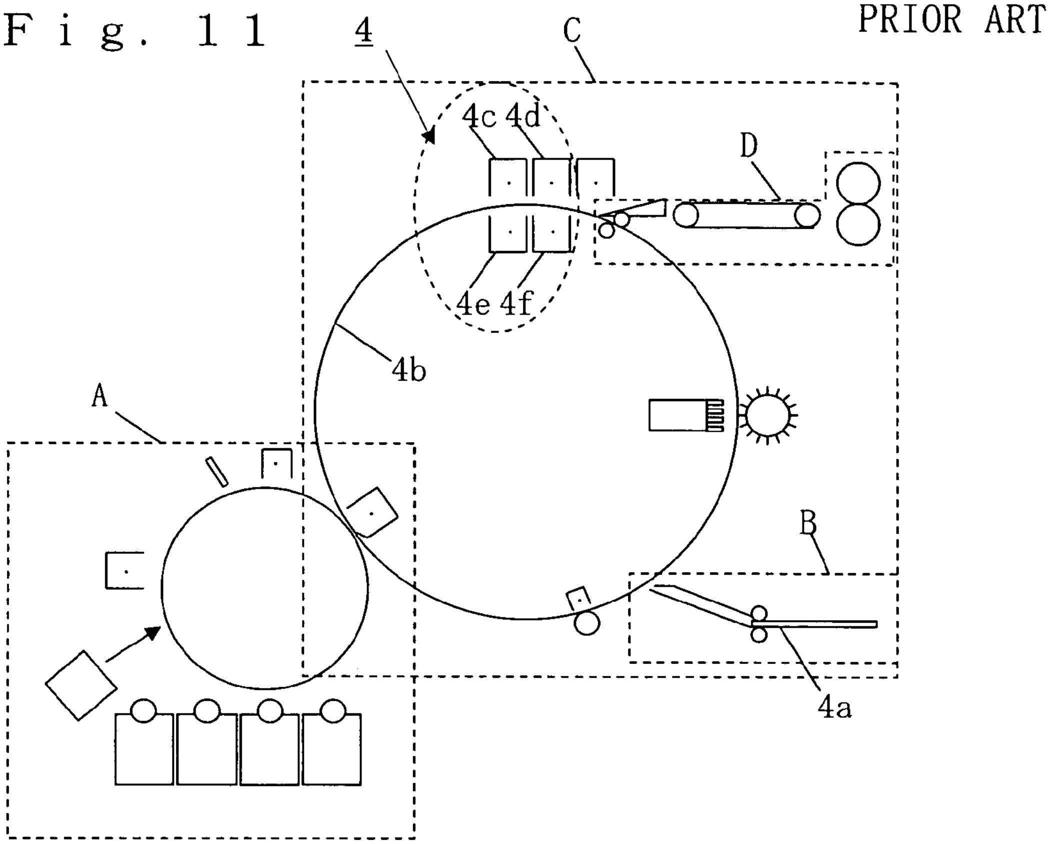
Fig. 11 PRIOR ART
FIG. 11 is a schematic front view showing a further other static eliminator.

In the prior art shown in FIG. 10, since the positive charges 101 only of the first surface 100 are eliminated, the negative charges 202 of the second surface 200 become excessive, and Coulomb force 700 acts on the negative ions 302 in the direction to be farther from the film. On the contrary, in the static eliminating unit SU1 of the static eliminator of the invention, such a phenomenon does not occur. Therefore, the negative ions 302 generated by the first ion-generating electrode 5_d_-1 and the positive ions 301 generated by the second ion-generating electrode 5_f_-1 efficiently eliminate the positive charges 101 of the first surface 100 of the film S and the negative charges 202 of the second surface 200.

According to the inventor's investigations, the quantity of ions used for irradiation reaches several to 30 of microcoulombs per square meter in absolute value. Because of this, the charges of the respective surfaces of the film S can be greatly reduced though this could not have been achieved by the prior art. This means that the effect of eliminating the charge densities of both-side bipolar charges is high. This effect can be obtained only when the first ion-generating electrode 5_d_-1 and the second ion-generating electrode 5_f_-1 are disposed to face each other to simultaneously generate ions opposite to each other in polarity for forcibly irradiating both the surfaces with the ions.

The relation between the first ion-generating electrode 5_d_-1 and the second ion-generating electrode 5_f_-1 facing each other very highly affect the capability of eliminating both-side bipolar charges existing together in both the surfaces of the film S. It is preferred that at each position in the width direction, the interval of the pointed ends of the first and the second ion-generating electrodes 5_d_-1 and 5_f_-1 in the traveling direction of the film is smaller than the interval of the pointed end of the first ion-generating electrode and the respective point of second shield electrode in the traveling direction of the film, and smaller than the interval of the pointed end of the second ion-generating electrode and the respective point of the first shield electrode in the traveling direction of the film. In other word, the first and the second ion-generating electrodes face each other substantially symmetrically with virtual plane is preferred. It is most preferred that both sets of the electrodes perfectly face each other. However, if the distance (electrode discrepancy) $d_0$ between the pointed end of the first ion-generating electrode 5_d_-1 and the pointed end of the second ion-generating electrode 5_f_-1 in the traveling direction at each position in the width direction of the film S satisfies the following formula, the first ion-generating electrode 5_d_-1 and the second ion-generating electrode 5_f_-1 simultaneously generate ions opposite to each other in polarity for allowing the irradiation capable of achieving the object of the invention.

$$d_0<1.5\times d_1^2/(d_3\times d_4) \text{ (in mm)}$$

This formula was obtained based on the examination by the inventors. This formula means the following.

This formula indicates that if the ratio $d_1/d_3$ of the distance (normal direction inter-electrode distance) $d_1$ between the pointed ends of the first and second ion-generating electrodes in the direction normal to the film and the shortest distance (normal direction inter-shield-electrode distance) $d_3$ between the first and second shield electrodes in the direction normal to the film is larger, the allowable range of the electrode discrepancy $d_0$ becomes wider. Furthermore, this formula indicates that if the radio $d_1/d_4$ of the normal direction inter-electrode distance $d_1$ to the width $d_4$ of the openings of the first and second shield electrodes in the traveling direction of the film S is larger, the allowable range of the electrode discrepancy $d_0$ is wider. In this case, the value of the width $d_4$ of the openings is the average value of the width $d_{41}$-1 of the opening of the first shield electrode 5_g_-1 and the width $d_{42}$-1 of the opening of the second shield electrode 5_h_-1, i.e., the value of ($d_{41}$-1+$d_{42}$-1)/2.

Unless this formula is satisfied, the effect of the ion-generating electrodes facing each other is small, and the increase of discharge current due to the ion-generating electrodes facing each other little occurs. This means that since the electric field between the first ion-generating electrode 5_d_-1 and the second ion-generating electrode 5_f_-1 is weak, the forced irradiation of the positive and negative ions 301 to 302 to the film S little occurs.

On the other hand, let's consider a case where the negative ions 302 are irradiated to the first surface 100 while the positive ions 301 are irradiated to the second surface 200, respectively at a non-charged site or a site of the film S where negative charges 102 exist in the first surface 100 while positive charges 201 exist in the second surface 200. Also in this case, new negative ions 302 are deposited on the first surface 100 of the film S and new positive ions 301 are deposited on the second surface 200, respectively to some extent. However, since the ions are deposited on the film S, also being affected by the Coulomb force 700 due to the charges in the film S, the quantities of deposited ions are smaller than at sites of the film S where positive charges 101 exist in the first surface 100 while negative charges 202 exist in the second surface 200. When negative ions 302 are applied to the first surface 100, the quantity of deposited negative ions 302 is different from site to site of the film. The sites having the largest quantities deposited are sites where positive charges 101 exist in the first surface 100, and the sites having the next largest quantities deposited are non-charged sites. The sites having the smallest quantities deposited are sites where negative charges 102 exist.

The new deposition of ions is the problem described to be likely to occur in the final pair of ion-generating electrodes of the static eliminator of document DS3 cited for explaining the prior art. The deposition of ions causes the unintentional charges especially to be noted carefully when the static eliminating units of the invention with large quantities of irradiated ions for both surfaces of the film are used. The countermeasure against the unintentional charges is described later. However, even if unintentional charges occur, the apparent charges densities of the film are almost zero, and the macroscopic apparent charge irregularity occurring in the prior art such as the static eliminators (excluding the final pair of ion-generating electrodes) of documents DS2 and DS3 is hard to occur. This is explained below.

It is considered that a case where the quantities of positive ions 301 and negative ions 302 generated by the first ion-generating electrode 5*d*-1 and the second ion-generating electrode 5*f*-1 are different due to differences of individual ion-generating electrode, differences of ion generating capabilities, etc. Let's assume that the quantity of the negative ions 302 generated by the second ion-generating electrode 5*f*-1 is larger than the quantity of the positive ions 301 generated by the first ion-generating electrode 5*d*-1. If the second surface 200 of the film S is irradiated with numerous negative ions 302 and have excessive negative ions 302 deposited on the film S, the Coulomb force 700 due to the excessively deposited negative ions 302 inhibit the deposition of the negative ions 302 on the second surface 200 and promote the deposition of positive ions 301 on the first surface 100.

This automatically works to cancel the deposition of excessive negative ions 302. As a result, the deposition of excessive negative ions 302 is quickly canceled, and the positive and negative charge densities of the first surface 100 and the second surface 200 of the film S become equal in quantity and opposite to each other in polarity. The apparent charge densities of the film S become almost zero. Even if the difference between the first ion-generating electrode 5*d*-1 and the second ion-generating electrode 5*f*-1 is about 50 to about 200% in ion-generating capability and ion-irradiating capability, the apparent charge densities of the film can be kept almost zero.

In the case where the film is charged predominantly monopolarly, the ions of the polarity opposite to that of the excessive charges are correspondingly more attracted, for eliminating the charges. So, as a result, at each site of the film from which the charges have been eliminated, the apparent charge densities of the film become almost zero. That is, the film gets charges apparently eliminated.

Figure 8:
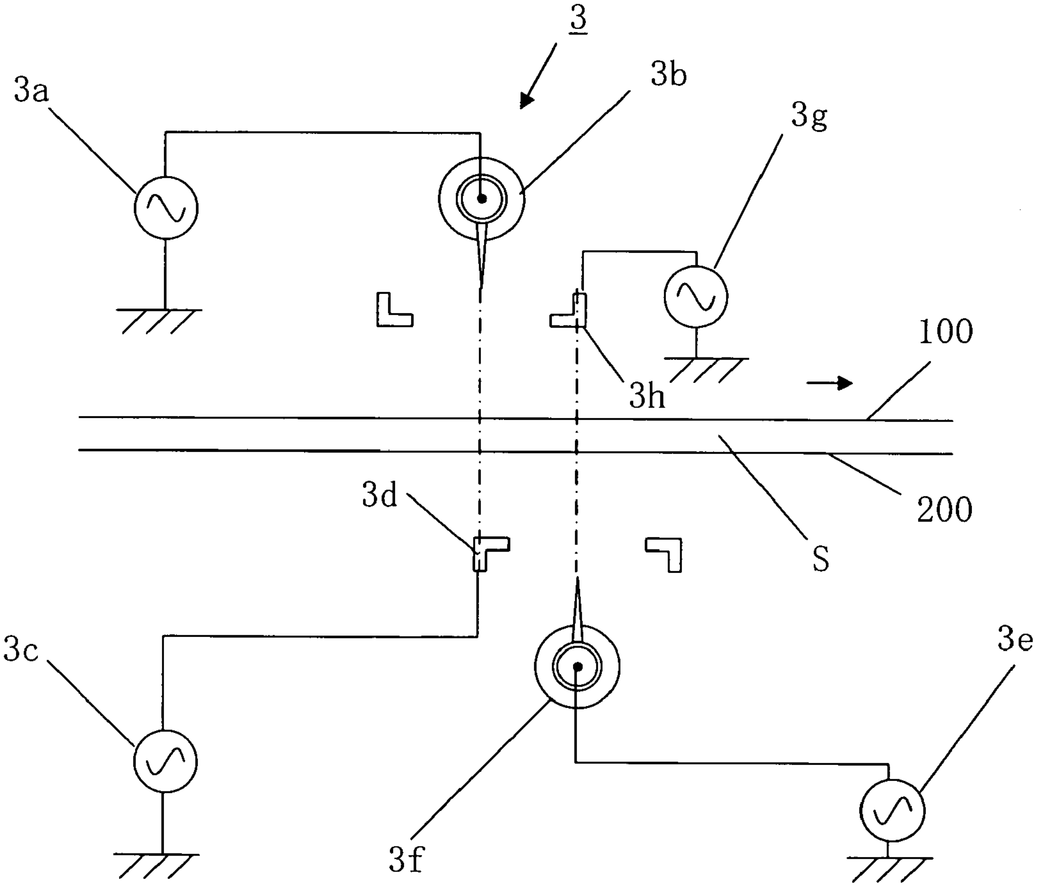
Fig. 8 PRIOR ART
FIG. 8 is a schematic front view showing another conventional static eliminator.
Figure 9:
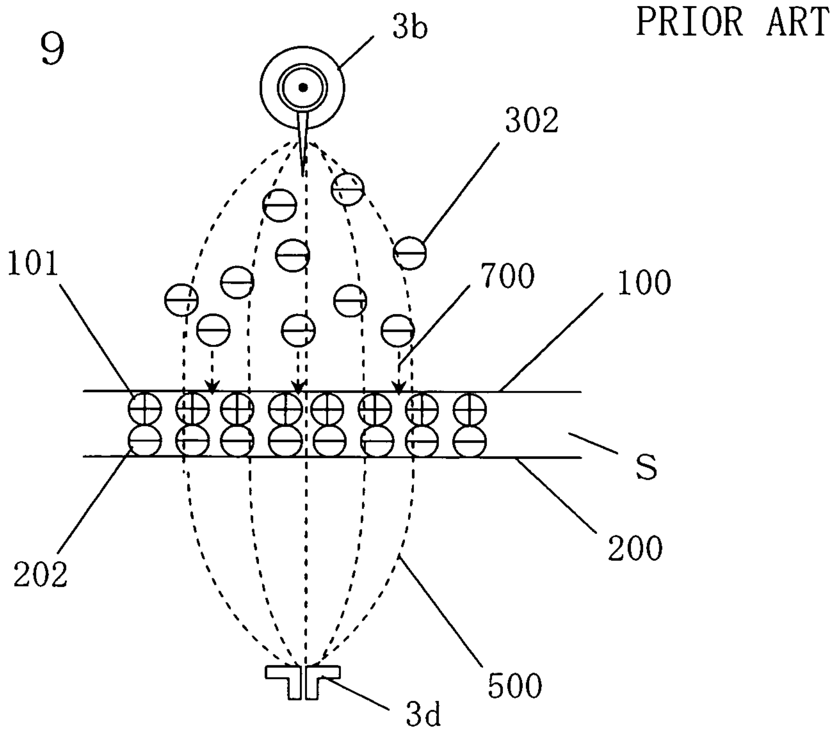
PRIOR ART Fig. 9
FIG. 9 is a schematic drawing for illustrating the static eliminating action by the static eliminator shown in FIG. 8.

This state can be achieved if the first ion-generating electrode 5*d*-1 and the second ion-generating electrode 5*f*-1 are disposed to face each other for simultaneously irradiating ions opposite to each other in polarity to both the surfaces of the film S. This state has been achieved for the first time by the invention. The balance in the charges of both the surfaces of the film S can be achieved in all the static eliminating units. Therefore, the film from which charges have been eliminated by the static eliminator composed of the static eliminating units disposed one after another are apparently liberated from charges very well. Therefore, the DC and/or AC static eliminating members used in the latter stage for eliminating the apparent macroscopic charge irregularity, needed in the static eliminators of documents DS2 and DS3 (the static eliminator 2 of FIG. 4 and the static eliminator 3 of FIG. 8) are not necessary.

As the action of the static eliminating unit, as described above, one static eliminating unit can surprisingly eliminate the positive (or negative) charges 101 (or 102) of the first surface 100 and the negative (or positive) charges 202 (or 201) of the second surface at the respective sites of the film. The apparent charge densities of the film S from which charges have been eliminated by the static eliminating unit are almost zero. However, one static eliminating unit only cannot eliminate the negative (or positive) charges 102 (or 101) of the first surface 100 or the positive (or negative) charges 201 (or 202) of the second surface 200. So, it is necessary to use plural static eliminating units.

Figure 22:
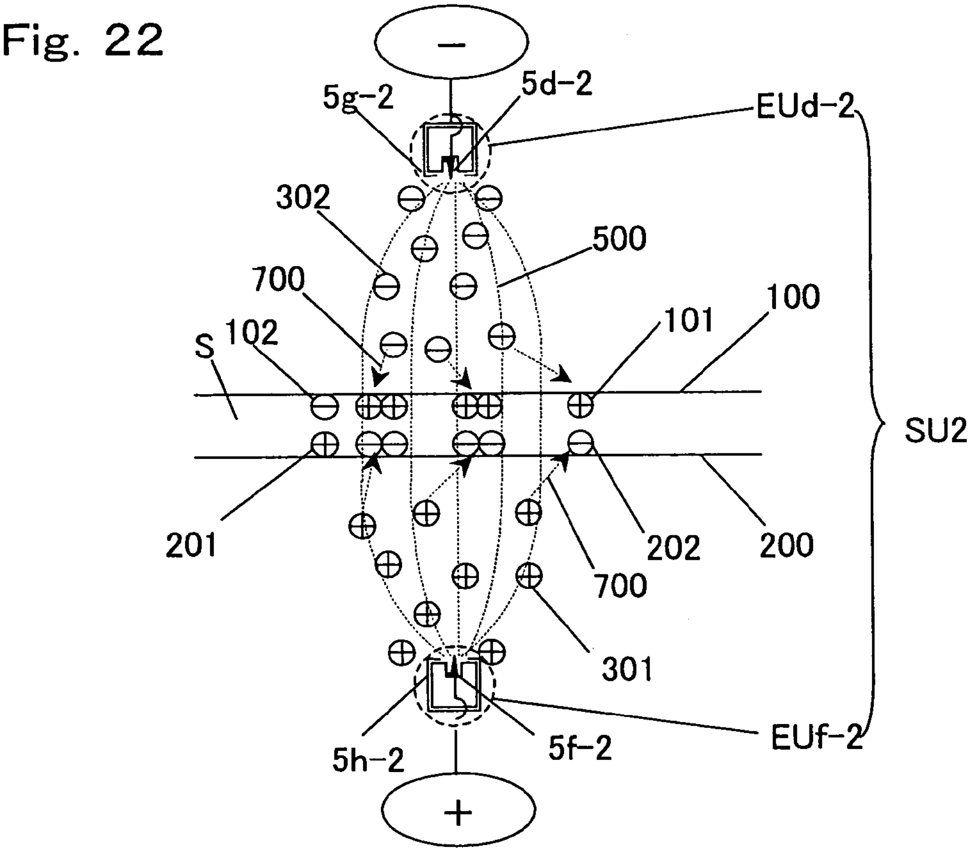
FIG. 22 is a schematic drawing for illustrating the static eliminating action by the static eliminator shown in FIG. 17.

Next, the action of the static eliminating unit downstream side, Sum (m is the integral number of k+1) is explained below in reference to FIG. 22. This explanation is made with the second static eliminating unit SU2 as a typical unit. FIG. 22 is for explaining function of elimination of a portion of film S eliminated by the first static eliminating unit SU1 based on the second static eliminating unit SU2. It is considered that a case where a negative voltage is applied to the first ion-generating electrode 5*d*-2, while a positive voltage is applied to the second ion-generating electrode 5*f*-2. In this case, the first ion-generating electrode 5*d*-2 generates negative ions 302, and the second ion-generating electrode 5*f*-2 generates positive ions 301. The negative ions 302 and the positive ions 301 are respectively attracted near to the film S along the lines of electric force 500 formed by the first and second ion-generating electrodes 5*d*-2 and 5*f*-2. At the same time, the positive and negative ions 301 and 302 eliminate the positive charges 101 of the first surface 100 of the film S and the negative charges 202 of the second surface 200 near the film S by means of the Coulomb force 700. If two static eliminating units are used like this, the first static eliminating unit can eliminate the negative charges 102 of the first surface 100 and the positive charges 201 of the second surface 200, while the second static eliminating unit can eliminate the positive charges 101 of the first surface 100 and the negative charges 202 of the second surface 200.

Figure 23:
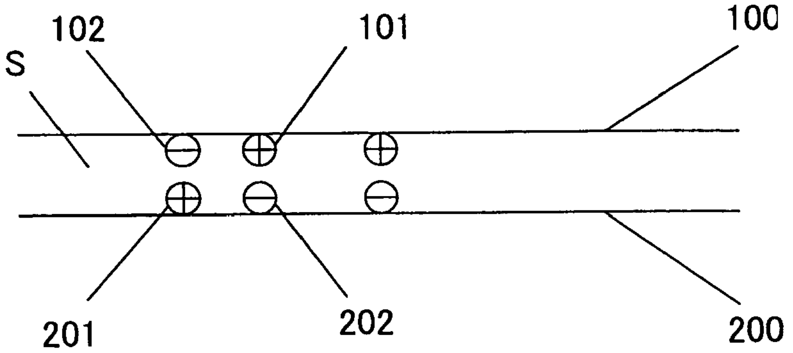
FIG. 23 is a schematic drawing for illustrating the charged state of the sheet that underwent the static elimination by the static eliminator shown in FIG. 17.

The charged state of the film S from which charges have been eliminated like this is shown in FIG. 23. FIG. 23 shows a state where the charges of the film S have been sufficiently eliminated. This state is very different from the charge-eliminated state achieved by the static eliminator of document DS2 referred to as a conventional technique shown in FIG. 7. FIG. 23 shows a state where positive charges 101 and 201 and negative charges 102 and 202 remaining, and the remaining charges are decided by the charge densities of the film S before static elimination and the quantities of irradiated ions per static eliminating unit.

If the quantities of irradiated ions are larger than the charge densities before static elimination, in principle, two static eliminating units only can eliminate charges to a substantially non-charged state. If this is repeated, when the quantities of irradiated ions are smaller than the charge densities before static elimination, the remaining positive charges 101 and 201 and negative charges 102 and 202 can be eliminated. If a pair of ion clouds opposite to each other in polarity are irradiated simultaneously to both the surfaces of the film S and further another pair of clouds opposite to each other in polarity but reversed in polarity compared with the ion clouds irradiated before are irradiated, the fine charges, especially both-side bipolar charges of the film S can be eliminated.

As a method for irradiating the respective surfaces simultaneously with positive and negative ions, low-frequency AC voltages can be applied to the ion-generating electrodes 5*d*-1 and 5*f*-1, for irradiating a pair of clouds of positive and negative ions 301 and 302 with the lapse of the time. As other methods, high-frequency voltages can be applied like the static eliminator for a copier disclosed in document DS4 or document DS5, for applying mixed positive and negative ions to the respective surfaces, or DC voltages can be applied. In the case where DC voltages are applied, if a positive voltage is applied to the first ion-generating electrode 5*d*-1 while a negative voltage is applied to the second ion-generating electrode 5*f*-1 of the first static eliminating unit SU1, then a negative voltage is applied to the first ion-generating electrode 5*d*-2 while a positive voltage is applied to the second ion-generating electrode 5*f*-2 of the second static eliminating unit SU2.

However, in the method by discharge at a high frequency, as described for the prior art, since positive and negative ions 301 and 302 are switched in short periods on the same side of the film S, ions exist together, and a monopolar ion cloud cannot be formed. As a result, positive and negative ions are recombined with each other to vanish, and the static elimination effect can be little obtained. On the other hand, in the method of applying DC voltages, it is highly likely to occur that depending on the difference between the capabilities of static eliminating units, the respective surfaces of the film S are excessively charged in either polarity, for example, the first surface 100 is highly negatively charged while the second surface 200 is highly positively charged.

With regard to the functions of the respective static eliminating units, it was explained before that even if the ion-generating capability of the first ion-generating electrode is different from the ion-generating capability of the second ion-generating electrode, the quantities of deposited ions are automatically balanced. However, with regard to the capabilities of the static eliminating units, the situation is different. That is, due to the difference between individual electrodes, contamination, wear with the lapse of time, deformation and the like, it is highly possible that, for example, the ion-generating capability of the first static eliminating unit SU1 is low while the ion-generating capability of the second static eliminating unit SU2 is high. In this case, if DC voltages are applied as described above, more negative ions than positive ions are applied to and deposited on the first surface 100, and more positive ions than negative ions are applied to and deposited on the second surface 200. That is, it can happen that the first surface 100 of the film S as a whole is negatively charged, while the second surface 200 as a whole is positively charged. However, even in this case, the apparent charge densities are zero.

The charge densities opposite to each other in polarity of the respective surfaces are weak if the actions of the static eliminating units are in a normal range, that is, unless there are neither wire breaking nor serious electrode deterioration or the like, and the charges are not so strong as to directly affect the grade of the film S. However, in the case where the film is wound as a roll, it is not preferred since the electric double layer with a large gap shown in document DS1 is formed.

Figure 27:
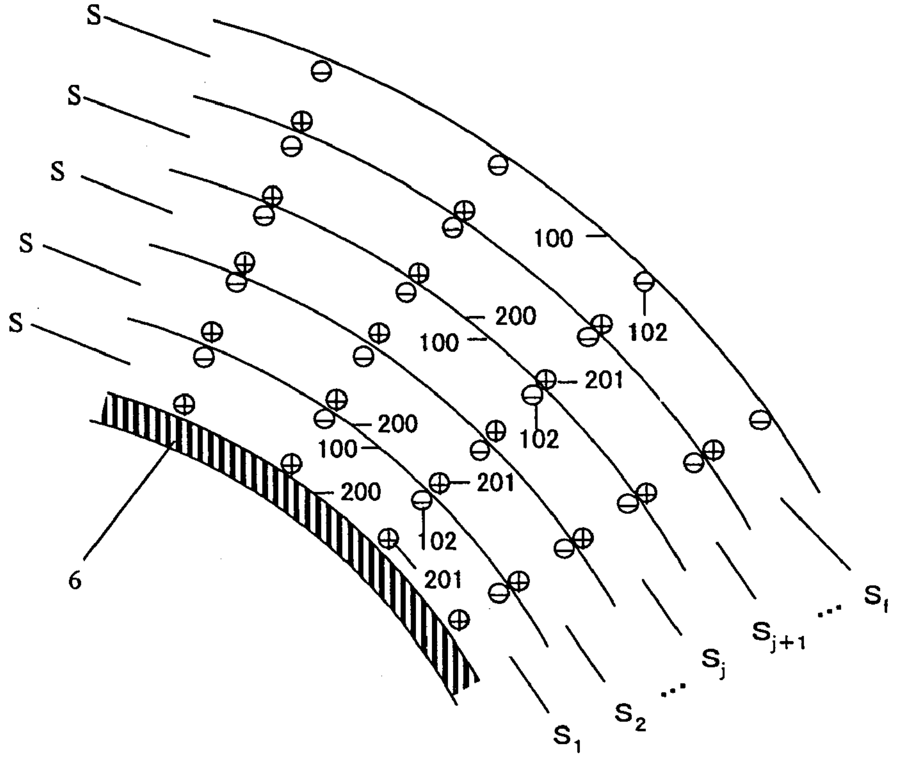
FIG. 27 is a schematic drawing for illustrating a phenomenon in which the potential of a wound sheet roll rises due to the electric double layer.

The electric double layer in a film roll refers to, as shown in FIG. 27, a state where as if there seems to be only positive charges 201 of the second surface 200 (inner surface) of the first layer $S_1$ and negative charges 102 of the first surface 100 (outer surface) of the outermost layer $S_f$. This occurs since the negative charges 102 of the first surface 100 (outer surface) of the first layer $S_1$ balance the positive charges 201 of the second surface 200 (inner surface) of the second layer $S_2$, and further since the negative charges 102 of the first surface 100 (outer surface) of the j-th layer (j is a positive integer) balance the positive charges 201 of the second surface 200 (inner surface) of the (j+1)-th layer, causing there seems to be no charges to exist. In this state, an electric double layer with an apparently large gap is formed in the film roll, to make the surface potential of the film roll large, and such problems as discharge are likely to occur. Therefore, this state is not preferred.

In the case where DC voltages are applied, to avoid that the respective surfaces are charged predominantly monopolarly over the entire film S, the rear side equilibrium potentials of the film S can be measured after the static elimination, and based on the values, the voltages to be applied to the first and second ion-generating electrodes of each static eliminating unit can be controlled. However, this method is not preferred, since such a measure as installing another control system must be taken to complicate the apparatus.

Next, a case of applying an AC voltage is considered. If AC voltages opposite to each other in polarity are applied to the first and second ion-generating electrodes of a static eliminating unit, to forcibly irradiate ions to the film S, portions having large quantities of positive and negative ions deposited appear alternately in the traveling direction of the is film S. As described before, since ions are deposited not only on charged sites of the film S but also on non-charged sites, unintentional positive and negative charges are generated alternately in the traveling direction of the film S. The unintentional positive and negative charges appearing alternately are called irradiation irregularity.

The irradiation irregularity causes the first surface 100 to be positively charged and the second surface 200 to be negatively charged at a specific site of the film S. Furthermore, at another site, the first surface 100 is negatively charged and the second surface 200 is positively charged. This state occurs similarly also in the case where the capabilities of static eliminating units are different. That is, even in the case where the ion-generating capability of the first static eliminating unit is low while the ion-generating capability of the second static eliminating unit is high, the influence of the irradiation irregularity by the second static eliminating unit relatively strongly appear over the entire film S, to charge the film S, and unlike the case where DC voltages are applied, it hardly occurs that the respective surfaces are charged predominantly monopolarly over the entire film S.

Figure 28:
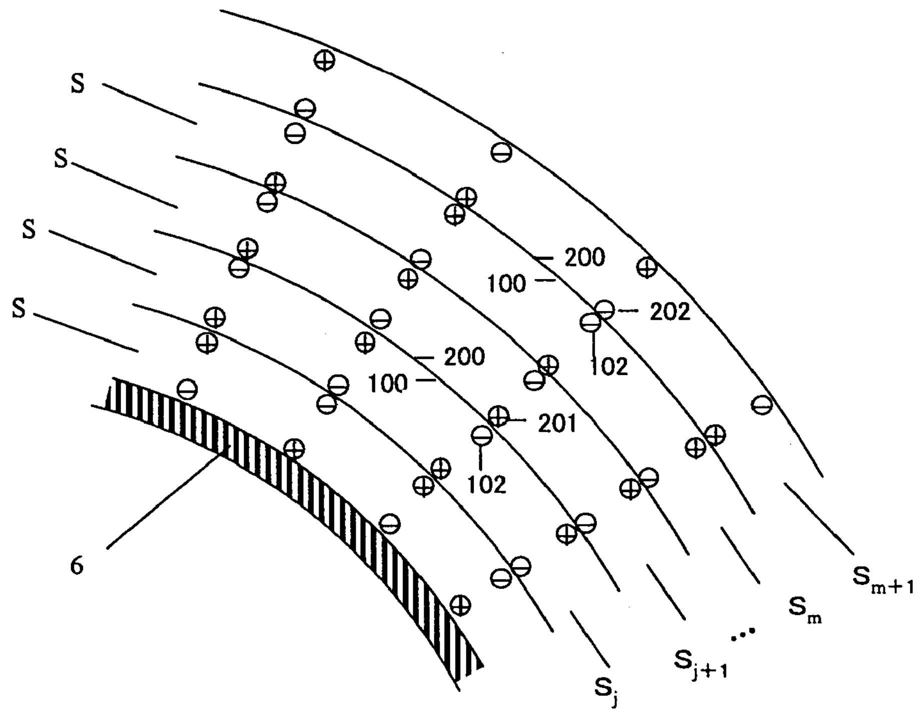
FIG. 28 is a schematic drawing for illustrating the state of the potentials of a wound sheet roll formed by winding a sheet that underwent the static elimination of the invention.

Therefore, as shown in FIG. 28, even if at a certain site of a film roll, the negative charges 102 of the first surface 100 (outer surface) of the j-th layer $S_j$ balance the positive charges 201 of the second surface 200 (inner surface) of the (j+1)-th layer $S_{j+1}$, causing there seems to be no charges to exist at the site, there occurs without fail a situation that the negative charges 102 of the first surface 100 (outer surface) of the m-th layer Sm are identical in polarity with the negative charges 202 of the second surface 200 (inner surface) of the (m+1)-th layer $S_{m+1}$, where m is a positive integer different from j. Therefore, even inside the film roll, positive and negative charges exist reliably adequately uniformly, and lines of electric force are closed among them. There are many sites where the lines of electric force are closed between the charges of the outermost layer and the charges of the inner adjacent layer and between the charges of the first layer and the charges of the outer adjacent layer. As a result, even if the film S is wound as a roll, an electric double layer with a large gap is not formed, and it does not happen that the potential of the roll becomes very large.

In the case where the film is stationary, it is in principle possible that using only one static eliminating unit applied AC voltages, to eliminate the negative charges 102 of the first surface 100 and the positive charges 201 of the second surface 200 simultaneously and subsequently to eliminate the positive charges 101 of the first surface 100 and the negative charges 202 of the second surface 200 simultaneously, or to eliminate in the reverse order.

However, in the case where the film S is traveling, using one static eliminating unit only is not preferred unless its traveling speed is very low, since a site of the film S where only the negative charges 102 of the first surface 100 and the positive charges 201 of the second surface 200 are eliminated, and a site of the film S where only the positive charges 101 of the first surface 100 and the negative charges 202 of the second surface 200, are alternately formed in the traveling direction of the film S. Therefore, in the case where the film S traveling at a speed of about 50 to about 500 m/min, it is necessary to use plural static eliminating units for eliminating charges.

Based on the above description, the mutual disposition and drive conditions of the static eliminating units are explained below.

The explanation of the eliminating effect according to the mutual disposition and drive conditions of the static eliminating units made with the first surface of the film as a typical surface. Because of this, according to the description above, the first and the second surfaces 100 and 200 are forcibly irradiated opposite ions in polarity respectively. Charges on the second surface 200 of the film S are eliminated in the same way as that on the first surface 100 of the film S.

The middle point between the pointed end of the first and second ion-generating electrodes of one static eliminating unit and the middle point of another static eliminating unit adjacent to said unit are positioned apart from each other with a distance $d_2$ in the traveling direction of the film S. The first ion-generating electrodes 5*d-l* to 5*d-n* and the first shield electrodes 5*g-l* to 5*g-n* are connected respectively to be the same in potential, while the second ion-generating electrodes 5*f-l* to 5*f*-2 and the second shield electrodes 5*h*-1 to 5*h-n* are connected respectively to be the same in potential. In the case where an AC voltage is applied, the same AC power supply can be used as the power supply, or plural AC power supplies can also be used in synchronization. Synchronizing plural AC power supplies means that an AC voltage is applied while a predetermined phase difference is kept mutually among the ion-generating electrodes 5*d*-1 to 5*d-n*.

It is preferred that the voltage applied to the first ion-generating electrodes of adjacent static eliminating units is an AC voltage of the same phase (phase difference zero). In the case where voltages opposite to each other in polarity are applied to the first ion-generating electrodes of adjacent static eliminating units, the ions opposite to each other in polarity generated from the first ion-generating electrodes of adjacent static eliminating units are recombined with each other to vanish. This state is not preferred, since the quantities of ions irradiated to the film surfaces are decreased.

The purpose of installing static eliminating units one after another is, as describe before, such that the first static eliminating unit SU1 is used to eliminate the negative charges 102 of the first surface 100 (and the positive charges 201 of the second surface 200,) and that the second static eliminating unit SU2 is used to eliminate the positive charges 101 of the first surface 100 (and the negative charges 202 of the second surface 200.) The roles of the first static eliminating unit SU1 and the second static eliminating unit SU2 can also be reversed. Furthermore, in the case where three or more static eliminating units are used, it is only required that any static eliminating units have this relation, among all the static eliminating units.

Furthermore, in the case where an ion cloud spreads to the regions between mutually adjacent static eliminating units as in the weakly charging mode described below, it is only required to consider the irradiation of ions not only directly under the individual static eliminating units but also in the regions between the static eliminating units. That is, it can be considered that the negative charges 102 of the first surface 100 are eliminated directly under the respective static eliminating units, and the positive charges 101 of the first surface 100 are eliminated in the regions between the static eliminating units. The main purpose of static eliminating units installed one after another in this case is to secure the sufficient spread of ion cloud over the film traveling at a speed of about 50 to about 500 m/min. The installation of static eliminating units one after another like this is also a countermeasure against the irradiation irregularity described above.

To realize this, it is not sufficient to install the static eliminating units merely one after another in the traveling direction of the film S. It is necessary to arrange the respective static eliminating units adequately such that the positive and negative bipolar ions can be irradiated to the respective surfaces at the respective sites of the film S.

The optimization of the disposition should be especially taken into account together with the formation of monopolar ion clouds when the static eliminating unit of the invention having an especially high capability of forcibly irradiating ions to the film S is used. With an ordinary static eliminator with a low ion irradiating capability, it is difficult to form a monopolar ion cloud, and even if two or more static eliminators are installed one after another, the strong charges in the film due to ion irradiation irregularity are hard to occur. Furthermore, in the static eliminators of documents DS2 and DS3 described for the explanation of the prior art, macroscopic apparent charge irregularity is confirmed, but in these documents, no measure more than installing ion-generating electrodes one after another in the traveling direction of the film is described.

In relation with the method for optimizing the disposition of static eliminating units, the inventors found the following two modes.

First Mode (Weakly Charging Mode):

In this mode, though ions are forcibly irradiated to the surfaces of a film, the ions sufficiently spread in the regions between the ion-generating electrodes and the film, and monopolar ion clouds spreading over the entire static eliminating gate consisting of plural static eliminating units is formed. This mode is called the weakly charging mode.

Second Mode (Strongly Charging Mode):

In this mode, the ions are more powerfully irradiated to the surfaces of a film. The ions are concentrated in the regions between the first and second ion-generating electrodes of respective static eliminating units, and a pair of ion clouds opposite to each other in polarity are formed for each static eliminating unit. This mode is called the strongly charging mode.

In the strongly charging mode, in respective static eliminating unit, the respective surfaces of the film are strongly charged opposite to each other in polarity. So, the relation among the intervals between the static eliminating units, the film speed and the frequency of the applied voltages must be optimized to keep low the charges opposite to each other of the respective surfaces of the film by the static eliminating units as a whole.

The boundary for discriminating the weakly charging mode and the strongly charging mode is when the following equation holds.

$$V=0.085\times d_1^2\times f$$

where $d_1$ is the normal direction inter-electrode distance (in mm); V is the applied voltage (average of the first ion-generating electrode applied effective voltage $V_1$ and the second ion-generating electrode applied effective voltage $V_2$) (in V), and f is the frequency of the applied voltage (in Hz).

Figure 24:
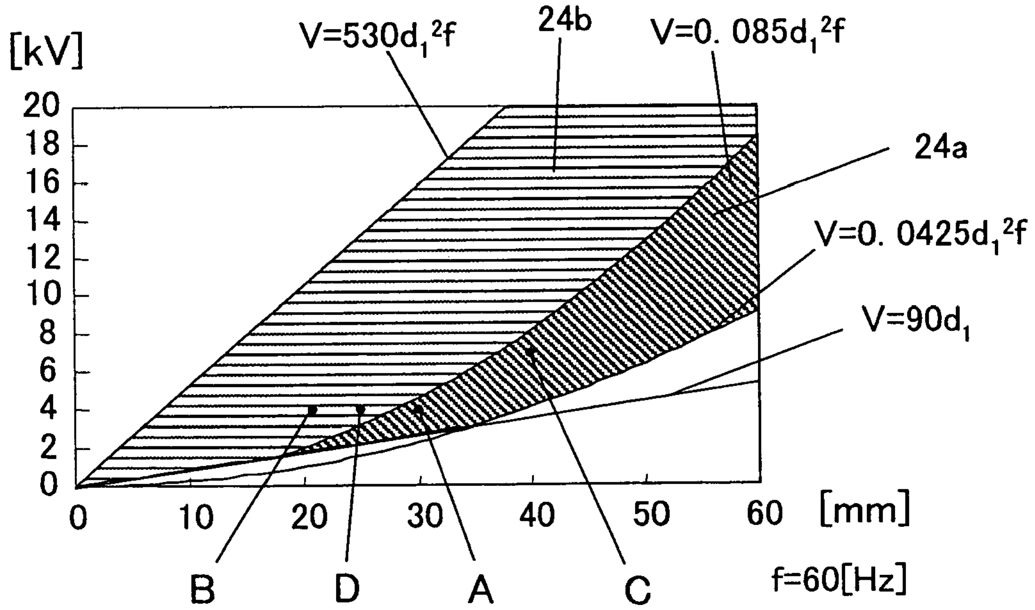
FIG. 24 is a graph for illustrating the relation among the normal direction inter-electrode distance, applied voltage and charging mode.

This relation in the case at the frequency is 60 Hz, is shown in the graph of FIG. 24. In the graph of FIG. 24, the normal direction inter-electrode distance $d_1$ (in mm) is chosen as the abscissa, and the applied voltage V (in kV), as the ordinate. A case where the value of the applied voltage V is smaller than the right side of the above equation is the weakly charging mode. That is, the region **24*a* of FIG. 24 is the region of the weakly charging mode. A case where the value of the applied voltage V is larger than the right side of the above equation is the strongly charging mode. That is, the region 24*b* of FIG. 24** is the region of the strongly charging mode. It is considered that these relations relate to the stationary occurrence limit of the AC corona wind (arrow type corona wind) described before.

It is considered that the time taken for ions generated from an ion-generating electrode to reach a film is proportional to $d_1^2/V$, and if this time corresponds to the time when the polarity of the applied voltage is reversed, i.e., to ½f, it is the stationary occurrence limit of the arrow type corona discharge. Hence, if the following equation $$½f=C\times(d_1^2/V)\ (C \text{ is a constant})$$

is solved, we have the following equation.

$$V=D\times d_1^2\times f\ (\text{D is a constant})$$

Conducting various experiments, the inventors found that the equation $V=0.085\times d_1^2\times f$ is the boundary between the weakly charging mode and the strongly charging mode.

Considering in relation with the formula of forced ion irradiation given before, the mode satisfying the formula $0.0425\times d_1^2\times f\leqq V\leqq 0.085\times d_1^2\times f$ is the weakly charging mode in which the polarity of the applied voltage is reversed once or twice during the time for the ions generated from an ion-generating electrode to reach the film, and the mode satisfying the formula $0.085\times d_1^2\times f<V$ is the strongly charging mode in which the polarity of the applied voltage is reversed only once or less during the time for the ions generated from an ion-generating electrode to reach the film.

The relation between the time for the ions generated from an ion-generating electrode to reach the film and the number of reversed time of the applied voltage is in the case the film S is at the middle position of the first and the second ion-generating electrode in normal direction. The position of the film discrepant from this in normal direction, i.e., the distance from the first ion-generating electrode **5*d*-1 to the film S and that from the second ion-generating electrode 5*f*-1** to the film S are different, the number of reversed time of the applied voltage also change. But these two modes are greatly depend on strength of electric field. Therefore, there is no problem in case where the ratio of the distance between the film and the first ion-generating electrode and the distance between the film and the second ion-generating electrode is shifted in the range from 1:2 to 2:1.

The static elimination effects in the respective modes are described below.

In the weakly charging mode, the arrow type corona wind occurs stationary between ion-generating electrodes and a film. So, the ions generated from the ion-generating electrodes are irradiated as an ion cloud relatively widely spread in the traveling direction of the film. It has been found in a study by the inventors that the spread a of an ion cloud per static eliminating unit in the weakly charging mode can be estimated to be such an extent as expressed by the following equation.

$$a=15\times d_1^2/(d_3\times d_4)\ (\text{in } mm)$$

That is, if the ratio $d_1/d_3$ of the normal direction inter-electrode distance $d_1$ to the normal direction inter-shield-electrode distance $d_3$ is larger, the ion cloud spread a tends to be larger, and if the ratio $d_1/d_4$ of the normal direction inter-electrode distance $d_1$ to the shield electrode opening width $d_4$ is larger, the ion cloud spread a tends to be larger. It is preferred that the adjacent electrode is near the ion cloud spread a.

The inventors found that if the static eliminating unit interval $d_2$ is less than about 80% of the ion cloud spread a, that is, if the following relation $$d_2<12\times d_1^2/(d_3\times d_4)\ (\text{in mm})$$

is satisfied, the ions from the adjacent static eliminating units superimpose each other when they reach the film surfaces. If a voltage of the same phase is applied to the first ion-generating electrodes of all the static eliminating units installed one after another, it can be considered that the ions are irradiated to the film while having a spread substantially as one monopolar ion cloud on the film surfaces.

Figure 25:
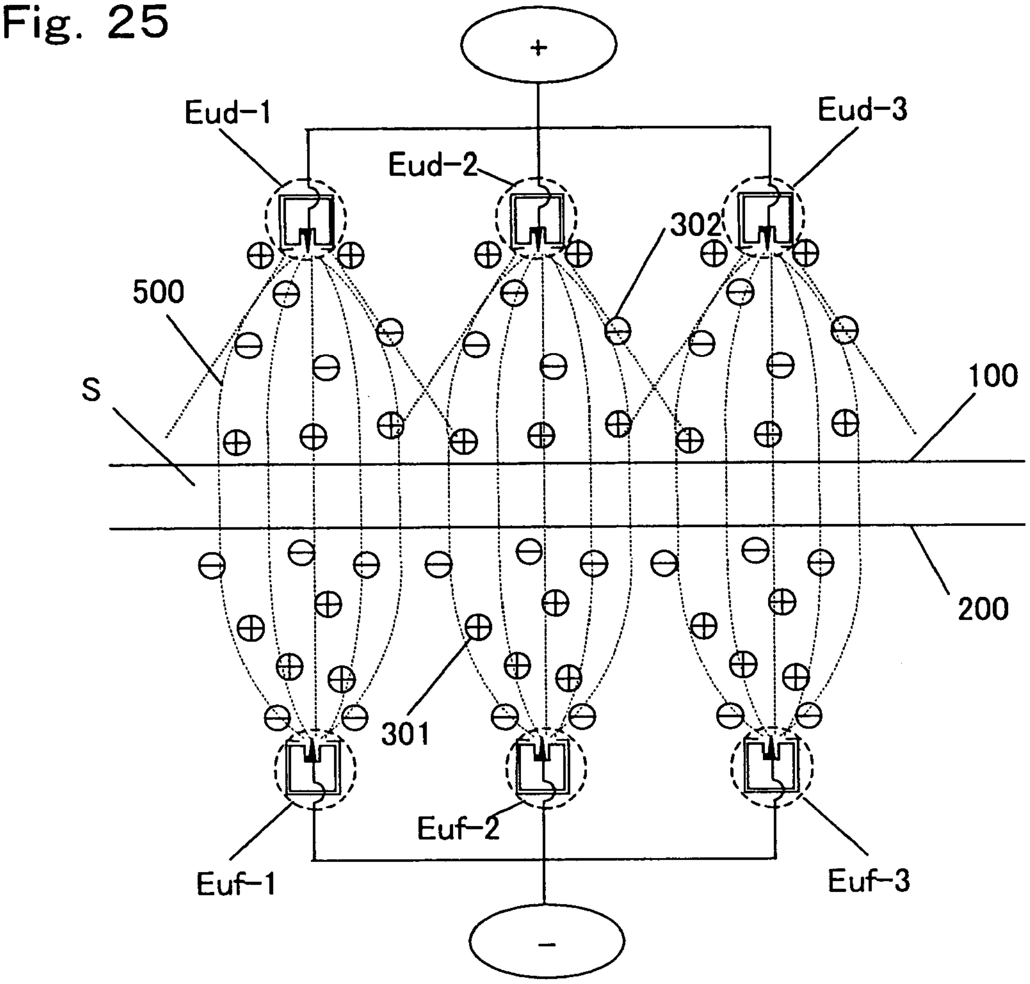
FIG. 25 is a schematic drawing for illustrating the static eliminating action in the weakly charging mode by the static eliminator shown in FIG. 17.

That is, at a certain point of time, positive ions 301 are irradiated to the first surface 100 (while negative ions 302 are irradiated to the second surface 200) at every site on the film S positioned in the static eliminating gate (from the first static eliminating unit to the final static eliminating unit). This state is shown in FIG. 25. At a point of time later than the above-mentioned point of time by one half the cycle (½f) of the applied voltage, when the film has progressed during this period of time, i.e., u/2f, negative ions 302 are irradiated to the first surface 100 (while positive ions 301 are irradiated to the second surface 200) at every site of the film S in the range of the static eliminating gate.

In this case, it is not necessarily required that the first static eliminating unit eliminates the negative charges 102 of the first surface 100, and that the second static eliminating unit eliminates the positive charges 101 of the first surface 100, or vice versa. That is, it is allowed that all the ions irradiated to the first surface 100 are identical in polarity when specific sites of the film S pass directly under the respective static eliminating units (in the state of synchronous superimposition).

The reason is that since an ion cloud spreads over the entire static eliminating gate, ions of opposite in polarity can be sufficiently irradiated to the film S even at a region between static eliminating units, for example, at the central region between the region directly under the first static eliminating unit and the region directly under the second static eliminating unit. However, to both positive and negative ions are irradiated to the first surface 100 at respective sites of the film S, it is necessary that the spread of an ion cloud as a whole is larger than the distance the film travels while the applied voltage changes per cycle.

The whole ion cloud spread in the weakly charging mode is the length of the static eliminating gate ($D_2$) plus a. On the other hand, the distance the film travels at speed u (in mm/sec) while the applied voltage changes per cycle is u/f. Therefore, it is only required to satisfy the formula $D_2+a>u/f$. When the number of static eliminating units n is adequate large, the ion cloud spread can be approximated by $D_2$. When all the static eliminating unit intervals $d_2$ are the same value $d_{20}$, we have $D_2=d_2\times(n-1)$.

On the other hand, the irradiation irregularity can be considered as described below. Since the respective sites of the film S are irradiated with positive and negative ions 301 and 302 continuously temporally and spatially, the film S, i.e., the first surface 100 of the film S does not have any site where monopolar ions only are applied. Therefore, the quantity of final charges of the respective surfaces of the film S is smaller than the sum (n times) of irradiation irregularities of respective static eliminating units.

On the other hand, since the weakly charging mode refers to a region where the arrow type ion wind occurs, the irradiation irregularity per static eliminating unit is small. The inventors examined the charge densities of the irradiation irregularity using a non-charged film, and the irregularity was found to be like sinusoidal waves having an amplitude of about 1 to about 15 $\mu C/m^2$ in the respective surfaces. Therefore, for example, in the static eliminator consisting of 10 static eliminating units, the final charge densities (the sums of irradiation irregularities) of the film S is less than 150 $\mu C/m^2$ in absolute value.

With regard to the static elimination capability, at an originally charged site of the film S, the original charge density can be decreased to such a value obtained by subtracting 150 $\mu C/m^2$ from the original charge density in absolute value. If the original charge density is in a range from about 150 to about 300 $\mu C/m^2$ in absolute value, there is little difference between the charge density achieved after static elimination at an originally charged site of the film S and that at an originally non-charged site of the film S.

That is, finally there is no locally strongly charged site, and the charge densities change smoothly in the traveling direction as decided by the frequency of the applied voltage and the traveling speed of the film S. In such a state of charge, the electric fields in-plane direction near the respective surfaces of the film S are small. So, even in the post-processing where electric fields in-plane direction become a problem, the film S can be used without the problem of static electricity. On the other hand, as the final charges, as explained before, both the surfaces are opposite in polarity and almost equal in charge densities, i.e., the apparent charge densities are almost zero (−2 to +2 $\mu C/m^2$). It can be said that the film is apparently non-charged. Even if the film S is post-processed directly without being treated by DC or AC static eliminating members in the latter stage, the film S does not show the problems arising because of charges.

In the case where it is desired to control the quantities of charges of a film to be coated later, in reference to the potential, the following consideration can be employed.

In the case where it is desired to keep the rear side equilibrium potential $V_f$ of the film S, for example, at $V_0$ (in V) or less, it is only required that the charge density $\sigma_0$ in absolute value satisfies the formula $\sigma_0 \leqq V_0\times C=V_0\times\epsilon_0\times\epsilon_r/d_f$, from the above-mentioned formula of charge density $\sigma$ (in $C/m^2$), film thickness (in m) and rear side equilibrium potential $V_f$ (in v).

The charge density allowed for inhibiting the coating irregularity of the silicone film formed on a polyethylene terephthalate film is $0.009/d_f\ \mu C/m^2$ or less in absolute value, if $\epsilon_r=3$ and $V_0=340$ V are substituted into the above formula. In the case where the charge density has been kept at 150 $\mu C/m^2$ or less in absolute value, if the film has a thickness of less than about 60 μm, the rear side equilibrium potential can be kept at 340 V or less in absolute value. However, if the film has a thickness of more than the value, the rear side equilibrium potential can be so high in absolute value as to cause coating irregularity even if the charge density is kept at 150 $\mu C/m^2$ or less in absolute value.

Therefore, if the film has a thickness of 60 μm or more, it is preferred in view of inhibiting the coating irregularity, not only to keep the charge density in a range from −150 $\mu C/m^2$ to 150 $\mu C/m^2$, but also to keep the rear side equilibrium potential in a range from −340 V to 340 V, considering the influence of the film thickness on the rear side equilibrium potential of the film. The amplitude of charge density caused by the irradiation irregularity per static eliminating unit is, as described before, about 15 $\mu C/m^2$ at the highest in the weakly charging mode. Therefore, the net number of static eliminating units that are allowed to be used in the synchronous superimposition state can be obtained as an integer in a range from 0 to $0.0006/d_f$, the value obtained by dividing the allowable value of charge density ($0.009/d_f\ \mu C/m^2$) by the highest value of the amplitude of charge density of irradiation irregularity 15 $\mu C/m^2$.

Since the irradiation irregularity from the static eliminating units remaining after subtracting this number from n, the total number of the static eliminating units, is not allowed, it must be canceled out. So, in order to keep the final rear side equilibrium potential respective surfaces of the film in a range from −340 to +340 V, it is only required that the voltages applied to the first ion-generating electrodes are identical in polarity, in the number of static eliminating units in a range from the value of $(n-0.0006/d_f)/2$ to the value of $(n+0.0006/d_f)/2$, when respective sites of the film pass directly under the respective static eliminating units. The number of static eliminating units is a integer. So, the above mentioned number of static eliminating units where voltages of same polarity are applied to the first ion-generating electrodes of them can be chosen from integer 0 to n.

It can happen that the value of $(n-0.0006/d_f)/2$ is a minus number. For example, it happens in the case where a film with a thickness of less than 60 μm is used in a static eliminator consisting of 10 static eliminating units. This means that when specific sites of the film pass directly under all the static eliminating units, the voltages applied to the first ion-generating electrodes of all the static eliminating units can be identical in polarity. That is, it means that the synchronous superimposition state is allowed. In this case, when respective sites of the film pass, the number of the static eliminating units where voltages of the same polarity are applied to the first ion-generating electrode of them can be any number from 0 to n. In the weakly charging mode, since the ions spread over the static eliminating gate as a whole, the synchronous superimposition state is allowed, as described before.

Also in the case it is desired to keep the rear side equilibrium potentials of the respective surface of the film in a range from −200 V to 200 V, i.e., to keep the potential at which the coating irregularity by Isopar does not occur, similar consideration can be employed. The value of the allowable charge density allowed in this case is $0.0053/d_f$ $\mu C/m^2$ in absolute value in the case where the film is a polyethylene terephthalate film and where the value of its dielectric constant $\epsilon$ is 3. Therefore, if the total number of static eliminating units is n, when respective sites of the film pass directly under the respective static eliminating units, it is only required that the voltages applied to the first ion-generating electrodes are identical in polarity, in the number of static eliminating units in a range from the value of $(n-0.00035/d_f)/2$ to the value of $(n+0.00035/d_f)/2$. The above mentioned number of static eliminating units where voltages of same polarity are applied to the first ion-generating electrodes of them can be chosen from integer 0 to n.

On the other hand, in the case where the quantities of charges of the respective surfaces of the film are very large, for example, in the case where the charge densities of the respective surfaces are in a range from about 300 to about 500 $\mu C/m^2$ in absolute value or in the case where the traveling speed of the film S is high, it can happen that the weakly charging mode cannot be used. The reason is that since the absolute quantity of ions is small in the weakly charging mode, very many static eliminating units, that is, tens of to 100 static eliminating units are necessary for decreasing the quantities of charges of the respective surfaces to the desired value. In such a case, it is preferred to use the strongly charging mode for eliminating charges from the film S. However, in the strongly charging mode, the quantities of ions generated by the respective ion-generating electrodes are large, and total irradiation irregularity is large. So, countermeasures against them are necessary.

In the strongly charging mode, the influence of the arrow type corona discharge virtually vanishes, and the ions are concentrated directly under the ion-generating electrode that have generated the ions. Therefore, the ion clouds cannot be identified as a monopolar ion cloud spreading over the static eliminating gate as a whole, but must be identified as plural pairs of small ion clouds formed to spread in relation with the respective static eliminating units.

In this case, the film S is irradiated with spatially discrete plural pairs of positive and negative ion clouds. The final charges of the first surface 100 of the film S are in the form of the sums of the irradiation irregularities by the respective static eliminating units at originally non-charged sites of the film S. If the numbers of the ion clouds irradiated to the film S are almost the same irrespective of polarity, the static elimination effect is highest. Furthermore, since the irradiation irregularities by the respective static elimination units are cancelled out, finally the charge densities of the respective surfaces of the film S caused by the irradiation irregularities are almost zero.

If the polarity of the ion clouds corresponding to ¼ or more of all the ion clouds is opposite to that of the other ion clouds, one half or more of the applied ions are effectively consumed for static elimination. Furthermore, the action for mutually weakening the irradiation irregularities from the respective static eliminating units is stronger than the action for mutually strengthening the irradiation irregularities. Therefore, among the ion clouds applied to all the sites in the traveling direction of the film S, it is preferred that the polarity of the ion clouds corresponding to ¼ or more of the ion clouds is opposite to that of the other ion clouds. In the case where the voltages applied to the ion-generating electrodes have a waveform smoothly changing in polarity such as sinusoidal waves, triangular waves or trapezoidal waves, if the polarity of the ion clouds corresponding to ¼ or more of all the ion clouds is opposite to the polarity of the other ion clouds over the sites corresponding to ⅔ or more of all the sites in the traveling direction of the film S, there arises no practical problem.

The following discuses the sites irradiated with superimposed ion clouds identical in polarity corresponding to ¾ or more of all the ion clouds in this case, that is, the sites corresponding to ⅓ or less of all the sites in the traveling direction of the film. The irradiation irregularity in these sites is caused by the ions generated immediately before and after the moment when the voltages applied to ion-generating electrodes are reversed in polarity. In the case where the voltages applied to ion-generating electrodes have a waveform changing smoothly in polarity such as sinusoidal waves or triangular waves, the quantities of ions generated immediately before and after the moment when the applied voltages are reversed in polarity are small. Therefore, since the irradiation irregularities at the sites are small, no large irregularities occur in the final charges of the respective surfaces of the film S.

In the strongly charging mode, in the case where all the static eliminating units are installed one after another with the same intervals of $d_{20}$ and where AC voltages of the same phase are applied to the first ion-generating electrodes of the respective static eliminating units, the synchronous superimposition intensity X of the ions applied to the respective surfaces of the film S can be obtained from the following equation.

$$X=|\sin(n\pi f d_{20}/u)/\{(n\cdot\sin(\pi f d_{20}/u))|$$

where $ku \neq fd_{20}$, and k=1, 2, 3, . . .

If $ku=fd_{20}$, then X=1.

This equation is obtained as described below.

Assuming that the distribution of the charge densities of the first surface 100 of the film S by the irradiation irregularity of each static eliminating unit is the form of sinusoidal wave, it is approximated in the form of $\sin(2\pi x/u)$, where x denotes a relative position in the traveling direction of the film.

If the distribution of the charge densities of the first surface 100 of the film S by the irradiation irregularity of the first static eliminating unit is $\sin(2\pi fx/u)$, the distribution of the charge densities of the first surface 100 of the film S by the irradiation irregularity of the second static eliminating unit can be expressed in the form of $\sin(2\pi f(x-d_{20})/u)$ since the static eliminating unit interval is $d_{20}$. That is, for the respective static eliminating units adjacent to each other with static eliminating unit intervals of $d_{20}$, the distribution of the charge densities caused by irradiation irregularities shifting by phase $(2\pi fd_{20}/u)$ respectively occur.

Figure 26:
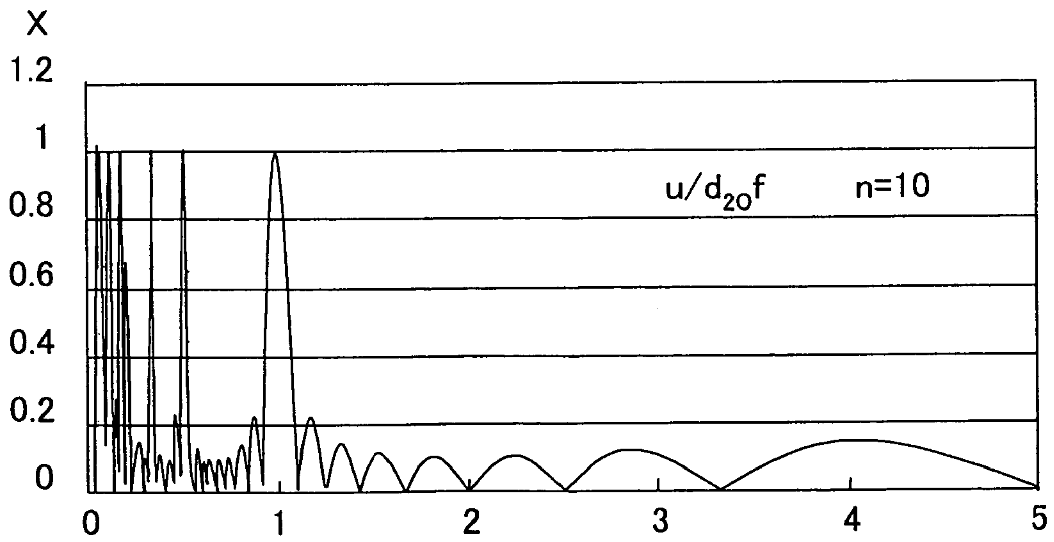
FIG. 26 is a graph for illustrating an example of the synchronous superimposition intensity by the eliminator shown in FIG. 17.

The sum of these distributions of the charge densities is the final charge distribution of the first surface 100 of the film S. The value of said X corresponds to the amplitude of the sum. When the value of X is $0 \leqq X \leqq 0.5$, ions are applied to the film S in such a manner that the polarity of the ion clouds corresponding to ¼ or more of all the ion clouds is opposite to that of the other ion clouds over the sites corresponding to ⅔ or more of all the sites in the traveling direction of the film S. In the case of n=10 (10 static eliminating units), the values of X for $u/(d_{20}\times f)$ are obtained and shown in the graph of FIG. 26. In the graph of FIG. 26, the value of the speed to the static eliminating unit interval standardized by the frequency $\{u/(d_{20}\times f)\}$ is chosen as the abscissa, and the value of synchronous superimposition intensity X, as the ordinate.

In the case where the synchronous superimposition intensity X satisfies the formula $0 \leqq X<0.5$, the charge densities of respective surface of the film S by the irradiation irregularities from all the static eliminating units are suppressed to less than one half compared with the case of synchronous superimposition. If irradiation irregularities are superimposed with various phase differences, that is, phase differences corresponding to distances $d_{20}$, $2d_{20}$, $3d_{20}$, . . . under plural static eliminating units, the irradiation irregularities are more cancelled out in reverse phases, rather than they are emphasized in the same phases. This means that finally the charge irregularity of the film S is low.

It is more preferred to change the traveling speed u of the film S, the static eliminating unit intervals $d_{20}$ or the frequency f of the applied voltages for keeping the value of synchronous superimposition intensity X in a range of $0 \leqq X<1/n$, since the final charge densities of the respective surfaces of the film S can be decreased to not larger than the charge densities by the irradiation irregularity per static eliminating unit. As a result, at the same time, the following state can be obtained: positive ions are applied from the static eliminating units corresponding to almost one half of all the static eliminating units, while negative ions are applied from the other static eliminating units corresponding to almost one half of all the static eliminating units, to the respective sites of the first surface 100 of the film S. This state is the most ideal positive and negative ion irradiation state that brings about a high static elimination effect.

Therefore, in the case where static elimination in the weakly charging mode is difficult since the quantities of charges of the respective surfaces of the film are very large or since the traveling speed of the film S is high, it is preferred to positively use the strongly charging mode. The strongly charging mode is useful in the case where the formula $V>0.085\times d_1^{\ 2}\times f$ holds, judging from the formula applicable in the case where the arrow type corona wind occurs.

In the strongly charging mode, the irradiation irregularities per static eliminating unit are larger than in the weakly charging mode. The inventors examined the distributions of charge densities caused by the irradiation irregularities per static eliminating unit using a non-charged film, and the distributions of the respective surfaces were like sinusoidal waves with an amplitude of about 10 to about 30 $\mu C/m^2$ in absolute value. For example, in a static eliminator consisting of 10 static eliminating units, if the value of X is selected to satisfy the formula $0 \leqq X<0.5$, the absolute values of the final charge densities (sums of the charge densities by the irradiation irregularities (highest amplitude values) of the respective surfaces of the film S can be kept smaller than 150 $\mu C/m^2$.

At an originally charged site of the film S, the original charge density can be decreased to such a value obtained by subtracting from 150 $\mu C/m^2$ to 300 $\mu C/m^2$ from the original charge density in absolute value. If the original charge density is in a range from about 300 to about 500 $\mu C/m^2$ in absolute value, there is little difference between the charge density achieved after static elimination at an originally charged site of the film S and that at an originally non-charged site of the film S.

That is, finally there is no locally strongly charged site, and the charge densities change smoothly in the traveling direction as decided by the frequency of the applied voltage and the traveling speed of the film S. In such state of charge, the electric fields in-plane direction near the respective surfaces of the film S are small. So, even in the post-processing where electric fields in-plane direction become a problem, the film S can be used without the problem of static electricity.

In the strongly charging mode, relatively strong irradiation irregularities occur, but the irradiation irregularities of both the surfaces are opposite to each other in polarity and almost equal in charge density. So as the final charges, as explained before, the apparent charge densities are in a range from −2 to +2 $\mu C/m^2$. It can be said that the film is apparently non-charged. Even if the film is post-processed directly without being treated by DC or AC static eliminating members in the latter stage, it does not show any problem concerning charges.

If the value of X is selected to satisfy the formula $0 \leqq X<1/n$, the absolute values of the charge densities in the respective surfaces of the final film S (highest amplitude values) can be kept at less than about 30 $\mu Cm^2$, the amplitude of charge densities due to the irradiation irregularities per static eliminating unit and a substantially non-charged film S can be obtained.

Also in the strongly charging mode, in the case where it is desired to control the quantities of charges of a film to be coated later, in reference to potentials, the following consideration can be employed as in the weakly charging mode.

In a film S having a thickness of $d_f$ (in m), the charge density in absolute value for keeping the rear side equilibrium potential of the film at 340 V or less in absolute value is $0.009/d_f$ $\mu C/m^2$ or less as described before. On the other hand, the amplitude of charge density caused by the irradiation irregularity per static eliminating unit is about 30 $\mu C/m^2$ at the highest as described before. Therefore, the net number of static eliminating units that are allowed to be used in the synchronous superimposition state is obtained as an integer in a range from 0 to $0.0003/d_f$, the value obtained by dividing the value of allowable charge density ($0.009/d_f$ $\mu C/m^2$) by 30 $\mu C/m^2$ that is the highest value of the amplitude of charge density of irradiation irregularities per a static eliminating unit.

The irradiation irregularities from the static eliminating units remaining after removing the obtained number of static eliminating units from n, the total number of the static eliminating units, must be cancelled out. To keep the final rear side equilibrium potential of respective surfaces of the film S in a range from −340 V to 340 V, it is only required that the voltages applied to the first ion-generating electrodes are identical in polarity, in the number of static eliminating units in a range from $(n-0.003/d_r)/2$ to $(n+0.0003/d_f)/2$ when respective sites of the film pass directly under the respective static eliminating units. The number of static eliminating units is a integer. So, the above mentioned number of static eliminating units where voltages of same polarity are applied to the first ion-generating electrodes of them can be chosen from integer 0 to n It can happen that the value of the above-mentioned formula of $(n\ -0.0003/d_f)/2$ becomes a minus number. It means that even if the voltages applied to the first ion-generating electrodes of all the static eliminating units are identical in polarity when specific sites of the film S pass directly under all the static eliminating units, that is, even in the synchronous superimposition state, coating irregularity of the coating material in the post-processing does not occur for the finally generated charges of the film S, due to the superimposition of irradiation irregularities.

For example, in a static eliminator consisting of 10 static eliminating units, if the film S has a thickness of less than 30

μm, the value of $(n-0.0003/d_f)/2$ becomes minus. This means that in the case where the film S has a thickness of less than 30 μm, even if the ten static eliminating units are in the synchronous superimposition state in the strongly charging mode, the coating irregularity of the coating material in the post-processing does not occur since the final rear side equilibrium potential of respective surfaces of the film S due to irradiation irregularities are in a range from −340 V to 340 V. However, in the static elimination in the strongly charging mode, since ions are densely applied directly under the static eliminating units, there occur sites where positive ions only or negative ions only are applied in the respective surfaces of the film S under the condition in which the first ion-generating electrodes of all the static eliminating units apply ions identical in polarity (in the synchronous superimposition state).

From the viewpoint of static elimination and in the sense of inhibiting the defects other than coating irregularity, the voltages applied to the first ion-generating electrodes of at least one static eliminating unit should be opposite in polarity. Even if the synchronous superimposition state is in an allowable range for the coating irregularity caused by the final charges of the film S due to the superimposition of irradiation irregularities, synchronous superimposition is not a preferred state from the viewpoint to decrease the charge densities of the respective surfaces of the film S before static elimination, i.e., in view of static elimination. To achieve the purpose of static elimination, it is preferred that the net number of static eliminating units that are allowed be used in the synchronous superimposition state is up to n-1 at the largest. For this purpose, it is only required that the voltages applied to the first ion-generating electrodes are identical in polarity, in the number of static eliminating units in a range from $(n-0.0003/d_f)/2$ to $(n+0.0003/d_f)/2$, when respective sites of the film S pass directly under the respective static eliminating units, and the above mentioned number of static eliminating units is integer number from 1 to n−1.

In the case where it is desired to keep the rear side equilibrium potentials of the respective surface of the film S in a range from −200 V to 200 V, for example at not higher than the potential at which the coating irregularity due to Isopar does not occur, using the strongly charging mode, it is only required that the voltages applied to the first ion-generating electrodes are identical in polarity, in the number of static eliminating units in a range from $(n-0.00018/d_f)/2$ to $(n+0.00018/d_f)/2$, when respective sites of the film S pass directly under the respective static eliminating units, and the above mentioned number of static eliminating units is integer number from 1 to n.

The two static elimination modes of the strongly charging mode and the weakly charging mode can be adequately selectively used in the case where portions different in speed exist in one product in the secondary processing of the film S, for example, in a slitting process. For example, in a speed range in which the film S travels at a high constant speed, the static eliminating unit intervals $d_{20}$ and the applied voltage frequency f are set to achieve $0 \leqq X<0.5$, and in this range, the strongly charging mode is used. And during acceleration or deceleration in a speed range in which X is 0.5 or more, low voltages can be applied to employ the weakly charging mode for static elimination, for avoiding the strong irradiation irregularities in the strongly charging mode. Setting can be made to achieve $0 \leqq X<1/n$ instead of $0 \leqq X<0.5$ The transfer to the spark discharge decides the upper limit of the applied voltage V. According to the Handbook on Static Electricity (in Japanese), The Institute of Electrostatics Japan, Ohmsha, Ltd., 1998, page 46 (hereinafter called document DS12), the spark voltage of negative corona, i.e., the voltage $V_b$ (in V) in absolute value at which the negative corona discharge with a negative DC voltage applied transfers to the spark discharge is proportional to the inter-electrode distance d (in mm), being about 1500d. On the other hand, the voltage at which the spark voltage of positive corona, i.e., the voltage at which the positive corona discharge with a positive DC voltage applied transfers to the spark discharge is about ½ of $V_b$.

For inhibiting the transfer to the spark discharge, the positive-side peak voltage must be kept smaller than $V_b/2$. That is, if the same effective voltage V applied to the first and second ion-generating electrodes respectively it is only required that the one-side peak voltage Vp satisfies the formula $V_p<750 \times d_1$. The formula expressed by the effective voltage V in the case where an AC voltage is applied is $V<530 \times d_1$. Further the upper limit of the applied voltage V actually depends on such as the structure of the electrode unit, in the case the distance between the ion-generating electrode and the shield electrode is short, or the like. The possible value of the normal direction inter-electrode distance $d_1$ is in a range from about 20 to about 100 mm, more preferably, about 25 to about 40 mm, though also depending on the frequency.

In the embodiment shown in FIG. 17, the first and second shield electrodes 5*g*-1 to 5*g*-*n* and 5*h*-1 to 5*h*-*n* of respective static eliminating units are grounded. However, in the range satisfying the following formula, a potential difference can also be given between the first and second shield electrodes 5*g*-*k* and 5*h*-*k* of k-th static eliminating unit SUk, to generate an electric field between them. The applied potential of the first and second shield electrodes of all the static eliminating units are preferably respectively the same.

$$|Vs_1-Vs_2|/d_3<5 \text{ (in V/mm)}$$

$Vs_1$: Potential of first shield electrode 5*g*-*k* (in V)

$Vs_2$: Potential of second shield electrode 5*h*-*k* (in V)

In the above, if $Vs_1-Vs_2=Vs$, then Vs is the potential difference between the first and second shield electrodes 5*g*-*k* and 5*h*-*k*.

The method for generating a weak electric field between the first and second shield electrodes 5*g*-*k* and 5*h*-*k* can be preferably used, for example, for actively feebly charging the respective surfaces of a film S greatly different in charge characteristic between the first surface 100 and the second surface 200, for canceling the unbalance in the quantity of frictional charges when charges are eliminated from the film S. As an example of the film S greatly different in charge characteristic between the first surface 100 and the second surface 200, there is a film obtained by coating the second surface of a base film with a coating material. In such a film, for example, the first surface 100 is likely to be negatively charged due to the properties of the base film, and the second surface 200 is likely to be positively charged due to the influence of the coating material. In this case, it is desirable to positively charge the first surface 100 and negatively charge the second surface 200. It is desirable to avoid generating a larger electric field between the first and second shield electrodes 5*g*-*k* and 5*h*-*k*, since otherwise the respective surfaces of the film S are excessively charged.

In the case of a film S in which some difference in the tendency of being charged between the respective surfaces does not pose any problem like frictional charges, it is preferred to electrically connect the first and second shield electrodes 5*g*-1 to 5*g*-*n* and 5*h*-1 to 5*h*-*n* with each other for keeping the same potential. Especially not to generate an electric field in relation with a grounded nearby structure such as a carrier roll, it is simplest and preferred to ground both the first and second shield electrodes 5g-1 to 5g-n and 5h-1 to 5h-n.

Figure 29:
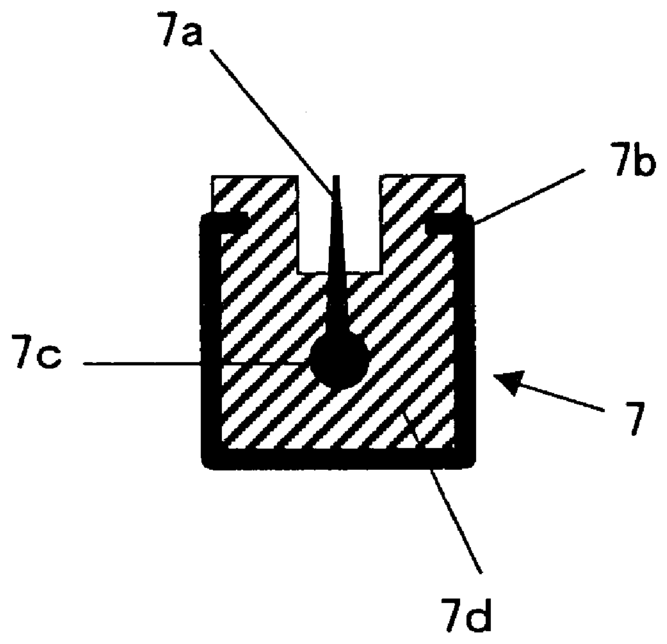
FIG. 29 is a schematic front sectional view showing a mode of an electrode unit in the static eliminator of the invention.
Figure 30:
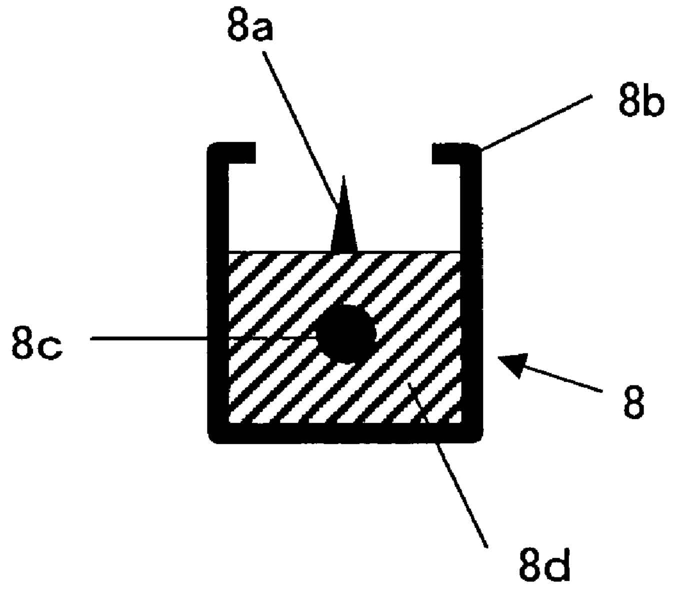
FIG. 30 is a schematic front sectional view showing another mode of an electrode unit in the static eliminator of the invention.

FIGS. 29 and 30 show examples of the discharge electrodes used as the first and second electrode units Eud-k and Euf-k, for irradiating positive and negative ions 301 and 302 substantially simultaneously to both the surfaces of the film S by an electric field between the electrodes facing each other.

In FIG. 29, a discharge electrode 7 consists of an ion-generating electrode 7a, a shield electrode 7b, a high voltage core wire 7c connected with a high voltage power supply (not shown in the drawing) and an insulating component 7d for separating the ion-generating electrode 7a from the shield electrode 7b.

In FIG. 30, a discharge electrode 8 consists of an ion-generating electrode 8a, a shield electrode 8b, a high voltage core wire 8c connected with a high voltage power supply (not shown in the drawing), and an insulating component 8d for separating the ion-generating electrode 8a from the shield electrode 8b. As the electrode unit, a constitution as shown in FIG. 29 in which the ion-generating electrode 7a is directly coupled with the high voltage core wire 7c can be used, or a constitution as shown in FIG. 30 in which the ion-generating electrode 8a and the high voltage core wire 8c are capacitively coupled through the insulating component 8d can be used. A constitution in which the ion-generating electrode and the high voltage core wire are resistance-coupled through a protective resistance can also be used.

In the ion-generating electrode in the invention, as shown in FIGS. 29 and 30, it is preferred that at least a portion of the shield electrode 7b or 8b is positioned behind the ion-generating electrode 7a or 8a, and that the ion-generating electrode 7a or 8a is insulated from the shield electrode 7b or 8b by the insulating component 7d or 8d. The shield electrode can also be split into a component forming an opening near the pointed end of the ion-generating electrode and a component for shielding the rear side of the ion-generating electrode. As shown in FIG. 29 or 30, an integral shield component can also be employed.

In a static eliminator as shown in FIG. 17 in which the first and second ion-generating electrodes 5d and 5f are disposed to face each other, if the applied voltages are raised, spark discharge may occur between the first ion-generating electrode 5d and the second ion-generating electrode 5f. If shield electrodes are positioned also at the rear sides, stable corona discharge occurs between the shield electrodes and the ion-generating electrodes. If insulating components are used for insulating ion-generating electrodes from the rear sides of shield electrodes, the spark discharge between ion-generating electrodes and shield electrodes can be inhibited. These methods are described in JP 53-6180 B (hereinafter called document DS13).

The rear side in this case means the side of the pointed ends of an ion-generating electrode, in opposite to the ion-generating electrode disposed to face the former electrode. If a shield electrode is disposed near the ion-generating electrode, it can share the base plate or the like supporting the electrodes as a whole. It is preferred that the distance between an ion-generating electrode and a shield electrode is shorter than the normal direction inter-electrode distance $d_1$. It is preferred that the distance between an ion-generating electrode and a shield electrode is in a range from about 5 to about 20 mm. A more preferred range is from about 10 to about 15 mm.

The normal direction inter-shield-electrode distance $d_3$ can also be smaller than the normal direction inter-electrode distance $d_1$. In this case, the tips of a shield electrode is positioned in front of the pointed ends of an ion-generating electrode in the direction to face the ion-generating electrode disposed to face the former electrode. However, if the normal direction inter-shield-electrode distance $d_3$ is smaller than the normal direction inter-electrode distance $d_1$, the shield electrode absorbs many of the generated ions, to decrease the quantity of ions. It is preferred that the position of a shield electrode satisfies formula $0.9 \leqq d_1/d_3 < 1.15$.

Figure 31:
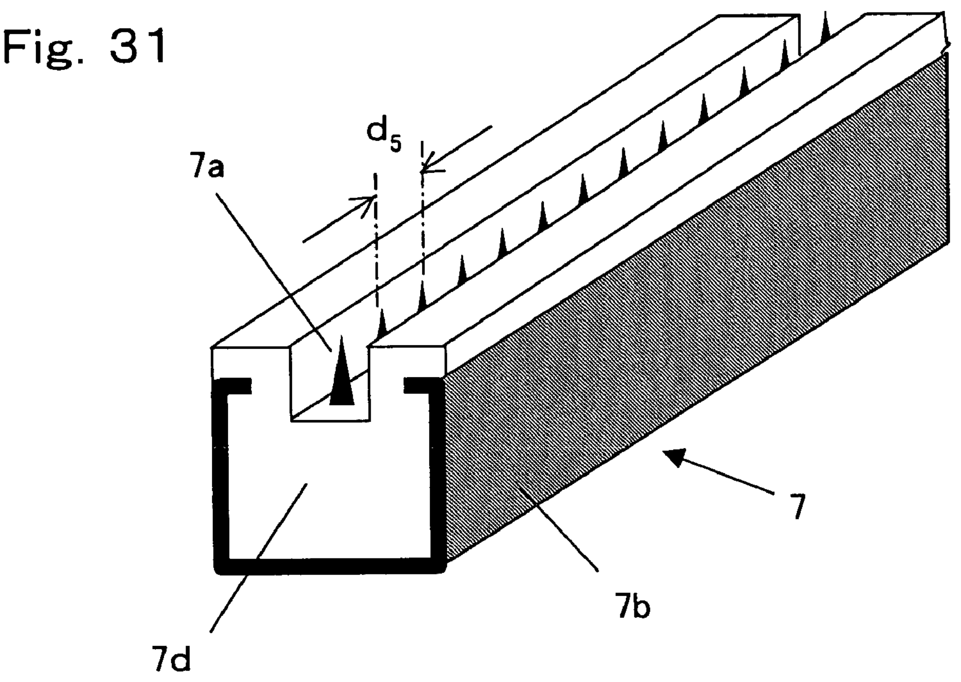
FIG. 31 is a schematic front sectional view showing an electrode unit showing in FIG. 29 in the static eliminator of the invention.

It is preferred that the ion-generating electrode is an array of needle electrodes as shown in FIGS. 29, 30 and 31. An electrode with low rigidity such as a wire electrode is not preferred in the case where the charges of a wide film are eliminated, since a loose wire or slight deviation of the wire in parallelism makes the normal direction inter-electrode distance $d_1$ irregular in the width direction of the film, the uniformity of discharge in the width direction being liable to be lost. In the case of needle electrodes, it is preferred that the intervals of the needle electrodes (intervals in the width direction) $d_5$ are in a range from about ½ time to about 2 times the static eliminating unit intervals $d_2$, and in a range from about 10 to about 40 mm. It is preferred that the opening of a shield electrode is continuous in the width direction as shown in FIG. 31.

The reason is that if the opening of a shield electrode is continuous in the width direction, the ions generated from the individual needle electrodes of each ion-generating electrode spread in the width direction. In this case, the difference in the quantity of irradiated ions between the positions directly under the needle electrodes and the positions under the regions between the needle electrodes is small. In the weakly charging mode, the sites of the film passing directly under the needle electrodes and the sites of the film under the regions between the needle electrodes are little different in the magnitude of charge densities caused by irradiation irregularity. Also in the strongly charging mode, the difference in the magnitude of charge densities caused by irradiation irregularity is only about one half at the largest. The value of the amplitude, 30 $\mu C/m^2$ as the charge density of the film due to irradiation irregularity described before is the largest value in the width direction and corresponds to the sites of the film passing directly under the needle electrodes.

In this case, the intervals of the tips of the needle electrodes of the first and second ion-generating electrodes in the width direction can be larger than the electrode discrepancy $d_0$ and can be about the distance $d_1$ between the pointed ends of the ion-generating electrodes in the direction normal to the sheet without any problem. On the other hand, in the case where the opening of a shield electrode is provided as openings discrete in the width direction of the film, for example, in the case where a pipe-shaped electrode with round holes formed only near the needle electrodes is used as the shield electrode, it is preferred that the intervals of the corresponding tips of the needle electrodes of the first and second ion-generating electrodes in the width direction of the film are virtually equal to the electrode discrepancy $d_0$.

In the case where the shield electrode has openings discrete in the width direction as described above, the shield electrode does not have any opening in some positions in the width direction. In the positions in the width direction, the values of the shield electrode opening width $d_4$ and the like in the invention cannot be specified. In this case, it is only required that the formulae of the invention hold at the respective positions in the width direction where the openings of the shield electrode exist.

On the other hand, with regard to the positional relation of the tips of needle electrodes in the width direction among the static eliminating units, the following can be said. In the case where the opening of each shield electrode is continuous in the width direction as shown in FIG. 31, the positional relation of the tips of the needle electrodes in the width direction among the static eliminating units is not so important. However, in the case where more homogeneous static elimination is intended or in the case where each shield electrode has openings discrete in the width direction, it is preferred that the positions of the tips of the needle electrodes in the width direction are different from static eliminating unit to static eliminating unit.

With regard to the total number n of static eliminating units, n=1 is not preferred since there is some sites in which only either positive or negative ions can be irradiated to the respective surfaces of the traveling film at the respective sites. In order that both the positive and negative ions are irradiated to the respective surfaces of the traveling film at the respective sites, it is necessary that formula $n \geqq 2$ should be satisfied.

According to the invention, when charges are eliminated from a film having local charges, especially local both-side bipolar charges such as static marks, the charge densities of the respective surfaces of the film can be sufficiently lowered, but the number n of all the static eliminating units is selected based on the quantities of local charges of the respective surface of the film and the quantities of allowable charges depending on the post-processing. If the quantities of charges to be decreased in absolute value of the charge densities are in a range from about 30 to about 200 $\mu C/m^2$, the adequate number n of static eliminating units in the weakly charging mode is in a range from 10 to 20, and the adequate number n of static eliminating units in the strongly charging mode is in a range from 5 to 10. Furthermore, if the quantities of charges to be decreased in absolute value of the charge densities are in a range from about 300 to about 500 $\mu C/m^2$, the adequate number n of static eliminating units in the weakly charging mode is in a range from 20 to 40, and the adequate number n of static eliminating units in the strongly charging mode is in a range from 10 to 20.

There is no theoretical upper limit for the static eliminating gate length $D_2$, and the static eliminating gate length $D_2$ can be decided at an adequate value based on the number of electrode units used and practical dimensions. It can be said that the upper limit in an actual film producing apparatus or processing apparatus is about 1000 mm. In the case where the static eliminating gate length $D_2$ must be further longer, a sufficient effect can be obtained, even if, for example, ten static eliminating units are disposed in two groups, each consisting of five units.

The reason is that in the respective static eliminating units of the static eliminator of the invention, an apparently non-charged state can be kept. Therefore, unlike the static eliminator disclosed in document DS2, the film from which charges have been eliminated according to the invention, does not cause discharge even if it approaches or gets in contact with a grounded nearby structure such as a carrier roll, even if it is not treated by means of DC and/or AC static eliminating members in the latter stage.

As described before, it is not preferred that plural static eliminating units are installed dispersedly without any mutual relationship, since ions cannot be continuously spread in the weakly charging mode. In the case where the invention is carried out in the strongly charging mode, it is desirable to consider the distance between the former five static eliminating units and the latter five static eliminating units. It is preferred to install about 2 to 10 static eliminating units in a group.

Respective two adjacent static eliminating units, for example, the first static eliminating unit SU1 and the second static eliminating unit SU2 can share a part of the shield electrode 5*g*-1 and a part of the shield electrode 5*g*-2.

It is preferred that the AC voltage applied to the first ion-generating electrodes is different by 180 degrees in phase from that applied to the second-ion-generating electrodes. The reason is that the electric field can most strongly and efficiently attract the positive and negative ions 301 and 302. If there is a phase difference of about 180 degrees, even if some phase shift is caused due to the capacities of the power supply and the load, especially due to the electric shock protecting capacity directly inserted between the high voltage line and the needle electrodes, the static eliminator can be used without any problem.

It is preferred that the frequency f is in a range from about 20 to about 200 Hz. The value of frequency f can be arbitrarily selected, if the conditional formula ($0.0425\ d_1^2 f \leqq V$) for causing forced irradiation of positive and negative ions 301 and 302 to the film S between the first and second ion-generating electrodes, the value of X expressing the synchronous superimposition intensity and the formula expressing the relation between the static eliminating gate length and the cycles of the applied voltage are satisfied. Considering them, it can be said that said range, i.e., a range from 20 to 200 Hz is adequate. The reasons why 50 Hz or 60 Hz as a power frequency of Japan is used are that a sufficient static elimination effect can be obtained, and that the static eliminator can be simplified and reduced in cost. As the electrodes unit , discharge electrodes of ordinary static eliminators to which a power frequency can be applied can be used, and the discharge electrodes described before and shown in FIGS. 29 and 30 can be preferably used.

In the invention, the first surface 100 and the second surface 200 of the film S are respectively simultaneously irradiated with monopolar ion clouds substantially opposite to each other in polarity at the respective sites, and subsequently the first surface 100 and the second surface 200 are irradiated with monopolar ion clouds reversed in polarity to those used for the previous irradiation. So, the positive and negative charges 101, 102, 201 and 202 existing together in both the surfaces of the film S can be efficiently eliminated, and a substantially non-charged film can be produced.

As a result, as the charged state of the film from which charges have been eliminated, the charge densities of the respective surfaces of the film change cyclically virtually like sinusoidal waves in the traveling direction of the film, and the amplitude is in a range from 2 to 150 $\mu C/m^2$. Furthermore, the apparent charge densities of the respective surfaces of the film are in a range from −2 to +2 $\mu C/m^2$.

A film in which the charges change smoothly cyclically virtually like sinusoidal waves has a small electric field in the in-plane direction of the film. So, problems due to static electricity are hard to occur. The film from which charges have been eliminated according to the invention is suitable for forming a functional layer at least on one side, since the charge densities of the respective surfaces of the film are in a range from −150 to +150 $\mu C/m^2$. The film from which charges have been eliminated according to the invention is most suitable for producing a metallized film on which a deposited metal layer is formed as a functional layer.

In the case where the respective surfaces of the film are predominantly positively or negatively charged, the film is not preferred as a film to be used for producing a metallized film, since the metallized film as a whole have positive or negative charges. The reason is that even in the case where a metallized film is small in charge density, if it has a large area, the total quantity of charges (multiply the charge density and area together) is large, and a large current is liable to flow at the time if discharge occurs. In the case where the charges are alternately positive and negative, even if the metallized film obtained from a film liberated from charges according to the invention has a large area, the positive and negative charges existing together to cancel each other, to keep the total quantity of charges small.

Furthermore, it is also important that the apparent charge densities are in a range from −2 to +2 μC/$m^2$, showing a good balance and an apparently non-charged state. Since the film from which charges have been eliminated according to the invention is apparently non-charged, it is hard to cause such problems as the occurrence of new static marks. Especially when the charge densities of the respective surfaces of the film are in a range from −30 to +30 μC/$m^2$, such problems as discharge are not caused even if the film is post-processed under the influence of charges perfectly on one side through metallization, etc. The film in this charged state can be said to be a substantially non-charged film The value of charges densities can be controlled by a method of lowering the applied voltages near to the lower limit of the weakly charging mode, or by a method of controlling the static eliminating unit intervals, the traveling speed of the film or the frequency of the applied voltages to lessen the value of X expressing the synchronous superimposition intensity.

In the invention, with regard to the distributions of charge densities, it is sometimes stated that the apparent charge densities at given sites of the film are in a range from −2 to +2 μC/$m^2$. This means the following. A 10 cm×10 cm piece is cut from the film, and the distributions of charge densities at the same positions in the in-plane direction of the first surface 100 and the second surface 200 are measured at 20 places or more in the direction perpendicular to the traveling direction of the film and continuously in the traveling direction of the film. The results of measurement should be kept in said range.

As a simple method, according to the following two methods, it can be confirmed whether or not film is apparently non-charged, i.e., whether or not apparent charge densities are in a range from −2 to +2 μC/$m^2$.

(1) Examination Whether Toner Deposited Locally or Not:

A toner powder is sprinkled over the film, holding sufficiently far from grounded conductor, such as one hundred times of the film thickness or more. The deposition state is evaluated whether the toner deposited locally or not.

As described before, toner powders are deposited on local site where apparent charge density is high. Inmost cases, if there are such local charges that the apparent charge density of 1 μC/$m^2$ or more in absolute value, the toner will be deposited on the film. Consequently, if the film no toner deposited locally, local sites apparent charge 1 μC/$m^2$ or more in absolute value are considered nowhere in the film.

(2) Measurement of the Aerial Potential:

Surface potential of the film, holding sufficiently far from grounded conductor, such as one hundred times of the film thickness or more, is measured.

In the case where the apparent charges, not locally, but uniformly over the entire surface of film exist, the toner won't be deposited on the film. However, in this case , the value of the aerial potential is high. If the film, having uniform apparent charges density of the value of σe (in μC/$m^2$) is held in air, parallel to grounded conductor in the distance of de(in mm), the surface potential of the film, i.e., the aerial potential of the film Ve is considered Ve=1000×σe×de/8.854. In the case where de=8.854 mm and the value of aerial potential Ve is in a range from −1000 to +1000V, the apparent charge density (average value) is in a range from −1 to +1 μC/$m^2$. If the distance between the film and the grounded conductor became larger, the higher the value of aerial potential of the film. Consequently, For measurement of the aerial potential, it is enough that the shortest distance between film and grounded conductor can be used. For example, it is sufficiently, if the shortest distance between film and grounded conductor is 10 mm or more, and if the value of aerial potential is in a range form −1000 to +1000 V, to consider the average value of the apparent charge density is in a range form −1 to +1 μC/$m^2$ As described above, by those two method the apparent charge densities are simply confirmed (if they are in a range from −2 μC/$m^2$ to 2 μC/$m^2$ or not.)

In the explanation of the embodiment of the invention, it is assumed that all the static eliminating units are the same in the forms of electrodes, the arrangement of electrodes, the intervals of electrodes and in the effective value of the applied voltages. However, the respective static eliminating units can be different in the forms of electrodes, the arrangement of electrodes, and the intervals of electrodes, and effective voltages are not necessarily required to be the same values. It is only required that each static eliminating unit satisfies the conditions under which the working effect of the invention can be obtained.

However, considering the difference in capability among the static eliminating units, it is preferred that all the static eliminating units have the same forms and arrangement and can be operated with the same voltages applied. Both static eliminating units operated in the strongly charging mode and static eliminating units operated in the weakly charging mode can be used together as a combination of static eliminating units different in static elimination action. As required, a static eliminator other than the static eliminator of the invention can also be used together.

Figure 32:
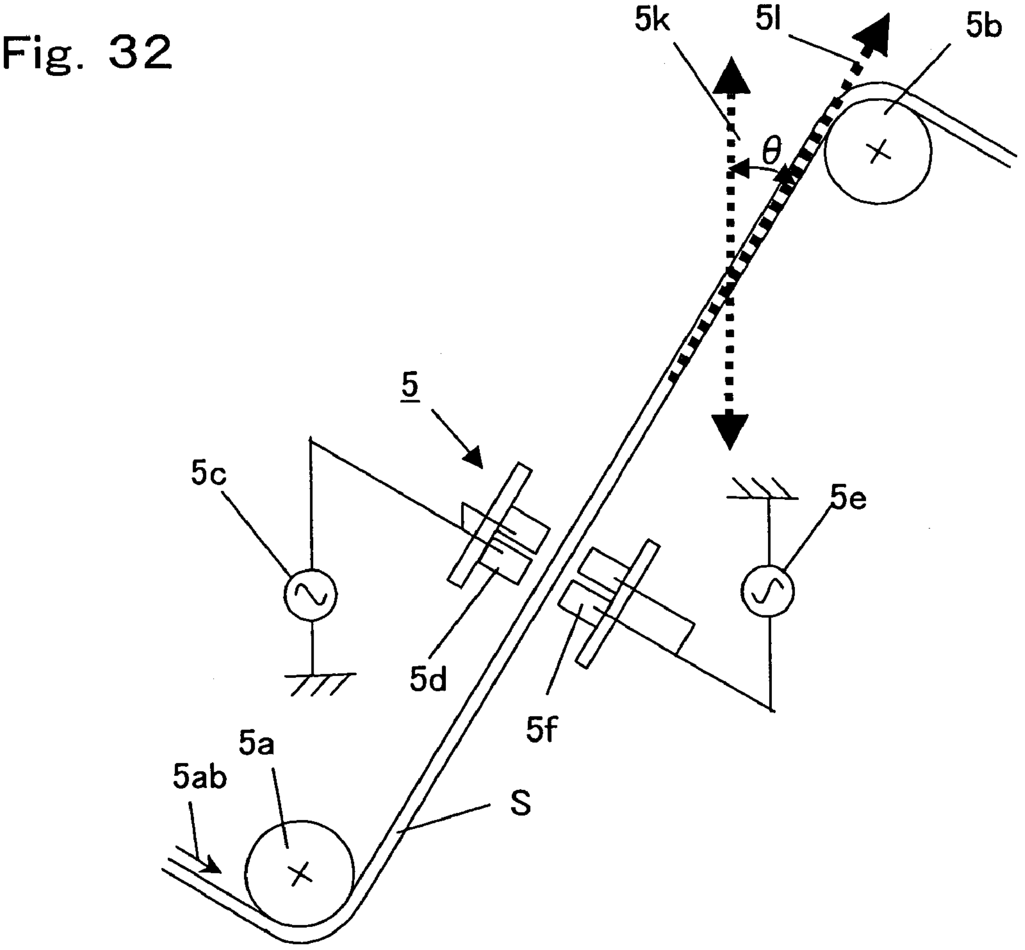
FIG. 32 is a schematic front view showing another embodiment of the static eliminator of the invention.

With regard to the positional relation between the first and second ion-generating electrodes of the respective static eliminating units and the film, it is preferred that the film passes at the centers between the pointed ends of the first and second ion-generating electrodes, so that the difference between the quantities of the ions irradiated from the first and second ion-generating electrodes can be kept small, and in order to avoid as far as possible that the film is flawed due to the contact with the pointed ends and the like of the ion-generating electrodes. For this purpose, it is preferred that the film is made to travel under such a condition that the film does not sag, and it is preferred that the static eliminating units are constituted such that the angle θ formed between the traveling direction 51 of the film S and the vertical direction **5*k* may be 45° or less, most preferably 0° as shown in FIG. 32**. The angle θ is defined in absolute value, and even if the traveling direction of the film S is reverse, the angle should be the same.

EXAMPLES AND COMPARATIVE EXAMPLES

The effects of static elimination in the examples and comparative examples were evaluated according to the following methods.

Method for judging the apparent charge distribution on a film (judgment method I):

A toner used in copiers was sprinkled over the sites of the film from which charges had been eliminated. The deposition state was evaluated in reference to the following three stages.

Symbol E: The toner was not deposited at any site over the entire surface of the film or was slightly deposited.

Symbol G: The toner was thinly deposited, but there was not any site where the toner was locally densely deposited.

Symbol B: There were sites where the toner was densely deposited.

Method for judging the charge distribution on the respective surfaces of a film (judgment method II):

The surface of the film, the charge distribution of which was to be evaluated (hereinafter called the surface to be evaluated) was kept in contact with a stainless steel (SUS) plate, and the rear surface was wiped with ethanol and dried, to neutralize the charges of the rear surface only. The film was then separated from the SUS plate, and a toner was sprinkled over the surface to be evaluated. The deposited state was evaluated in reference to the following three stages.

Symbol E: There was no site where the toner was locally densely deposited, and when the film was separated from the SUS plate, no separating discharge occurred.

Symbol G: When the film was separated from the SUS plate, separating discharge occurred, but there was no site where the toner was locally densely deposited.

Symbol B: There were sites where the toner was densely deposited.

Methods for judging coating irregularity (judgment methods III):

Method for judging coating irregularity using Isopar (judgment method III-1):

A film was coated with a coating material, Isopar (Isopar H) (trade name of Exxon Chemical), and coating irregularity, i.e., whether there were sites locally repelling the coating material was examined. The film was placed on a metallic plate, and a metering bar with a wire diameter of 0.25 mm was used to hand-coat the insulating sheet with the coating material at a speed of about 0.3 m/sec. The film as placed on the metallic plate and the film separated from the metallic sheet were visually observed, and the coating irregularity was evaluated in reference to the following two stages.

Symbol G: There was no coating irregularity.

Symbol B: There was coating irregularity.

Method for judging coating irregularity using silicone (judgment method III-2):

A film was coated with a silicone-based releasing agent (solvent toluene: KS847H produced by Shin-Etsu Chemical Co., Ltd. 10 parts by weight, PL-50T 0.1 part by weight, toluene 100 parts by weight), and coating irregularity, i.e., whether there were sites locally repelling the coating material was evaluated. The film was placed on a metallic plate, and a metering bar with a wire diameter of 0.25 mm was used to hand-coat the film with the coating material at a speed of about 0.3 m/sec. The film as placed on the metallic plate and the film separated from the metallic sheet were visually observed, and the coating irregularity was evaluated in reference to the following two stages.

Symbol G: There was no coating irregularity.

Symbol B: There was coating irregularity.

Methods for measuring the rear side equilibrium potentials and charge densities of the respective surfaces of a film (measuring methods IV):

Rear side equilibrium potential measuring method (measuring method IV-1):

The surface reverse to the surface to be evaluated of a film was kept in contact with a metallic roll that was a hard chromium-plated roll with a diameter of 10 cm, and the potentials were measured. As the electrostatic voltmeter, Model 244 produced by Monroe electronics, inc. was used, and as the sensor, probe 1017 with an opening diameter of 1.75 mm produced by Monroe electronics, inc. was used. The electrostatic voltmeter was placed at a position of 2 mm above the film. The field of vision at this position was in a range with a diameter of about 6 mm according to the catalogue of Monroe electronics, inc. The metallic roll was revolved at a low speed of about 1 m/min using a linear motor, while the rear side equilibrium potentials $V_f$ (in V) of the surface to be evaluated were measured using the electrostatic voltmeter.

Furthermore, according to the following method, the highest value of the absolute values of the rear side equilibrium potentials in plane was obtained. That is, the electrostatic voltmeter was relatively moved to scan about 20 mm in the width direction of the film, and the position in the width direction at which the highest value of the absolute values was obtained decided. Then, the position in the width direction was fixed, and the electrostatic voltmeter was moved relatively for scanning in the traveling direction of the film in which charges had been eliminated from the film, i.e., in the length direction of the film, to measure the potentials. It is ideal to measure the rear side equilibrium potentials in the plane of the film at all the two-dimensional points, but according to the above-mentioned method, the distribution of potentials in the plane of the film was approximated. In the case where the film had a width of more than 1 m, about 20 mm wide pieces were cut out at almost the central portion and edge portions in the width direction of the film. The electrostatic voltmeter was moved relatively for scanning to find a place where the highest value was obtained, and subsequently, it was moved relatively for scanning in the traveling direction of the film in which charges had been eliminated from the film, to measure potentials. And in the case, according to judgment method I or II, if there such sites locally deposited in some portion in the width direction on the film exist, the rear side equilibrium potentials can be measured among the traveling direction in the width direction of that portion, in both the film which did not undergo static elimination and which underwent static elimination. In this way, the highest value of the absolute values in the plane of the film was obtained. The measured result was evaluated in reference to the following three stages.

Symbol E: 200 V or lower

Symbol G: Higher than 200 V to 340 V

Symbol B: Higher than 340 V

Method for measuring charge densities (measuring method IV-2):

Using the rear side equilibrium potential $V_f$ (in V), the charge density $\sigma$ (in $C/m^2$) of the surface to be evaluated of the film directly under the sensor was obtained from the equation $\sigma = c \times V_f$ (where C is the electrostatic capacity (in $F/m^2$) per unit area). Since the film thickness was sufficiently smaller than the field of vision, the electrostatic capacity C per unit area was approximated by the electrostatic capacity of a plane parallel plate $C=(\epsilon_0 \times \epsilon_r)/d_f$ (where $d_f$ is the thickness of the film; $\epsilon_0$ is the dielectric constant in vacuum 8.854×10-12 F/m; and $\epsilon_r$ is the relative dielectric constant of the film). The relative dielectric constant $\epsilon_r$ of polyethylene terephthalate was 3. The largest value of the absolute values of calculated charge densities was evaluated in reference to the following three stages.

Symbol E: Smaller than 30 $\mu C/m^2$

Symbol G: 30 $\mu C/m^2$ to smaller than 150 $\mu C/m$

Symbol B: 150 $\mu C/m^2$ or larger

Method for judging sliding (judgment method V):

A 105 mm×150 mm piece was cut out of a film, and a 12 μm thick aluminum foil with the same size was stuck to the surface reverse to the surface to be evaluated of the film. The laminated film was placed on a larger straight SUS plate, to be as flat as possible with the surface to be evaluated kept in contact with the SUS plate. The film was pulled horizontally, and the largest load (in g) when the film started to move was measured using a spring balance. The obtained value was evaluated in reference to the following three stages.

Symbol E: Smaller than 15 g

Symbol G: 15 g to smaller than 20 g

Symbol B: 20 g or larger

Method for simple judging the apparent charge densities on an insulating film (judgment method VI):

The judgment of the apparent charge distribution on the film according to the judgment I and measurement of the aerial potentials of the film holding in air with the shortest distance between the film and grounded conductor in a range from 10 to 30 cm, used together. As the electrostatic voltmeter, model 523 produced by Trek inc. was used. The electrostatic voltmeter was placed at a position of 40 mm above the film. This is the recommended distance by Trek inc. The result was evaluated in both the judgment I and the aerial potential reference to the following three stages.

Symbol E: As the judgment I was symbol E and also the value of aerial potential was in a range from −0.5 to +0.5 kV Symbol G: As the judgment I was symbol G and also the value of aerial potential was in a range from −0.5 to +0.5 kV Symbol B: As the judgment I was symbol B or the value of aerial potential was less than −0.5 kv or more than +0.5 kV.

Examples 1 and 2 and Comparative Examples 1 to 3:

In the static eliminator shown in FIG. 17, a biaxially oriented 200 mm wide 6.3 μm thick polyethylene terephthalate film (Lumirror 6XV64F produced by Toray Industries, Inc.; hereinafter called the raw film A) was used as the insulating sheet S. The film was a base film for magnetic tapes. The film was made to travel at a speed of 150 m/min. Since the film S had a smooth magnetic substance-forming surface, frictional charges were likely to occur, and the surfaces of the film S had discharge marks formed when it was wound.

As the first and second electrode units, discharge electrodes consist of arrays of needle electrodes shown in FIG. 29 were used. The intervals $d_5$ between the needle electrodes in the width direction were 12.7 mm. The first and second electrode units were installed to be perpendicular to the traveling direction of the film S and in parallel to the surfaces of the film S above and below the film S, as static eliminating units. The positions of the tips of the needle electrodes in the width direction in the first and second electrode units were the same. The total number n of the static eliminating units was 10.

The tips of the needle electrodes of the each array of needle electrodes, i.e., the pointed ends of each ion-generating electrode, of each static eliminating unit were arranged side by side in the width direction in a straight line, and the sagging of the electrodes was negligibly small. Furthermore, since each of the static eliminating units was disposed to be perpendicular to the traveling direction of the film S as described above, it was judged that the values of the following $d_0$ to $d_4$ did not apparently fluctuate in the width direction. The values of $d_0$ to $d_4$ were measured at the ends in the width direction of the electrode units and the static eliminating units.

In each static eliminating unit, the electrode discrepancy $d_0$ (in mm) was as shown in Table 1, the normal direction inter-electrode distance $d_1$ was 30 mm, the normal direction inter-shield-electrode distance $d_3$ was 34 mm, and the shield electrode opening width $d_4$ was 8.5 mm.

All the intervals between the respectively adjacent static eliminating units were the same. The static eliminating unit interval $d_2$ (in mm) is shown in Table 1. The positions of the tips of the needle electrodes in the width direction in the respective static eliminating units were the same. All the first ion-generating electrodes in each static eliminating unit were the same in phase, and all the second ion-generating electrodes in each static eliminating unit were also the same in phase. AC power supplies with a frequency of 60 Hz and an effective voltage of 4 kV were used as the power supplies 5*c* and 5*e* connected with the first and second ion-generating electrodes 5*d* and 5*f*, and the input of the step-up transformer inside the power supplies were switched to make the applied voltages reverse to each other in phase. Both the shield electrodes 5*g* and 5*h* were grounded. The film S was arranged to pass virtually at the center between the first and second ion-generating electrodes in the respective static eliminating units.

The static elimination mode in Examples 1 and 2 and Comparative Examples 1 to 3 was the weakly charging mode as indicated by point A in the graph of FIG. 24.

The apparent charge distributions of these films were evaluated based on said judgment method I. The results are shown in Table 1.

TABLE 1

| | $1.5 \times d_1^2/(d_3 \times d_4)$ | $d_0$ | $12 \times d_1^2/(d_3 \times d_4)$ | $d_2$ | Static elimination mode | Apparent charge distribution |
|---|---|---|---|---|---|---|
| Raw film A | | | | | | B |
| Example 1 | 4.67 | 0 | 37.37 | 30 | Weakly charging | E |
| Example 2 | 4.67 | 2 | 37.37 | 30 | Weakly charging | E |
| Comparative Example 1 | 4.67 | 5 | 37.37 | 30 | Weakly charging | B |
| Comparative Example 2 | 4.67 | 15 | 37.37 | 30 | Weakly charging | B |
| Comparative Example 3 | 4.67 | 0 | 37.37 | 43 | Weakly charging | B |

Examples 3 and 4 and Comparative Example 4

In the static eliminator shown in FIG. 17, a biaxially oriented 300 mm wide 30 μm thick polyethylene terephthalate film (Lumirror 30R75 produced by Toray Industries, Inc.; hereinafter called raw film B) was used as the insulating sheet S, and it was made to travel at the traveling speed u (in m/min) shown in Table 2. The film had discharge marks formed when it was wound. As the first and second electrode units, discharge electrodes consist of arrays of needle electrodes shown in FIG. 29 were used. The intervals $d_5$ between the needle electrodes in the width direction were 12.7 mm. The first and second electrode units were installed to be perpendicular to the traveling direction of the film S and in parallel to the surfaces of the film S above and below the film S, as static eliminating units. The positions of the tips of the needle electrodes in the width direction in the first and second electrode units were the same. The total number n of the static eliminating units was 10.

The tips of the needle electrodes of the each array of needle electrodes, i.e., the pointed ends of the each ion-generating electrode, of each static eliminating unit were disposed side by side in the width direction in a straight line, and the sagging of the electrodes was negligibly small. Furthermore, since each of the static eliminating units was disposed to be perpendicular to the traveling direction of the film S as described above, it was judged that the values of the following $d_0$ to $d_4$ did not apparently fluctuate in the width direction. The values of $d_0$ to $d_4$ were measured at the ends in the width direction of the electrode units and the static eliminating units.

In each static eliminating unit, the electrode discrepancy $d_0$ was 0 mm, and the normal direction inter-electrode distance $d_1$ was 20 mm, the normal direction inter-shield-electrode distance $d_3$ was 24 mm, and the shield electrode opening width $d_4$ was 8.5 mm.

All the static eliminating unit intervals $d_2$ were 23 mm. The positions of the tips of the needle electrodes in the width direction in the respective static eliminating units were the same. All the first ion-generating electrodes in each static eliminating unit were the same in phase, and all the second ion-generating electrodes in each static eliminating unit were also the same in phase. AC power supplies with a frequency of 60 Hz and an effective voltage of 4 kV were used as the power supplies 5*c* and 5*e* connected with the first and second ion-generating electrodes 5*d* and 5*f*, and the input of the step-up transformer inside the power supplies were switched to make the applied voltages reverse to each other in phase. Both the shield electrodes 5*g* and 5*h* were grounded. The film S was arranged to pass virtually at the center between the first and second ion-generating electrodes in the respective static eliminating units.

The static elimination mode in Examples 3 and 4 and Comparative Example 4 was the strongly charging mode as indicated by point B in the graph of FIG. 24. The static elimination modes, the ratios of positive and negative ions applied to the respective sites of the films in the strongly charging mode and the values of synchronous superimposition intensity X are shown in Table 2.

Comparative Examples 5 and 6

Figure 4:
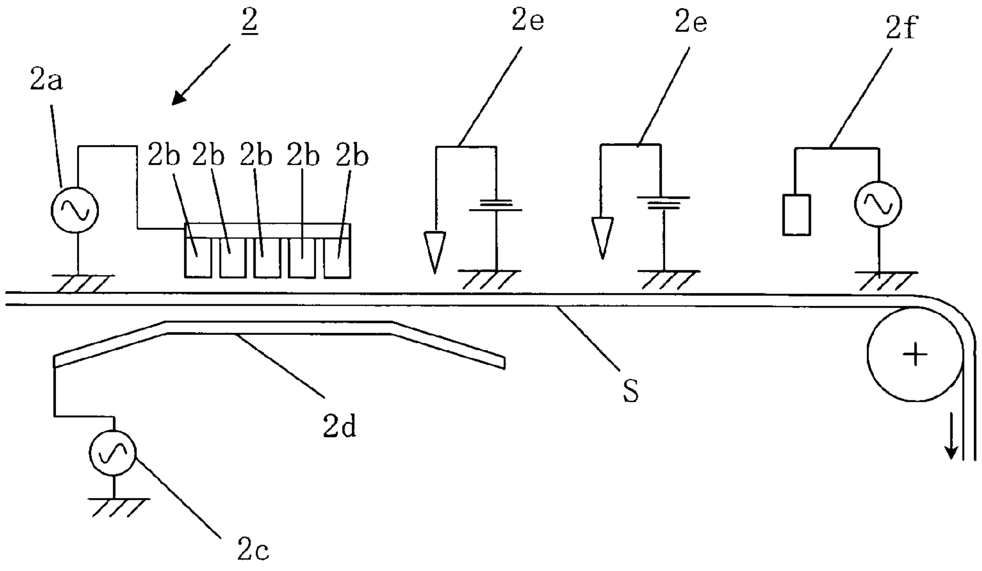
Fig. 4 PRIOR ART
FIG. 4 is a schematic front view showing a conventional static eliminator.
Figure 5:
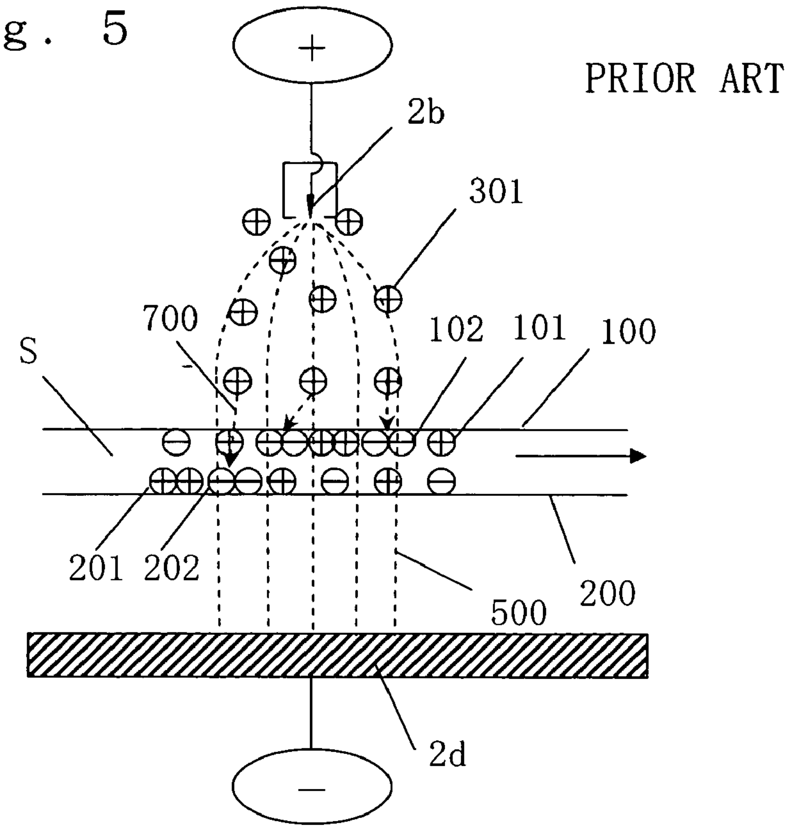
Fig. 5 PRIOR ART
FIG. 5 is a schematic drawing for illustrating the static eliminating action by the eliminator shown in FIG. 4.
Figure 6:
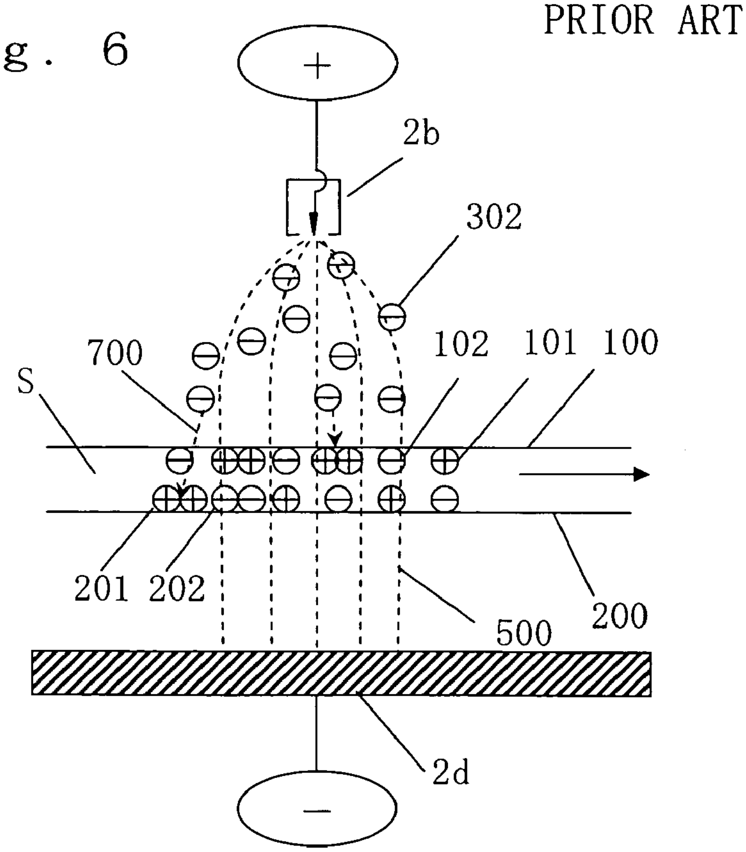
Fig. 6 PRIOR ART
FIG. 6 is a schematic drawing for illustrating the static eliminating action by the eliminator shown in FIG. 4.

In the static eliminator shown in FIG. 4, the same film S (raw film B) as used in Example 3 was made to travel at the traveling speed u (in m/min) shown in Table 2. As positive and negative ion-generating electrodes 2*b*, four arrays of needle electrodes were used. All the positive and negative ion-generating electrodes 2*b* were disposed such that the distance between their pointed ends and the ion-attracting electrode 2*d* became 20 mm. The voltage applied to the respective positive and negative ion-generating electrodes 2*b* was 8 kV in effective value, and the voltage applied to the ion-attracting electrode 2*d* was 5 kV in effective value. The frequencies of the voltages were respectively 200 Hz. The voltage applied to the respective positive and negative ion-generating electrodes 2*b* was opposite in phase to the voltage applied to the ion-attracting electrode 2*d*. Furthermore, to the two DC static eliminating members 2*e* of the latter stage, voltages of +5 kV and -5 kV were applied, and to the final AC static eliminating member 2*f*, a voltage of 8 kV in effective value was applied.

For the films S obtained in Examples 3 and 4 and Comparative Examples 4, 5 and 6, the charge distributions of the first surfaces, the occurrences of coating irregularity, the rear side equilibrium potential of the first surfaces and the charge densities of the first surfaces were based on said judgment method II, judgment method III-1 and measuring methods IV-1 and IV-2.

The results are shown in Table 2.

TABLE 2

| | U | $12 \times d_1^2/(d_3 \times d_4)$ | $d_2$ | Static elimination mode | Ratio of positive and negative ions applied to respective sites |
|---|---|---|---|---|---|
| Raw film B | | | | | |
| Example 3 | 200 | 23.52 | 23 | Strongly charging | 5:5 or 6:4 |
| Example 4 | 90 | 23.52 | 23 | Strongly charging | 5:5-7:3 |
| Comparative Example 4 | 80 | 23.52 | 23 | Strongly charging | 5:5-10:0 (#1) |
| Comparative Example 5 | 200 | — | — | — | — |
| Comparative Example 6 | 90 | — | — | — | — |

#1: Ratio of 8:2 and more correspond to 65% of all the sites of the film.

(sequel)

| | X value | Charge distribution of first surface | Coating irregularity in use of Isopar | Rear side equilibrium potential of first surface | Charge density of first surface |
|---|---|---|---|---|---|
| Raw film B | | B | B | B(385) | B(340) |
| Example 3 | 0.0441 | G | G | E(45) | G(42) |
| Example 4 | 0.2363 | G | G | E(155) | G(140) |
| Comparative Example 4 | 0.8142 | G | B | G(270) | B(240) |
| Comparative Example 5 | — | B | B | B(350) | B(310) |
| Comparative Example 6 | — | B | B | B(350) | B(310) |

Examples 5 and 6 and Comparative Example 7

In the static eliminator shown in FIG. 17, a biaxially oriented 300 mm wide 12 μm thick polyethylene terephthalate film (Lumirror 12P60 produced by Toray Industries, Inc.; hereinafter called raw film C) was used as the insulating sheet S and was made to travel at a speed of 300 m/min. For improving the wettability in application to vacuum evaporation, it had been corona-treated. For this reason, a fine charge pattern was observed on the corona-treated surface.

As the first and second electrode units, discharge electrodes consist of arrays of needle electrodes shown in FIG. 29 or 30 were used. The types of discharge electrodes used are is shown in Table 3. The intervals $d_5$ of the needle electrodes shown in FIG. 29 in the width direction were 12.7 mm, and the intervals $d_5$ of the needle electrodes shown in FIG. 30 in the width direction were 19 mm. The first and second electrode units were installed to be perpendicular to the traveling direction of the film S and to be parallel to the surfaces of the film S above and below the film S, as static eliminating units. The positions of the tips of the needle electrodes in the width direction in the first and second electrode units were the same. The total number n of the static eliminating units was 2.

The tips of the needle electrodes of the each array of needle electrodes, i.e., the pointed ends of each ion-generating electrode, of each static eliminating unit were disposed side by side in the width direction in a straight line, and the sagging of the electrodes was negligibly small. Furthermore, since each of the static eliminating units was disposed to be perpendicular to the traveling direction of the film S as described above, it was judged that the values of the following $d_0$ to $d_4$ did not apparently fluctuate in the width direction. The values of $d_0$ to $d_4$ were measured at the ends in the width direction of the electrode units and the static eliminating units.

In each static eliminating unit, the electrode discrepancy $d_0$ was 0 mm, and the normal direction inter-electrode distance $d_1$, the normal direction inter-shield-electrode distance $d_3$ (mm), and the shield electrode opening width $d_4$ (mm) were as shown in Table 3.

The static eliminating unit interval $d_2$ (mm) was as shown in Table 3, and the positions of the tips of the needle electrodes in the width direction in the respective static eliminating units were the same. The first ion-generating electrode of each static eliminating unit was the same in phase, and the second ion-generating electrode in each static eliminating unit was also the same in phase. AC power supplies with a frequency of 60 Hz and an effective voltage of 4 kV or 7 kV were used as the power supplies 5*c* and 5*e* connected with the first and second ion-generating electrodes 5*d* and 5*f*, and the input of the step-up transformer inside the power supplies were switched to make the applied voltages reverse to each other in phase. The effective voltages used are shown in Table 3. Both the shield electrodes 5*g* and 5*h* were grounded. The film S was arranged to pass virtually at the center between the first and second ion-generating electrodes in the respective static eliminating units.

The static elimination mode in Example 5 and Comparative Example 7 was the strongly charging mode as indicated by point B in the graph of FIG. 24. The static elimination mode in Example 6 was the weakly charging mode as indicated by point C in the graph of FIG. 24. The static elimination modes, the ratios of the positive and negative ions applied to the respective sites of the film in the strongly charging mode, and the values of synchronous superimposition intensity X are shown in Table 3.

For these films, the charge distributions of the first surfaces and sliding properties were evaluated based on said judgment method II and judgment method V. The results are shown in Table 3.

TABLE 3

| | Electrode | $d_1$ | $d_3$ | $d_4$ | V | $12 \times d_1^2/(d_3 \times d_4)$ | $d_2$ | Static elimination mode |
|---|---|---|---|---|---|---|---|---|
| Raw film C | | | | | | | | |
| Example 5 | FIG. 29 | 20 | 24 | 8.5 | 4 | 23.52 | 40 | Strongly charging |
| Example 6 | FIG. 30 | 40 | 38 | 8 | 7 | 63.15 | 25 | Weakly charging |
| Comparative Example 7 | FIG. 29 | 20 | 24 | 8.5 | 4 | 23.52 | 25 | Strongly charging |

(sequel)

| | Ratio of positive and negative ions applied to respective sites | X value | Charge distribution of first surface | Sliding property |
|---|---|---|---|---|
| Raw film C | | | B | B(25 g) |
| Example 5 | 1:1 or 2:0 (#2) | 0.0628 | G | E(10 g) |
| Example 6 | — | — | E | E(7 g) |
| Comparative Example 7 | 1:1 or 2:0 (#3) | 0.5878 | B | B(20 g) |

#2: Ratio of 2:0 corresponds to 0.04% of all the sites of the film.
#3: Ratio of 2:0 corresponds to 40% of all the sites of the film.

Example 7

For the film of Example 1, the rear side equilibrium potentials of the respective surfaces and the charge densities of the respective surfaces were evaluated based on said judgment methods IV-1 and IV-2. The first surface that was smooth to have a magnetic substance had been charged at −7 $\mu C/m^2$ on the average, and the second surface had been charged at +6.5 $\mu C/m^2$ on the average.

Example 8

Static elimination was carried out according to the same method as described for Example 1, except that a voltage of about +50 V would be applied to the first shield electrodes of the respective static eliminating units, and that a voltage of about −50 V would be applied to the second shield electrodes of the respective static eliminating units. As a result, both the first surface that was smooth and the second surface reverse to the first surface would be charged to be in a range from −2 to +2 $\mu C/m^2$. These results show that the charge densities of the respective surfaces in absolute value would be decreased. Example 9 and Comparative Example 8:

For the charge distributions of the respective surfaces of the raw film B and the films obtained in Example 3 and Comparative Examples 4 to 6, the charge densities of the respective surfaces were measured based on the measuring methods IV-2. Furthermore, the following were examined: cyclicity, the amplitudes of the charge densities of the respective surfaces (in $\mu C/m^2$), the sums of charge densities of both the surfaces at the same sites in the in-plane direction of the film, i.e., the apparent charge densities (in $\mu C/m^2$) in absolute value and the cyclicities of the charge density distributions of the respective surfaces in the traveling direction of the films (in mm). The results are shown in Table 4.

TABLE 4

| | Cyclicity | Amplitudes of charge densities of first surface | Amplitudes of charge densities of second surface | Apparent charge densities | Cyclicity of charge density distribution in traveling direction |
|---|---|---|---|---|---|
| Raw film B | Not cyclic | 290-340 (Discharge marks) 0-1 (Other than discharge marks) | 290-310 (Discharge marks) 0-1 (Other than discharge marks) | 5-30 (Discharge marks) <2 (Other than discharge marks) | (Not cyclic) |
| Example 3 | Cyclic | 40-42 | 40-42 | <2 | 55 |
| Comparative Example 4 | Cyclic | 200-230 | 200-230 | <2 | 25 |
| Comparative Example 5 | Not cyclic | 290-310 (Discharge marks) 0-1 (Other than discharge marks) | 290-310 (Discharge marks) 0-1 (Other than discharge marks) | <2 | (Not cyclic) |
| Comparative Example 6 | Cyclic | 290-310 (Discharge marks) 1-2 (Other than discharge marks) | 290-310 (Discharge marks) 0-1 (Other than discharge marks) | <2 | 7.5 (Other than discharge marks) |

Examples 10 to 12 and Comparative Example 9

In the static eliminator shown in FIG. 17, a biaxially oriented 300 mm wide 9 μm thick polyethylene terephthalate film (Lumirror 9P60 produced by Toray Industries, Inc.; hereinafter called the raw film D) was used as the insulating sheet S and was made to travel at the speed u (in m/min) shown in Table 5. For improvement of wettability, the film S had been corona-treated, and because of the treatment, it had been strongly charged. A strong striped charge pattern was observed on both the corona-treated surface and the non-treated surface.

As the first and second electrode units, discharge electrodes consist of arrays of needle electrodes shown in FIG. 29 were used. The intervals $d_5$ between the needle electrodes in the width direction were 12.7 mm. The first and second electrode units were installed to be perpendicular to the traveling direction of the film S and in parallel to the surfaces of the film S above and below the film S, as static eliminating units. The positions of the tips of the needle electrodes in the width direction in the first and second electrode units were the same. The total number n of the static eliminating units was 10.

The tips of the needle electrodes of the each array of needle electrodes, i.e., the pointed ends of the each ion-generating electrode of each static eliminating unit were disposed side by side in the width direction in a straight line, and the sagging of the electrodes was negligibly small. Furthermore, since each of the static eliminating units was disposed to be perpendicular to the traveling direction of the film S as described above, it was judged that the values of the following $d_0$ to $d_4$ did not apparently fluctuate in the width direction. The values of $d_0$ to $d_4$ were measured at the ends in the width direction of the electrode units and the static eliminating units.

In each static eliminating unit, the electrode discrepancy $d_0$ was 0 mm, the normal direction inter-electrode distance $d_1$ (in mm) and the normal direction inter-shield-electrode distance $d_3$ (in mm) were as shown in Table 5, and the shield electrode opening width $d_4$ was 8.5 mm.

All the static eliminating unit intervals $d_2$ were 25 mm. The positions of the tips of the needle electrodes in the width direction in the respective static eliminating units were the same. All the first ion-generating electrodes in each static eliminating unit were the same in phase, and all the second ion-generating electrodes in each static eliminating unit were also the same in phase. AC power supplies with a frequency of 60 Hz and an effective voltage of 4 kV were used as the power supplies. 5*c* and 5*e* connected with the first and second ion-generating electrodes 5*d* and 5*f*, and the input of the step-up transformer inside the power supplies were switched to make the applied voltages reverse to each other in phase. Both the shield electrodes 5*g* and 5*h* were grounded. The film S was arranged to pass virtually at the center between the first and second ion-generating electrodes in the respective static eliminating units.

The static elimination mode in Examples 10 and 11 was the weakly charging mode as indicated by point A in the graph of FIG. 24. The static elimination mode in Example 12 and Comparative Example 9 was the strongly charging mode as indicated by point D in the graph of FIG. 24. The static elimination modes, the ratios of positive and negative ions applied to the respective sites of the films in the strongly charging mode, and the values of synchronous superimposition intensity X are shown in Table 5.

For the charge distributions of these films, the charge densities of the first surfaces and apparent charge densities (in simple method) were measured based on said measuring methods IV-2, and judgment method VI. Furthermore, the following were examined: cyclicity, amplitudes of charge densities of the first surfaces (in $\mu C/m^2$), and the cyclicities of the charge density distributions of the first surfaces in the traveling direction of the films (in mm). The results are shown in Table 5.

TABLE 5

| | $d_1$ | $d_3$ | u | Static elimination mode | Ratio of positive and negative ions applied to respective sites | X value |
|---|---|---|---|---|---|---|
| Raw film D | | | | | | |
| Example 10 | 30 | 34 | 300 | Weakly charging | — | — |
| Example 11 | 30 | 34 | 90 | Weakly charging | — | — |
| Example 12 | 25 | 29 | 300 | Strongly charging | 5:5 | 0.0001 or less |
| Comparative Example 9 | 25 | 29 | 90 | Strongly charging | 10:0 | 1 |

(sequel)

| | Amplitude of charge densities of first surface | Apparent charge densities (simple method) | Cyclicity of charge density distribution in traveling direction |
|---|---|---|---|
| Raw film D | 30 (The largest value) | B | (Not cyclic) |
| Example 10 | E (20-30) | E | 82 |
| Example 11 | G (120-140) | E | 25 |
| Example 12 | G (30-40) | E | 85 |
| Comparative Example 9 | B (300-310) | E | 25 |

Examples 13 to 22, and Comparative Examples 10 to 12

In the static eliminator shown in FIG. 17, a biaxially oriented 300 mm wide 25 μm thick polyethylene terephthalate film (Lumirror 25R75 produced by Toray Industries, Inc.; hereinafter called the raw film E) was used as the insulating sheet S and was made to travel at the speed u (in m/min) shown in Table 6. It was confirmed that the film S was virtually non-charged in the respective surfaces before static elimination.

As the first and second electrode units, discharge electrodes consist of arrays of needle electrodes shown in FIG. 29 were used. The intervals $d_5$ of the needle electrodes in the width direction were 12.7 mm. The first and second electrode units were installed to be perpendicular to the traveling direction of the film S and in parallel to the surfaces of the film S above and below the film S, as static eliminating units. The positions of the tips of the needle electrodes in the width direction in the first and second electrode units were the same. The total number n of the static eliminating units was 10.

The tips of the needle electrodes of the each array of needle electrodes, i.e., the pointed ends of the each ion-generating electrode of each static eliminating unit were disposed side by side in the width direction in a straight line, and the sagging of the electrodes was negligibly small. Furthermore, since each of the static eliminating units was disposed to be perpendicular to the traveling direction of the film S as described above, it was judged that the values of the following $d_0$ to $d_4$ did not apparently fluctuate in the width direction. The values of $d_0$ to $d_4$ were measured at the ends in the width direction of the electrode units and the static eliminating units.

In each static eliminating unit, the electrode discrepancy $d_0$ was 0 mm, the normal direction inter-electrode distance $d_1$ was 25 mm, the normal direction inter-shield-electrode distance $d_3$ was 29 mm, and the shield electrode opening width $d_4$ was 8.5 mm.

All the static eliminating unit intervals $d_2$ were 25 mm. The positions of the tips of the needle electrodes in the width direction in the respective static eliminating units were the same. All the first ion-generating electrodes in each static eliminating unit were the same in phase, and all the second ion-generating electrodes in each static eliminating unit were also the same in phase. AC power supplies with a frequency of 60 Hz and an effective voltage of 4 kV were used as the power supplies 5*c* and 5*e* connected with the first and second ion-generating electrodes 5*d* and 5*f*, and the input of the step-up transformer inside the power supplies were switched to make the applied voltages reverse to each other in phase. Both the shield electrodes 5*g* and 5*h* were grounded. The film S was arranged to pass virtually at the center between the first and second ion-generating electrodes in the respective static eliminating units.

The static elimination mode in Examples 13 to 22 and Comparative Examples 10 to 12 was the strongly charging mode as indicated by point D in the graph of FIG. 24. The ratios of positive and negative ions applied to the respective sites of the film and the values of the synchronous superimposition intensity X in Examples 13 to 22 and Comparative Examples 10 to 12 are shown in Table 6.

For the charge distributions of these films S, the charge densities of the first surfaces and apparent charge densities (in simple method) were examined based on said measuring method IV-2, and judgment method VI. Furthermore, the following were examined: cyclicity, the amplitudes of the charge densities of the first surfaces (in $\mu C/m^2$), and the cyclicities of the charge density distributions of the first surfaces in the traveling direction of the films (in mm). The results are shown in Table 6 and FIG. 33.

Figure 33:
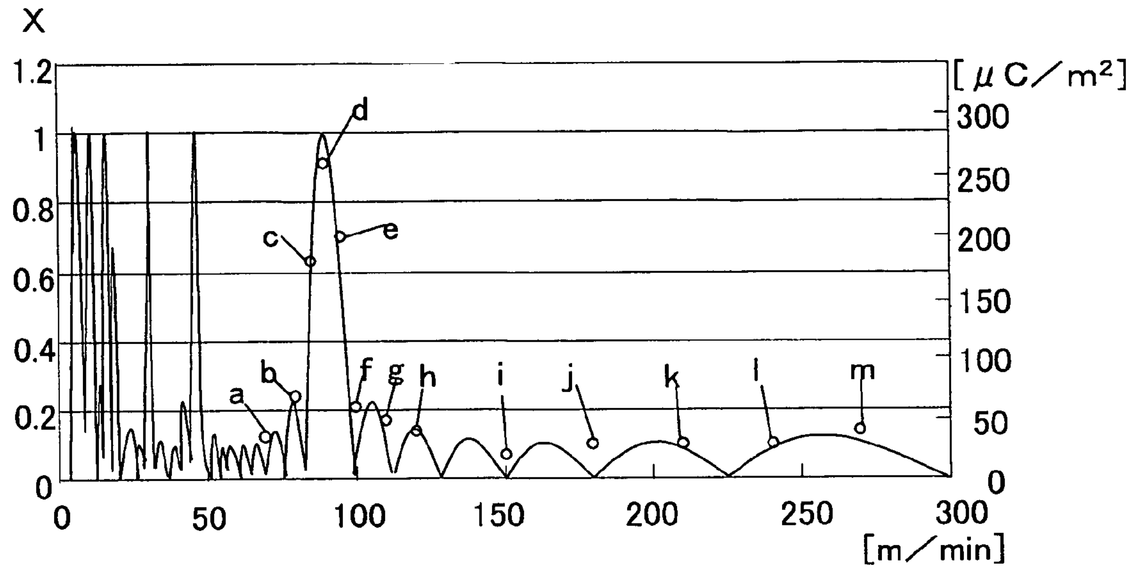
FIG. 33 is a graph for illustrating the relation among the traveling speed, synchronous superimposition intensity and charge density amplitude, of the sheet that underwent static elimination using the static eliminator shown in FIG. 17.

In FIG. 33, the film traveling speed u (in m/min) is chosen as the abscissa; the value of synchronous superimposition intensity X, as the first ordinate (left axis); and the amplitude of charge densities of each surface in Examples 13 to 22 and Comparative Examples 10 to 12, as the second ordinate (right axis) Points a to m in FIG. 33 correspond to the respective examples and comparative examples as shown in Table 6.

TABLE 6

| | u | Ratio of positive and negative ions applied to respective sites | X value | Amplitude of charge densities of first surface | Apparent charge densities (Simple method) | Cyclicity of charge density distribution in traveling direction | Point in FIG. 33 |
|---|---|---|---|---|---|---|---|
| Raw film E | | | | <1 | E | | — |
| Example 13 | 70 | 5:5-6:4 | 0.0555 | G (About 35) | E | 20 | a |
| Example 14 | 80 | 5:5-6:4 | 0.1847 | G (About 70) | E | 23 | b |

TABLE 6-continued

| | u | Ratio of positive and negative ions applied to respective sites | X value | Amplitude of charge densities of first surface | Apparent charge densities (Simple method) | Cyclicity of charge density distribution in traveling direction | Point in FIG. 33 |
|---|---|---|---|---|---|---|---|
| Comparative Example 10 | 85 | 5:5-9:1 (#6) | 0.5234 | B (About 180) | E | 25 | c |
| Comparative Example 11 | 90 | 10:0 | 1 | B (About 260) | E | 25 | d |
| Comparative Example 12 | 95 | 5:5-10:0 (#7) | 0.6055 | B (About 200) | E | 25 | e |
| Example 15 | 100 | 5:5 | 0.0001 or less | G (About 60) | E | 28 | f |
| Example 16 | 110 | 5:5-6:4 | 0.1 | G (About 50) | E | 30 | g |
| Example 17 | 120 | 5:5-6:4 | 0.1414 | G (About 40) | E | 35 | h |
| Example 18 | 150 | 5:5-6:4 | 0.0001 or less | R (About 20) | E | 41 | i |
| Example 19 | 180 | 5:5 | 0.0001 or less | G (About 30) | E | 50 | j |
| Example 20 | 210 | 5:5-6:4 | 0.0802 | G (About 30) | E | 60 | k |
| Example 21 | 240 | 5:5-6:4 | 0.0765 | G (About 30) | E | 67 | l |
| Example 22 | 270 | 6:4-7:3 | 0.1 | G (About 40) | E | 75 | m |

#6: Ratio of 8:2 and more correspond to 41% of all the sites of the film.
#7: Ratio of 8:2 and more correspond to 47% of all the sites of the film.

Example 23

In the static eliminator shown in FIG. 17, a biaxially oriented 1100 mm wide, 6000 m long and 38 μm thick polyethylene terephthalate film (Lumirror 38S28 produced by Toray Industries, Inc.; hereinafter called the raw film F) was used as the insulating sheet. The film S was unwound from a film roll and passed through the static eliminator at a speed of 100 m/min. The film S that had passed through the static eliminator was coated with a silicone-based releasing solution (produced by Shin-Etsu Chemical Co., Ltd.) and dried in a dryer to perfectly remove the solvent of the coating solution. It was then wound as a roll in a winding section.

Before static elimination, the film S had locally charged portions. The charges changed cyclically into positive and negative charges in the longitudinal direction of the film, and the lengths of the positive charged zones and the negatively charged zones were about tens of millimeters.

Figure 34:
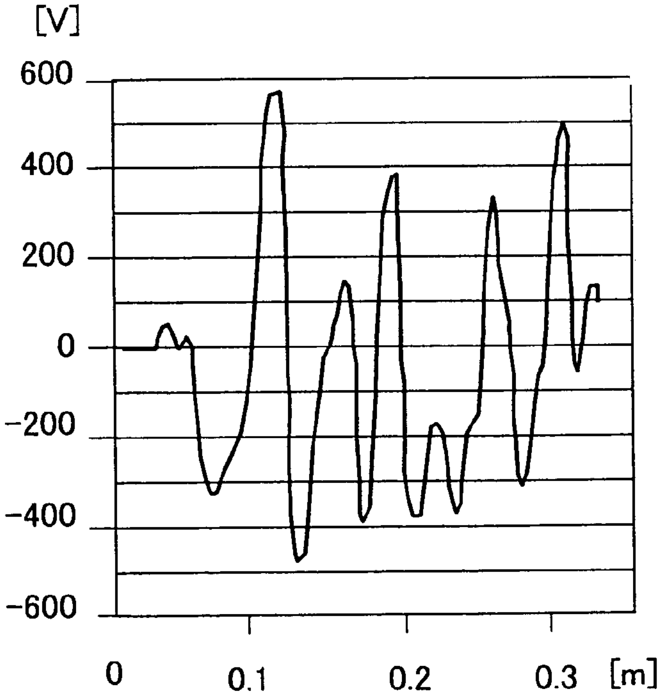
FIG. 34 is a graph showing an example of the measured distribution of rear side equilibrium potentials of a film that did not undergo static elimination.

The distribution of rear side equilibrium potentials of the first surface of the film (in V) in the charged sites was measured while the electrostatic voltmeter was moved in the traveling direction of the film S, result is shown in FIG. 34. In the graph of FIG. 34, the rear side equilibrium potential is chosen as the ordinate, and the length in the traveling direction of the film S, as the abscissa. The largest value of rear side equilibrium potentials in absolute value in the charged sites was larger than 500 V. The apparent charge densities (in simple method) were stage B by the judgment method VI.

As the first and second electrode units, discharge electrodes consist of arrays of needle electrodes shown in FIG. 29 were used. The intervals $d_5$ of the needle electrodes in the width direction were 12.7 mm. The first and second electrode units were installed to be perpendicular to the traveling direction of the film S and in parallel to the surfaces of the film S above and below the film S, as static eliminating units. The positions of the tips of the needle electrodes in the width direction in the first and second electrode units were the same. The total number n of the static eliminating units was 10.

The tips of the needle electrodes of the each array of needle electrodes, i.e., the pointed ends of the each ion-generating electrode of each static eliminating unit were disposed side by side in the width direction in a straight line, and the sagging of the electrodes was negligibly small. Furthermore, since each of the static eliminating units was disposed to be perpendicular to the traveling direction of the film S as described above, it was judged that the values of the following $d_0$ to $d_4$ did not apparently fluctuate in the width direction. The values of $d_0$ to $d_4$ were measured at the ends in the width direction of the electrode units and the static eliminating units.

In each static eliminating unit, the electrode discrepancy $d_0$ was 0 mm, the normal direction inter-electrode distance $d_1$ was 25 mm, the normal direction inter-shield-electrode distance $d_3$ was 29 mm, and the shield electrode opening width $d_4$ was 8.5 mm.

All the static eliminating unit intervals $d_2$ were 23 mm. The positions of the tips of the needle electrodes in the width direction in the respective static eliminating units were the same. All the first ion-generating electrodes in each static eliminating unit were the same in phase, and all the second ion-generating electrodes in each static eliminating unit were also the same in phase. AC power supplies with a frequency of 50 Hz and an effective voltage of 4 kV were used as the power supplies 5_c_ and 5_e_ connected with the first and second ion-generating electrodes 5_d_ and 5_f_, and the input of the step-up transformer inside the power supplies were switched to make the applied voltages reverse to each other in phase. Both the shield electrodes 5_g_ and 5_h_ were grounded. The film S was arranged to pass virtually at the center between the first and second ion-generating electrodes in the respective static eliminating units.

The coating irregularity of the coating layer on the film S was visually observed particularly to see if there were regions where the coating material was locally repelled.

Figure 35:
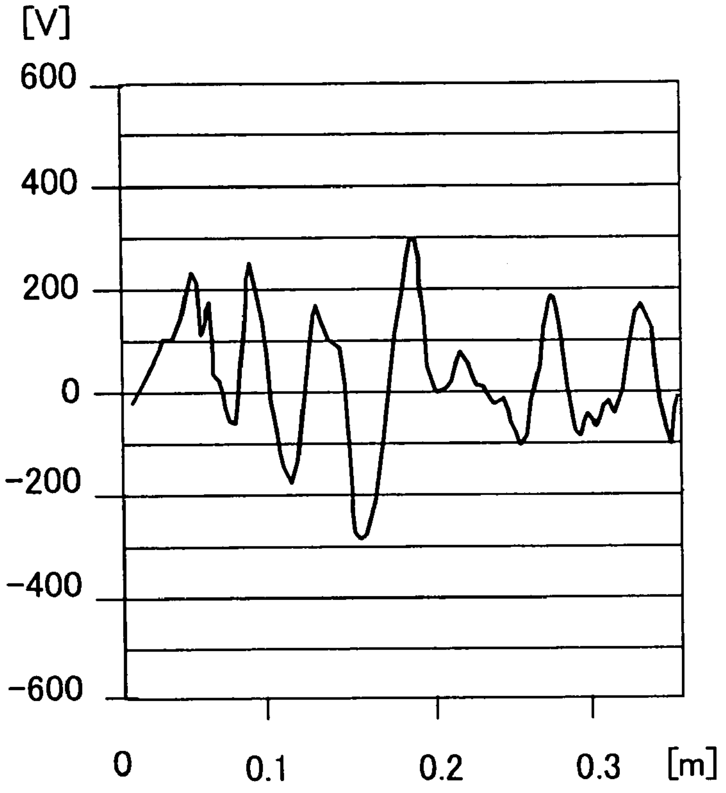
FIG. 35 is a graph showing an example of the measured distribution of rear side equilibrium potentials of a film that underwent static elimination.

In the charged sites of the raw film F, coating irregularity occurred, but in the film S of Example 24, no coating irregularity occurred. The distribution of the rear side equilibrium potential (in V) of the first surface (the coating surface) of the film S before coating from which charges had been eliminated was measured while the electrostatic voltmeter was moved in the traveling direction of the film S, and the result is shown in FIG. 35. In the graph of FIG. 35, the rear side equilibrium potential of the first surface of the film is chosen as the ordinate, and the length in the traveling direction of the film S, as the abscissa. The rear side equilibrium potentials after static elimination were kept in a range from −300V to 300V. The apparent charge densities were stage E by the judgment method VI.

Examples 24 and 25 and Comparative Example 13

In the static eliminator shown in FIG. 17, two biaxially oriented polyethylene terephthalate films with a width of 200 mm and a thickness of 125 μm or 75 μm (Lumirror 75K20 and 125E60 produced by Toray Industries, Inc.) were used as insulating sheets S, and were made to travel at the travel speed u (in m/min) as shown in Table 7. The thickness $d_f$ (in μm) of film used is shown in Table 7. It was confirmed that the film S was virtually non-charged in the respective surfaces before static elimination.

As the first and second electrode units, discharge electrodes consist of arrays of needle electrodes shown in FIG. 29 were used. The intervals $d_5$ of the needle electrodes in the width direction were 12.7 mm. The first and second electrode units were installed to be perpendicular to the traveling direction of the film S and in parallel to the surfaces of the film S above and below the film S, as static eliminating units. The positions of the tips of the needle electrodes in the width direction in the first and second electrode units were the same. The total number n of the static eliminating units was 10.

The tips of the needle electrodes of the each array of needle electrodes, i.e., the pointed ends of each ion-generating electrode of each static eliminating unit were disposed side by side in the width direction in a straight line, and the sagging of the electrodes was negligibly small. Furthermore, since each of the static eliminating units was disposed to be perpendicular to the traveling direction of the film S as described above, it was judged that the values of the following $d_0$ to $d_4$ did not apparently fluctuate in the width direction. The values of $d_0$ to $d_4$ were measured at the ends in the width direction of the electrode units and the static eliminating units.

In each static eliminating unit, the electrode discrepancy $d_0$ was 0 mm, the normal direction inter-electrode distance $d_1$ (in mm) and the normal direction inter-shield-electrode distance $d_3$ (in mm) were as shown in Table 7, and the shield electrode opening width $d_4$ was 8.5 mm.

All the static eliminating unit intervals $d_2$ (in mm) were 25 mm. The positions of the tips of the needle electrodes in the width direction in the respective static eliminating units were the same. All the first ion-generating electrodes in each static eliminating unit were the same in phase, and all the second ion-generating electrodes in each static eliminating unit were also the same in phase. AC power supplies with a frequency of 60 Hz and the effective voltage shown in Table 7 (in kV) were used as the power supplies 5*c* and 5*e* connected with the first and second ion-generating electrodes 5*d* and 5*f*, and the input of the step-up transformer inside the power supplies were switched to make the applied voltages reverse to each other in phase. Both the shield electrodes 5*g* and 5*h* were grounded.

The static elimination mode in Examples 24 and 25 and Comparative Examples 13 were the strongly charging mode. The ratios of positive and negative ions applied to the respective sites of the film and the values of the synchronous superimposition intensity X in Examples 24 and 25 and Comparative Examples 13 are shown in Table 7.

For the films S obtained in Examples 24 and 25 and Comparative Example 13, the coating irregularities of the first surfaces, the rear side equilibrium potentials and charge densities of the first surfaces and apparent charge densities (in simple method) were evaluated based on said judgment method III-1 and III-2, measuring method IV-1, IV-2 and judgment method VI. The results are shown in Table 7.

TABLE 7

| | $d_f$ | u | $d_1$ | V | Static elimination mode | Ratio of positive and negative ions applied to respective sites |
|---|---|---|---|---|---|---|
| Example 24 | 125 | 180 | 25 | 40 | Strongly charging | 5:5 |
| Example 25 | 75 | 180 | 20 | 3.1 | Strongly charging | 5:5 |
| Comparative Example 13 | 125 | 90 | 25 | 4.0 | Strongly charging | 10:0 |

(sequel)

| | X value | rear side equilibrium potential of first surface | Amplitude of charge densities of first surface | Apparent charge densities (Simple method) | Coating irregularity by use of Isopar | Coating irregularity by use of silicone |
|---|---|---|---|---|---|---|
| Example 24 | 0.00001 or less | E (35) | E (7.4) | E | G | G |
| Example 25 | 0.00001 or less | E (30) | E (10.6) | E | G | G |
| Comparative Example 13 | 1 | B (660) | G (140) | E | B | B |

Example 26

In the static eliminator shown in FIG. 17, a biaxially oriented 300 mm wide and 38 μm thick polyethylene terephthalate film (Lumirror 38S28 produced by Toray Industries, Inc.) was used as the insulating sheet S, and it was made to travel at 200 m/min.

Before static elimination, the film S had locally charged portions. The charges changed cyclically into positive and negative charges in the longitudinal direction of the film, and the lengths of the positive charged zones and the negatively charged zones were about tens of millimeters.

Figure 36A:
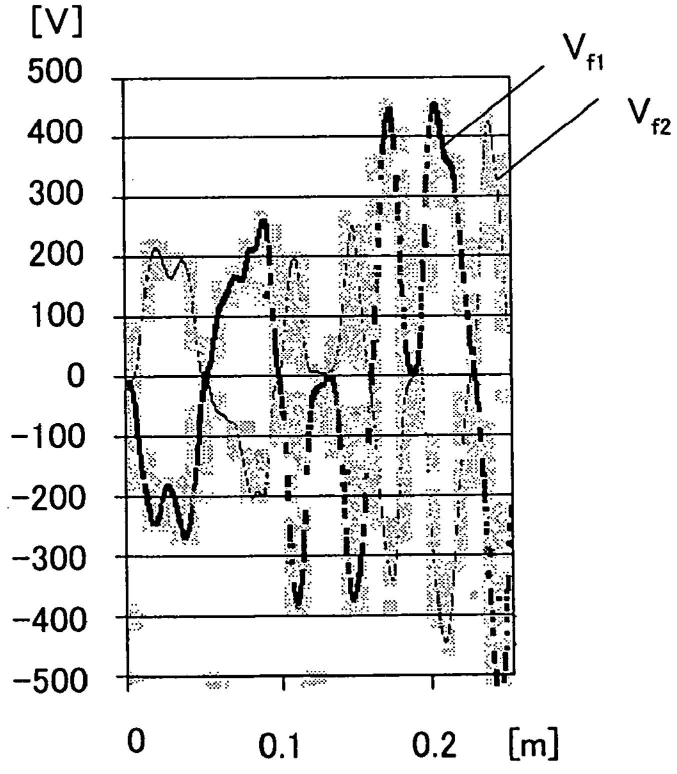
FIGS. 36A and 36B are graph showing another example of the measured distribution of rear side equilibrium potentials of a film that did not undergo static elimination.
Figure 36B:
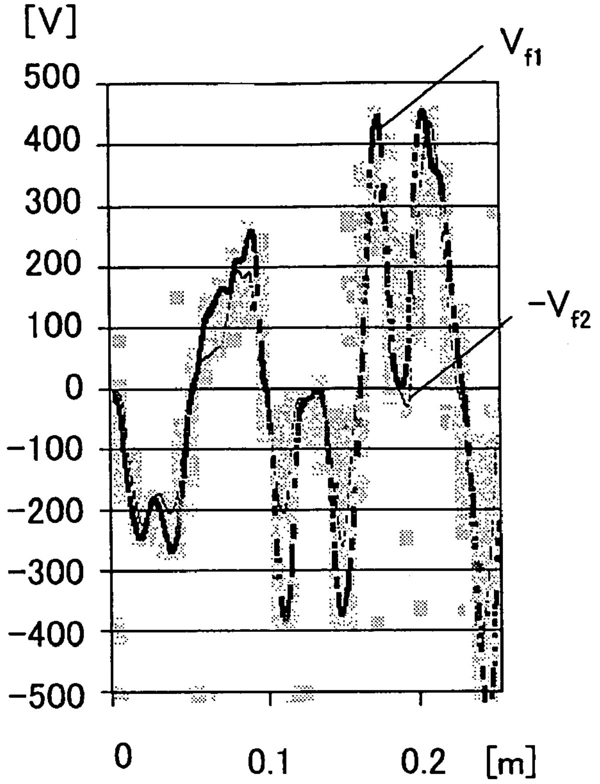

The distributions of rear side equilibrium potentials of both the surface of the film S (in V) in the charged sites were measured while the electrostatic voltmeter was moved in the traveling direction of the film S, results are shown in FIGS. 36A and 36B. In the graph of FIGS. 36A and 36B, the rear side equilibrium potential is chosen as the ordinate, and the length in the traveling direction of the film S, as the abscissa. In FIG. 36A, a bold line represents the rear side equilibrium potential $V_{f1}$ (in V) of the first surface, while a fine line represents the rear side equilibrium potential $V_{f2}$ (in V) of the second surface. In FIG. 36B, a bold line represents the rear side equilibrium potential $V_{f1}$ (in V) of the first surface, while a fine line represents the multiply of rear side equilibrium potential $V_{f2}$ (in V) of the second surface by the value −1, i.e., the value of $-V_{f2}$ (in V). As shown in FIG. 36A, the largest value of rear side equilibrium potentials in absolute value of each surface of the film in the charged sites was larger than 500 V. As shown in the graph of FIG. 36B, The largest value of $V_{f1}+V_{f2}$ in absolute value in the charged sites was larger than 50 V. This means the largest value of apparent charge densities in absolute value in the charged sites was larger than 35 $\mu C/m^2$.

As the first and second electrode units, discharge electrodes consist of arrays of needle electrodes shown in FIG. 29 were used. The intervals $d_5$ of the needle electrodes in the width direction were 12.7 mm. The first and second electrode units were installed to be perpendicular to the traveling direction of the film S and in parallel to the surfaces of the film S above and below the film S, as static eliminating units. The positions of the tips of the needle electrodes in the width direction in the first and second electrode units were the same. The total number n of the static eliminating units was 10.

The tips of the needle electrodes of the each array of needle electrodes, i.e., the pointed ends of the each ion-generating electrode of each static eliminating unit were disposed side by side in the width direction in a straight line, and the sagging of the electrodes was negligibly small. Furthermore, since each of the static eliminating units was disposed to be perpendicular to the traveling direction of the film S as described above, it was judged that the values of the following $d_0$ to $d_4$ did not apparently fluctuate in the width direction. The values of $d_0$ to $d_4$ were measured at the ends in the width direction of the electrode units and the static eliminating units.

In each static eliminating unit, the electrode discrepancy $d_0$ was 0 mm, the normal direction inter-electrode distance $d_1$ was 25 mm, the normal direction inter-shield-electrode distance $d_3$ was 29 mm, and the shield electrode opening width $d_4$ was 8.5 mm.

All the static eliminating unit intervals $d_2$ were 30 mm. The positions of the tips of the needle electrodes in the width direction in the respective static eliminating units were the same. All the first ion-generating electrodes in each static eliminating unit were the same in phase, and all the second ion-generating electrodes in each static eliminating unit were also the same in phase. AC power supplies with a frequency of 60 Hz and an effective voltage of 4 kV were used as the power supplies 5*c* and 5*e* connected with the first and second ion-generating electrodes 5*d* and 5*f*, and the input of the step-up transformer inside the power supplies were switched to make the applied voltages reverse to each other in phase. Both the shield electrodes 5*g* and 5*h* were grounded. The film S was arranged to pass virtually at the center between the first and second ion-generating electrodes in the respective static eliminating units.

Figure 37A:
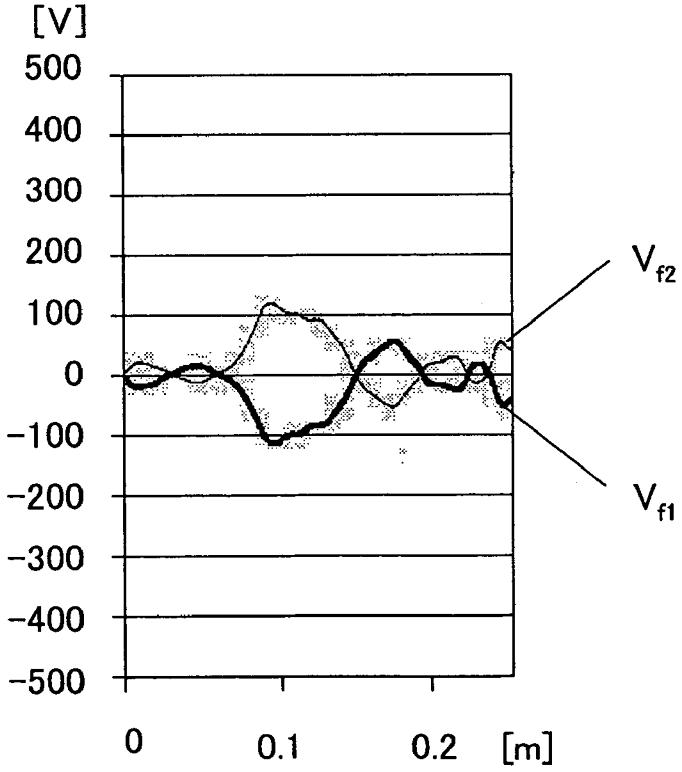
FIGS. 37A and 37B are graph showing another example of the measured distribution of rear side equilibrium potentials of a film that underwent static elimination.
Figure 37B:
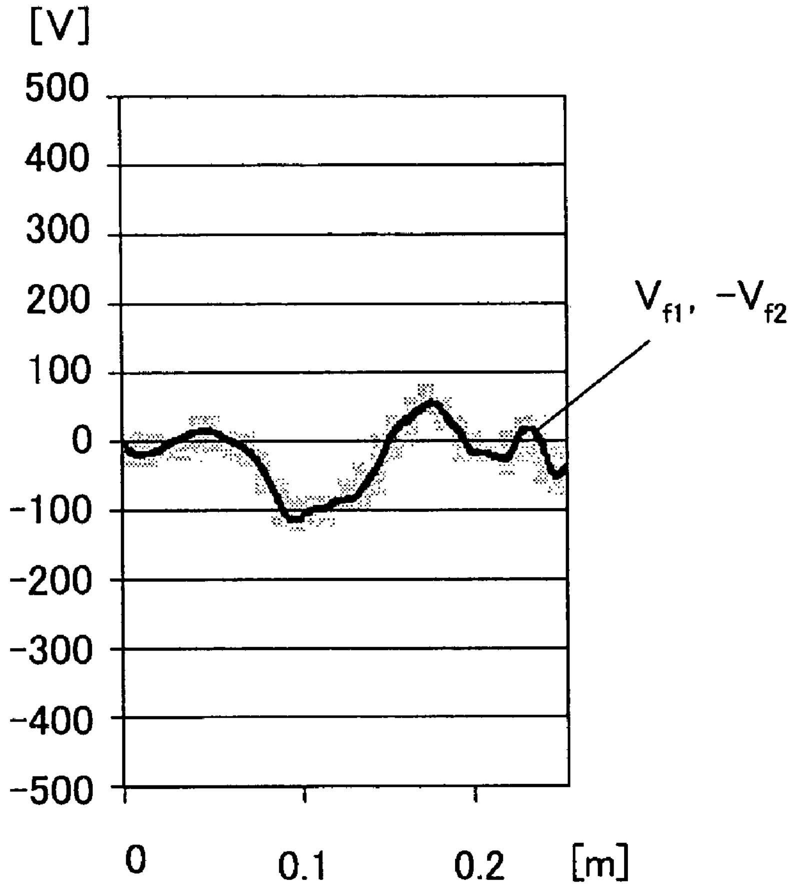

The distributions of the rear side equilibrium potentials of both the surface of the film S (in V) from which charges had been eliminated were measured while the electrostatic voltmeter was moved in the traveling direction of the film S, and the results were as shown in FIGS. 37A and 37B. In the graph of FIGS. 37A and 37B, the rear side equilibrium potential is chosen as the ordinate, and the length in the traveling direction of the film S, as the abscissa. In FIG. 37A, a bold line represents the rear side equilibrium potential $V_{f1}$ (in V) of the first surface, while a fine line represents the rear side equilibrium potential $V_{f2}$ (in V) of the second surface. In FIG. 37B, a bold line represents the rear side equilibrium potential $V_{f1}$ (in V) of the first surface, while a fine line represents the multiply of rear side equilibrium potential $V_{f2}$ (in V) of the second surface by the value −1, i.e., the value of $-V_{f2}$ (in V). (In FIG. 37B, the bold line was identical with the fine line.) As shown in FIG. 37A, the rear side equilibrium potentials of respective surfaces of the film after static elimination were kept in a range from −150 V to 150 V. This means the charge densities of respective surfaces of the film after static elimination were kept in a range from −100 $\mu C/m^2$ to 100 $\mu C/m^2$. As shown in FIG. 36B, the rear side equilibrium potentials of the respective surfaces were opposite in polarity and the absolute values of them are substantially identical. This means the apparent charge densities of the film S were about zero.

INDUSTRIAL APPLICABILITY

The static eliminator and the static eliminating method for an insulating sheet of the invention are used for eliminating charges from the insulating sheet to such an extent that the sheet is not substantially charged. The insulating sheets to which the invention can be applied include, for example, plastic films and paper. The sheet can be fed from a long sheet wound as a roll or sheet by sheet. The invention can also be used for eliminating charges from such sheets as silicon wafers and glass substrates. The invention can also be used for the static elimination intended for dust removal, i.e., as a dust removing apparatus or dust removing method.

The invention claimed is:

1. A static eliminator for an insulating sheet, in which at least two static eliminating units are provided in the traveling path of an insulating sheet with an interval kept between them in the traveling direction of the sheet; each of the respective static eliminating units has a first electrode unit and a second electrode unit disposed to face each other through the sheet; the first electrode unit has a first ion-generating electrode and a first shield electrode having an opening near the pointed ends of the first ion-generating electrode; and the second electrode unit has a second ion-generating electrode and a second shield electrode having an opening near the pointed ends of the second ion-generating electrode, wherein at each of the respective static eliminating units, (a) the voltage applied to the first ion-generating electrode and the voltage applied to the second ion-generating electrode are substantially opposite to each other in polarity, and (b) at each position in the width direction of the sheet, if the interval between the pointed end of the first ion-generating electrode and the pointed end of the second ion-generating electrode in the traveling direction of the sheet is $d_0$ (in mm), the distance between the pointed end of the first ion-generating electrode and the pointed end of the second ion-generating electrode in the direction normal to the sheet is $d_1$ (in mm), the shortest distance between the first shield electrode and the second shield electrode in the direction normal to the sheet is $d_3$ (in mm), and the average value of the widths of the opening of the first shield electrode and the opening of the second shield electrode in the traveling direction is $d_4$ (in mm), then the following formula (I)

$$d_0<1.5\times d_1^{2}/(d_3\times d_4) \quad \text{(I)}$$

is satisfied.

2. A static eliminator for an insulating sheet, according to claim 1, wherein the voltages applied to the first ion-generating electrodes of the respective static eliminating units and the voltages applied to the second ion-generating electrodes of the respective static eliminating units are supplied from respective single AC power supplies, or from respective groups of plural AC power supplies synchronous with each other in the group with a zero or predetermined potential difference.

3. A static eliminator for an insulating sheet, according to claim 1, wherein the first ion-generating electrode and the second ion-generating electrode of each of the respective static eliminating units are arrays of needle electrodes.

4. A static eliminator for an insulating sheet, according to claim 1, wherein the first shield electrode comprises a first rear shield electrode disposed on the rear side of the first ion-generating electrode, and the second shield electrode comprises a second rear shield electrode disposed on the rear side of the second ion-generating electrode.

5. A static eliminator for an insulating sheet, according to claim 4, wherein in the first shield electrode, a first insulating member is provided between the first ion-generating electrode and the first rear shield electrode, and/or in the second shield electrode, a second insulating member is provided between the second ion-generating electrode and the second rear shield electrode.

6. A static eliminator for an insulating sheet, according to claim 1, wherein at each position in the width direction of the sheet, at any two adjacent static eliminating units, if the static eliminating unit interval between the middle point of the line segment connecting the pointed end of the first ion-generating electrode with the corresponding pointed end of the second ion-generating electrode of one of the two adjacent static eliminating units, and the corresponding middle point of the other static eliminating unit in the traveling direction of the sheet is $d_2$ (in mm), the following formula (II)

$$d_2<12\times d_1^2/(d_3\times d_4) \quad \text{(II)}$$

is satisfied.

7. A static eliminating method for an insulating sheet, in which an insulating sheet is made to travel between the first and second ion-generating electrodes of the respective static eliminating units in the static eliminator for an insulating sheet as set forth in claim 6, while both the surfaces of the sheet are irradiated with the positive and negative ions generated from the first and second ion-generating electrodes, wherein where respective AC voltages of the same phase are applied to the first and second ion-generating electrodes of the respective static eliminating units, and if the frequency of the AC voltages is f (in Hz) and an effective value of the potential difference between the first and second ion-generating electrodes is 2V (in V), then the following formulae (III) and (IV)

$$90d_1 \leqq V \leqq 530d_1 \quad \text{(III)}$$

$$0.0425\times d_1^2\times f \leqq V \leqq 0.085\times d_1^2\times f \quad \text{(IV)}$$

are satisfied.

8. A static eliminating method for an insulating sheet, according to claim 7, wherein if the traveling speed of the sheet is u (in mm/sec) and at each position in the width direction of the sheet, the interval between the middle point of the line segment connecting the pointed end of the first ion-generating electrode with the corresponding pointed end of the second ion-generating electrode of the most upstream static eliminating unit, and the corresponding middle point of the most downstream static eliminating unit in the traveling direction of the sheet, i.e., the sum of all the static eliminating unit intervals $d_2$ from the most upstream static eliminating unit to the most downstream static eliminating unit is $D_2$ (in mm), the following formula (V)

$$D_2>u/f \quad \text{(V)}$$

is satisfied.

9. A static eliminating method for an insulating sheet, according to claim 7, wherein at sites of ⅔ or more of all the sites in the traveling direction of the sheet, said AC voltages are applied to the respective first and second ion-generating electrodes of n static eliminating units, where n is the total number of static eliminating units, in such a manner that the polarity of the potentials of the ion-generating electrodes of static eliminating units as many as not smaller than the number obtained from formula $(n-0.0006/d_f)/2$ {where $d_f$ (in m) is the thickness of the sheet} and not smaller than 0, said potentials working while the each of said sites passes directly under the ion-generating electrodes of said specified number of static eliminating units, can be opposite to the polarity of the potentials of the other ion-generating electrodes of the static eliminating units concerned, said potentials working while the said portion passes directly under the ion-generating electrodes of the other static eliminating units.

10. A static eliminating method for an insulating sheet, wherein:

in a predetermined period of starting and/or ending the traveling of the insulating sheet, the static eliminating method for an insulating sheet as set forth in claim 7 is used for eliminating charges from the insulating sheet.

11. A static eliminating method for an insulating sheet, according to claim 7, wherein in the case where a DC potential difference is established between the first and second shield electrodes of the respective static eliminating units, if the DC potential difference is Vs (in V), the following formula (XIII)

$$|Vs|/d_3<5 \quad \text{(XIII)}$$

is satisfied.

12. A static eliminating method for an insulating sheet, in which while an insulating sheet is made to travel between the first and second ion-generating electrodes of the respective static eliminating units in the static eliminator for an insulating sheet as set forth in claim 1, both the surfaces of the sheet are irradiated with the positive and negative ions generated from the first and second ion-generating electrodes of the respective static eliminating units, characterized in that in the case where a voltage is applied to each of the respective first and second ion-generating electrodes of the respective static eliminating units, if the frequency of the voltage is f (in Hz) and the one-side peak voltage is Vp (in V), then the following formulae (VI) and (VII)

$$130\times d_1 \leqq Vp \leqq 750\times d_1 \quad \text{(VI)}$$

$$0.120\times d_1^2\times f \leqq Vp \quad \text{(VII)}$$

are satisfied and the voltage is applied to each of the respective ion-generating electrodes in such a manner that in the case where a portion of the sheet is considered, the polarity of the potentials of the ion-generating electrodes of static eliminating units corresponding to ¼ or more of static eliminating units, said potentials working while the said portion passes directly under the ion-generating electrodes of the specified number of static eliminating units can be opposite to the polarity of the potentials of the ion-generating electrodes of the other static eliminating units concerned, said potentials working while the said portion passes directly under the ion-generating electrodes of the other static eliminating units.

13. A static eliminating method for an insulating sheet, in which while an insulating sheet is made to travel between the first and second ion-generating electrodes of the respective static eliminating units in the static eliminator for an insulating sheet as set forth in claim 1, both the surfaces of the sheet are irradiated with the positive and negative ions generated from the first and second ion-generating electrodes of the respective static eliminating units, characterized in that in the case where AC voltages smoothly changing in polarity are applied to the respective first and second ion-generating electrodes of the respective static eliminating units, if the frequency of the AC voltages is f (in Hz) and an effective value of the potential difference between the first and second ion-generating electrodes is 2V (in V) then the following formulae (VIII) and (IX)

$$90\times d_1 \leqq V \leqq 530\times d_1 \quad \text{(VIII)}$$

$$0.085\times d_1^2\times f \leqq V \quad \text{(IX)}$$

are satisfied and in the case where a portion of ⅔ or more is considered in the traveling direction of the sheet, the AC voltages are applied to the respective first and second ion-generating electrodes in such a manner that the polarity of the potentials of the ion-generating electrodes of static eliminating units corresponding to ¼ or more of the static eliminating units, said potentials working while the said portion passes directly under the ion-generating electrodes of the specified number of static eliminating units can be opposite to the polarity of the potentials of other ion-generating electrodes of the static eliminating unit concerned, said potentials working while the said portion passes directly under the ion-generating electrodes of the other static eliminating units.

14. A static eliminating method for an insulating sheet, according to claim 13, wherein at each position in the width direction of the sheet, if the any interval between the middle point of the line segment connecting any of the pointed ends of the first ion-generating electrodes with the corresponding pointed ends of the second ion-generating electrodes of one of any two adjacent static eliminating units, and the corresponding middle point of the other static eliminating unit is constant value , i.e., the any eliminating unit intervals $d_2$ is constant value $d_{20}$ (in mm), and the AC voltages substantially identical in phase are applied respectively to the first and second ion-generating electrodes of the respective static eliminating units, in such a manner that if the traveling speed of the sheet is u (in mm/sec), the frequency of the AC voltages is f (in Hz) and the total number of the static eliminating units is n, then the value of X is represented by the following formula (XII)

$$X = |\sin(n\pi fd_{20}/u)/\{n\cdot\sin(\pi fd_{20}/u)\}| \quad (ku \neq fd_{20},\ \text{where } k = 1, 2, 3, \ldots) = 1\ (ku = fd_{20}) \quad \text{(XII)}$$

and the value of X satisfies $0 \leqq X < 0.5$.

15. A static eliminating method for an insulating sheet, in which while an insulating sheet is made to travel between the first and second ion-generating electrodes of the respective static eliminating units in the static eliminator for an insulating sheet as set forth in claim 1, both the surfaces of the sheet are irradiated with the positive and negative ions generated from the first and second ion-generating electrodes of the respective static eliminating units, wherein where AC voltages smoothly changing in polarity are applied to the respective first and second ion-generating electrodes of the respective static eliminating units, if the frequency of the AC voltages is f (in Hz) and an effective value of the potential difference between the first and second ion-generating electrodes is 2V (in V), then the following formulae (X) and (XI)

$$90\times d_1 \leqq V \leqq 530\times d_1 \quad \text{(X)}$$

$$0.085\times d_1^2\times f \leqq V \quad \text{(XI)}$$

are satisfied and in the case where a portion of ⅔ or more is considered in the traveling direction of the sheet, the AC voltages are applied to the respective first and second ion-generating electrodes of n static eliminating units (where n is the total number of static eliminating units) in such a manner that the polarity of potentials of the ion-generating electrodes of static eliminating units as many as not smaller than the number obtained from formula (n 0.003/$d_f$)/2, where $d_f$ (in m) is the thickness of the insulating sheet, and not smaller than 1, said potentials working while the said portion passes directly under the ion-generating electrodes of the specified number of static eliminating units, can be opposite to the polarity of the potentials of the other ion-generating electrodes of the static eliminating units concerned, said potentials working while the said portion passes directly under the ion-generating electrodes of the other static eliminating units.

16. A static eliminator for an insulating sheet, in which at least two static eliminating units are provided in relation with a virtual plane, with an interval kept between them in a traveling direction of the sheet along the virtual plane; each of the static eliminating units has a first electrode unit and a second electrode unit disposed to face each other through the plane; the first electrode unit has a first ion-generating electrode and a first shield electrode having an opening near the pointed ends of the first ion-generating electrode; and the second electrode unit has a second ion-generating electrode and a second shield electrode having an opening near the pointed ends of the second ion-generating electrode, wherein at each of the static eliminating units, the first ion-generating electrode and the second ion-generating electrode are disposed to face each other through the plane substantially symmetrically with the virtual plane, and the voltage applied to the first ion-generating electrode and the voltage applied to the second ion-generating electrode are substantially opposite to each other in polarity, and wherein the static eliminating units are positioned such that a portion of the sheet passing through the static eliminating unit provided in an upstream side of the traveling direction of the sheet passes through the static eliminating unit provided in a downstream side of the traveling direction of the sheet.

17. A static eliminating method for an insulating sheet, comprising a first step of simultaneously irradiating a first surface and a second surface of an insulating sheet with respective monopolar ion clouds substantially opposite to each other in polarity at respective sites of the sheet while the sheet travels, and a second step of simultaneously irradiating the first and second surfaces with respective monopolar ion clouds reverse in polarity to those applied before at said sites of the sheet at a position downstream from the first step.

18. A method for producing a charge-eliminated insulating sheet, comprising the step of eliminating charges from an insulating sheet by the static eliminating method for an insulating sheet as set forth in claim 8.

19. A static eliminating method for an insulating sheet, in which a first surface and a second surface of an insulating sheet are simultaneously irradiated with a pair of monopolar ion clouds substantially opposite to each other in polarity at least two times, while the sheet travels, wherein the pair of ion clouds are applied so that the respective numbers of times of irradiating the first and second surfaces with a positive ion cloud and a negative ion cloud are not less than ¼ of said at least two times at respective sites of the sheet.

20. A static eliminating method for an insulating sheet, in which a first surface of an insulating sheet is irradiated with a group of first monopolar ion clouds consisting of spatially discrete ion clouds smoothly reversing in polarity with the lapse of time, and a second surface of the sheet is simultaneously irradiated with a group of second monopolar ion clouds consisting of spatially discrete ion clouds smoothly reversing in polarity with the lapse of time but substantially opposite in polarity to the first group of ion clouds, wherein in sites of ⅔ or more at all the sites in the traveling direction of the sheet, the respective groups of ion clouds are irradiated in such a manner that the polarity of the ion clouds corresponding to ¼ or more of the ion clouds in each of the first and second groups of ion clouds can be opposite to the polarity of the other ion clouds in the group.

21. A static eliminating method for an insulating sheet, wherein:

in a steady traveling state of the insulating sheet, the static eliminating method for an insulating sheet as set forth in claim 13 is used for eliminating charges from the insulating sheet.

* * * * *

UNITED STATES PATENT AND TRADEMARK OFFICE

CERTIFICATE OF CORRECTION

PATENT NO. : 7,388,736 B2
APPLICATION NO. : 10/902603
DATED : June 17, 2008
INVENTOR(S) : Satoka Morioka et al.

It is certified that error appears in the above-identified patent and that said Letters Patent is hereby corrected as shown below:

On the Title Page Item [54], Title, "STATIC ELIMINATOR AND A STATIC ELIMINATING METHOD FOR AN INSULATING SHEET, A METHOD FOR PRODUCING AND INSULATING SHEET, AND AN INSULATING SHEET" should read --STATIC ELIMINATOR AND A STATIC ELIMINATING METHOD FOR AN INSULATING SHEET, A METHOD FOR PRODUCING AN INSULATING SHEET, AND AN INSULATING SHEET--.

Claim 1, at Column 81, line 20, "$d_0<1.5xd_1^{2/(}d_3xd_{4)}$" should read --$d_0<1.5xd_1^2/(d_3xd_4)$--.

Claim 18, at Column 85, line 26, "claim 8" should read --claim 17--.

Signed and Sealed this

Tenth Day of February, 2009

JOHN DOLL

*Acting Director of the United States Patent and Trademark Office*

UNITED STATES PATENT AND TRADEMARK OFFICE

CERTIFICATE OF CORRECTION

PATENT NO. : 7,388,736 B2
APPLICATION NO. : 10/902603
DATED : June 17, 2008
INVENTOR(S) : Satoka Morioka et al.

It is certified that error appears in the above-identified patent and that said Letters Patent is hereby corrected as shown below:

On the Title Page Item [54] and Column 1, lines 1-5, Title, “STATIC ELIMINATOR AND A STATIC ELIMINATING METHOD FOR AN INSULATING SHEET, A METHOD FOR PRODUCING AND INSULATING SHEET, AND AN INSULATING SHEET” should read --STATIC ELIMINATOR AND A STATIC ELIMINATING METHOD FOR AN INSULATING SHEET, A METHOD FOR PRODUCING AN INSULATING SHEET, AND AN INSULATING SHEET--.

Claim 1, at Column 81, line 20, “$d_0<1.5xd_1^{2/(}d_3xd_{4)}$” should read --$d_0<1.5xd_1^2/(d_3xd_4)$--.

Claim 18, at Column 85, line 26, “claim 8” should read --claim 17--.

This certificate supersedes the Certificate of Correction issued February 10, 2009.

Signed and Sealed this

Tenth Day of March, 2009

John Doll

JOHN DOLL
*Acting Director of the United States Patent and Trademark Office*